(12) United States Patent
Thackston

(10) Patent No.: US 6,295,513 B1
(45) Date of Patent: Sep. 25, 2001

(54) NETWORK-BASED SYSTEM FOR THE MANUFACTURE OF PARTS WITH A VIRTUAL COLLABORATIVE ENVIRONMENT FOR DESIGN, DEVELOPEMENT, AND FABRICATOR SELECTION

(75) Inventor: James D. Thackston, Marietta, GA (US)

(73) Assignee: Eagle Engineering of America, Inc., Marietta, GA (US)

( * ) Notice: Subject to any disclaimer, the term of this patent is extended or adjusted under 35 U.S.C. 154(b) by 0 days.

(21) Appl. No.: 09/410,619

(22) Filed: Oct. 1, 1999

Related U.S. Application Data

(63) Continuation-in-part of application No. 09/270,007, filed on Mar. 16, 1999, and a continuation-in-part of application No. 09/311,150, filed on May 13, 1999.

(51) Int. Cl.[7] .................................................. G06F 17/50
(52) U.S. Cl. .................. 703/1; 703/6; 707/104
(58) Field of Search .................. 700/98, 118; 705/1; 707/104, 500; 703/13; 345/442, 440, 421; 716/18

(56) References Cited

U.S. PATENT DOCUMENTS

| | | |
|---|---|---|
| 4,964,043 | 10/1990 | Galvin . |
| 5,278,751 | 1/1994 | Adiano et al. . |
| 5,321,841 | 6/1994 | East et al. . |
| 5,444,844 | 8/1995 | Inoue et al. . |
| 5,644,493 | 7/1997 | Motai et al. . |
| 5,664,115 | 9/1997 | Fraser . |
| 5,715,402 | 2/1998 | Popolo . |
| 5,761,661 | 6/1998 | Coussens et al. . |
| 5,794,207 | 8/1998 | Walker et al. . |
| 5,802,502 | 9/1998 | Gell et al. . |
| 5,815,683 | 9/1998 | Volger . |
| 5,838,906 | 11/1998 | Doyle et al. . |
| 5,844,553 | 12/1998 | Hao et al. . |
| 5,848,427 | 12/1998 | Hyodo . |
| 5,862,223 | 1/1999 | Walker et al. . |
| 5,940,082 | * 8/1999 | Brinegar et al. . |

OTHER PUBLICATIONS

Lisa Kempfer, 'Tools for Web Collaboration', Apr. 1999, Computer Aided Engineering, vol. 18, No. 4, pp 38.*
Pages printed out from Internet on Mar. 15, 1999; "TPN Register," at www.tpnregister.com (13 pages).
Pages printed out from Internet on Mar. 15, 1999; "Understanding Product Data Management" at pdmic/com/undrstnd.htm1#datamgmt (9 pages).
Pages printed out from Internet on Apr. 26, 1999; "GE TPN Post Detailed Service Use Guidelines", at www.tpn.geis.com/tpn/getting started (18 pages).
Pages printed out from Internet on Apr. 26, 1999; "GE TPN Post Resource Center", at www.tpn.geis.com/tpn/resource center (9 pages).

(List continued on next page.)

Primary Examiner—Kevin J. Teska
Assistant Examiner—Russell W. Frejd
(74) Attorney, Agent, or Firm—Hunton & Williams

(57) ABSTRACT

The invention relates generally to a comprehensive, integrated computer-based system and method for undertaking an engineering design and development effort in a virtual collaborative environment, identifying qualified fabricators for manufacturing a part design based on fabricator capability information stored in a global registry database substantially maintained by the fabricators themselves, and conducting a virtual bidding process whereby electronic representations of three dimensional model and specification data are provided by a central server. The central server further supports the bidding process by providing quasi-real time audio, video and graphics, and the contracts negotiation and formalization steps.

43 Claims, 29 Drawing Sheets

OTHER PUBLICATIONS

Pages printed out from Internet on Apr. 26, 1999; "ThomasNet Incorporated," at www.thomasnet.com (9 pages).

Pages printed out from Internet on Apr. 26, 1999; "SoluSource," at www.solusource.com (10 pages).

Pages printed out from Internet on Apr. 26, 1999; "Harris InfoSource," at www.harrisinfo.com (12 pages).

Pages printed out from Internet on Apr. 26, 1999; "Muse Technologies," at www.musetech.com (28 pages).

Pages printed out from Internet on Apr. 26, 1999; "Product Data Integration Technologies, Inc., " at www.pdit.com (19 pages).

Pages printed out from Internet on Aug. 9, 1999; "SBA Pro–Net" at www.pro–net.sba.gov (11 pages).

Pages printed out from Internet on Aug. 9, 1999; "FreeMarkets," at www.freemarkets.com (35 pages).

"Process Control," article from *Computer Graphics World*, pp. 69–72 (Aug. 1999).

Pages printed out from Internet on Sep. 20, 1999; "Wecome to Enovia," at www.enovia.com (32 pages).

Pages printed out from Internet on Sep. 20, 1999; "Metaphase," at www.metaphasetech.com (24 pages).

Pages printed out from Internet on Sep. 20, 1999; "Bentleys Project Bank . . . , " at www.bentley.com (85 pages).

Pages printed out from Internet on Sep. 20, 1999; "Unigraphics Solutions," at www.ugsolutions.com (13 pages).

Pages printed out from Internet on Sep. 20, 1999; "Parametric Technology Corporation Features," at www.ptc.com (20 pages).

Pages printed out from Internet on Sep. 20, 1999; "Open Virtual Factory™," at www.eai.com (57 pages).

Pages printed out from Internet on Oct. 18, 1999; "About TradeMatrix," at www.tradematrix.com (46 pages).

Pages printed out from Internet "webcast" on Oct. 26, 1999; "Collaborative Product Commerce," at webevents.broadcast.com (11 pages).

Pages printed out from Internet on Mar. 20, 2000; "CoCreate," at www.cocreate (25 pages).

Pages printed out from Internet on Mar. 20, 1999; "Alibre.com," at www.alibre.com (9 pages).

Pages printed out from Internet on Mar. 20, 1999; "SupplierMarket.com," at www.suppliermarket.com (13 pages).

Lisa Kempfer, 'Tools for Web Collaboration', Apr. 1999, Computer–Aided Engineering, Apr. 1999, pp38.*

* cited by examiner

NETWORK-BASED SYSTEM FOR THE MANUFACTURE OF PARTS WITH A VIRTUAL COLLABORATIVE ENVIRONMENT FOR DESIGN, DEVELOPEMENT, AND FABRICATOR SELECTION

RELATED APPLICATIONS

This application is a continuation-in-part of U.S. application Ser. No. 09/270,007, filed Mar. 16, 1999, entitled "Interactive System for Engineering Design and Manufacture," and U.S. application Ser. No. 09/311,150, filed May 13, 1999, entitled "Network Integrated Concurrent Engineering With Computer Aided Design," both of which are herein incorporated by reference.

FIELD OF THE INVENTION

The present invention relates generally to a comprehensive, integrated computer-based system and method for undertaking an engineering design and development effort in a virtual collaborative environment, identifying qualified fabricators for manufacturing a part design based on fabricator capability information stored in a global registry database substantially maintained by the fabricators themselves, and conducting a virtual bidding process whereby electronic representations of three dimensional model and specification data are provided by a central server. The central server further supports the bidding process by providing quasi-real time audio, video and graphics, and the contracts negotiation and formalization steps.

BACKGROUND OF THE INVENTION

The conventional approach to an engineering design and development effort tends to be costly and cumbersome. Typically, a design and development effort begins with an initial idea or concept for a new product, for example, an improved sonobuoy for receiving and transmitting to a surveiling aircraft acoustic data from the ocean.

From this initial idea, an initial design comprising drawings and written specifications is created. The drawings may be paper drawings or "blueprints"or may be three dimensional drawings created using Computer Aided Design (CAD) software. The initial design will usually include certain specifications, such as product specifications (defining performance of the item), system specifications (defining performance of a system including the item) and interface design specifications (defining electronic or physical interfaces between the item and other system components). In the case of a sonobuoy, these documents will include a product specification detailing the performance criteria and "form, fit and function" of the sonobuoy; a system specification detailing the performance of the system including the sonobuoy and aircraft avionics; and an interface design specification defining the electronic interface between the sonobuoy and the aircraft receiver and specialized acoustical processors.

These specifications will include various design criteria or performance parameters for the new sonobuoy, such as reliability requirements, mean time between failure, radio frequency (RF) transmission power and range, acoustic gain and performance (e.g., gain in decibels and three dimensional beam patterns) and so on.

As depicted in FIG. 1, this initial idea or concept is translated into an initial design, "Design 1." A series of teams, comprising one or more members, are assembled to evaluate the design according to their various engineering, business and management specialties. Typically, there will be a management team whose primary function is to ensure that the development program is "on schedule" and "on cost." There will be a business/accounting team who will analyze the costs of the development program and the expected costs of the product produced in quantity. There will be a series of engineering teams, each of a particular discipline or specialty. In our sonobuoy example, there will be mechanical engineers, electrical engineers, RF engineers, acoustic specialists, reliability engineers, safety engineers, signal processing specialists, production engineers and so on.

Each of these teams will evaluate the design (three dimensional model and associated specifications) to determine conformance with requirements. In a typical development effort, these teams will recommend changes to the design to rectify deficiencies or improve performance. The design will evolve (as depicted in FIG. 1, from Design 1, Design 2, and so on to final Design n) as changes are recommended and implemented.

Because a number of disciplines may be involved, it can be appreciated that the process can be lengthy and costly. When one team implements changes based on its analysis, other teams may have to redo their analysis as a result. For example, when a production engineer recommends (based on cost or manufacturibility considerations) that paper capacitors be employed instead of ceramic capacitors, the reliability engineer will need to reevaluate the design. When an acoustic specialist recommends that improved hydrophones be used or an RF specialist recommends that an improved receiver be used, the mechanical engineer will need to determine if packaging limits are exceeded and the accounting specialists will need to determine if "design to cost" parameters are exceeded.

Application of the "concurrent engineering" principle can improve the process somewhat by assembling the various specialists at the earliest possible time. Thus, manufacturing specialists are consulted from the beginning, rather than simply at the end.

Nevertheless, the sonobuoy example and FIG. 1 illustrate how a complex engineering effort involving multiple disciplines can be a lengthy and costly process as designs are considered and discarded, new designs are evaluated and so forth. When the various specialists are in different geographical locations ("physical boundaries"), at different business entities ("business boundaries"), or employ different software standards ("format boundaries"), the problem is only compounded. The disparate locations, business cultures and format standards can be significant impediments. This can be referred to as the "boundaries problem." Put simply, having specialists of differing disciplines (with often conflicting priorities) attempt to resolve design issues when operating from different locations, or from business entities with differing business practices and cultures, or when using different software formats (e.g., three dimensional model standards) creates significant costs and obstacles. This is a significant drawback.

Once an acceptable design is arrived at (e.g., Design n, FIG. 1), the developing concern typically wishes to produce the design in quantity. In today's decentralized economy, where most "start-up" or even moderately-sized engineering enterprises do not have their own production facilities, this typically requires "outsourcing" of the production. In some respects, the process of locating qualified, performance-proven fabricators can be as daunting as the engineering development effort. The engineering concern may not have established relationships with many—or any—manufacturers. Of the few potential candidates that may be identified through "word of mouth" or a costly search, it can be costly to evaluate whether such candidates meet minimum requirements. Numerous meetings may be required. Even then, it may be difficult to ascertain the quality of past performance and the prospects for the proposed performance. The engineering concern will have to sustain the cost, and risk, of divulging proprietary design and specification data. Because format standards may differ, the costs and risks of (sometimes imperfect) file conversions may be required. These are significant drawbacks.

Even if several acceptable fabricators are located, they may represent but a fraction of the otherwise qualified pool of fabricators. This lessens competition and ultimately, can lead to increased costs and decreased performance. These are significant disadvantages to the engineering concern. With respect to start-up or not-well-known fabricators, this is a significant drawback that prevents them from penetrating new markets and inhibits their growth.

Once a pool (or even a single) of qualified fabricators is identified, the process of negotiating an agreement on performance must occur. This may require numerous phonecalls, teleconference calls, and face-to-face meetings. Three dimensional models and specification documents may have to be divulged so that the fabricator can develop a bid. Despite rigorous concurrent engineering, it is common that minor and not-so-minor redesigns may be required due to producibility concerns. This will require an additional engineering effort between the supplier and the proposed fabricator to discuss and decide on engineering changes to arrive at a mutually acceptable, and producible, design that meets and performance and cost requirements. The time and effort entailed are significant drawbacks.

Engineering issues aside, the negotiation process can be lengthy and costly. Documents, which may be proprietary, are sent to the bidding fabricator. The bidding fabricator must evaluate them, engage in discussions with the prime contractor about the design and specifications, and generate a "bid." This bid typically includes terms relating to time, cost and performance. Upon receipt of the bid, additional discussions between the parties may be required to address engineering and/or contractual issues. Typically conducted using a combination of the phone, teleconference and postal service (or the like), these discussions impose additional costs and time in getting a product to market. This is a significant drawback.

Other problems and drawbacks also exist.

SUMMARY OF THE INVENTION

For these and like reasons, what is desired is a network-based, interactive system capable of receiving specification and other information so that an engineering design for a product, represented by an electronic three-dimensional model, can be designed, developed and evaluated in a collaborative, virtual environment substantially obviating geographic, business and format boundaries.

Accordingly, it is one object of the present invention to overcome one or more of the aforementioned and other limitations of existing systems and methods for undertaking an engineering development effort.

It is another object of the present invention to provide such a network-based system whereby a central server maintains engineering data, such as design documents and three dimensional model data, in a common, neutral format, which is accessible by authorized team members through a graphical user interface that is substantially platform independent to reduce or eliminate the necessity for specialized hardware and software.

It is another object of the present invention for a central server to support a secure multimedia communications capability to include audio, video and graphics, so that participants in an engineering effort can communicate and collaborate in the virtual engineering environment to discuss a design.

It is another object of the present invention to provide a central server with a repository of fabricator capability data which can be searched by a prime contractor to locate qualified fabricators based on general criteria as well as design-specific criteria.

It is another object of the present invention to provide a central server whereby said fabricator capability data is substantially maintained by the fabricators so as to incentivize them to participate in the so-called manufacturer's registry because it provides them a capability management system.

It is another object of the present invention to provide such a searchable manufacturer's registry further supporting the collection of quality assurance data based on fabricator performance, the quality assurance data being provided to the fabricator and to future prime contractors considering that fabricator.

It is another object of the present invention to provide an electronic marketplace and bidding system whereby a prime contractor can solicit proposals or bids in a virtual environment including the provision of specification and three-dimensional model data to prospective fabricators for consideration in developing their proposals.

It is another object of the present invention to provide such an electronic marketplace whereby a prime contractor and prospective fabricators can discuss design and contractual issues in a virtual environment using quasi- real-time audio, video and graphics, including the three-dimensional model representing the part or product.

To achieve these and other objects of the present invention, and in accordance with the purpose of the invention, as embodied and as broadly described, an embodiment of the present invention comprises an apparatus and method for a network-based interactive system that supports several phases of an engineering effort: the development and evaluation of an engineering design, the identification of potentially qualified fabricators, and the bidding and negotiation process to create an agreement for a qualified fabricator to manufacture a design in quantity.

Accordingly, what is disclosed is a network-based system interfacing multiple user systems which interface through a central server to undertake the design development effort. A baseline design is created and maintained in a neutral or common format by the central server. A governing entity or prime contractor assigns access or authorization data so that parts or the entirety of the three dimensional model and/or specification data is accessible by other team members in order to perform various analysis and simulations. An integrated product data management (PDM) capability manages access to controlled data and maintains a record of the various manifestations of the design. A current baseline design is maintained so that engineering analysis and simulation team members perform their analysis on the correct design. The system supports quasi- real-time interactive audio, video and graphics so that team members can discuss design issues in the virtual environment without having to cross geographic or format boundaries. The above-described capabilities are provided in a substantially platform independent manner using a graphical user interface (GUI) supported by standard software, such as a "browser," which may further include machine independent applications, such as Java Applets™, or, for certain required tools, a semi-machine-dependent application, to reduce the processing burden on user stations and the need for specialized client-side software. In an alternative embodiment of the invention, a so-called "custom browser" may be provided to user stations so that the interface with the central server system is tailored to the present application. In yet another embodiment, certain graphics-intensive applications may be provided by the central server as client-side applications to be compiled and executed, such as applications coded in Open GL™ by Silicon Graphics™. The so-called common denominator in these embodiments is the goal of retaining the most calculation intensive tasks on the server side of the overall system so as to reduce the need for specialized software and hardware capabilities at the user systems. Additionally, by receiving, converting, and maintaining part design models in a common, neutral format, the central server system provides the important benefit of "data neutrality" for the participants in a concurrent engineering development project. In short, format boundaries are obviated. This is an important benefit, especially for small enterprises, which might otherwise be eliminated from participation in a project because their software resource do not support a format required by a prime contractor.

A second aspect of the system provides a database of fabricators, a so-called "Global Manufacturer's Registry," which can be searched by a designer or prime contractor to identify qualified fabricators. The database contains various information describing the fabricators, such as location, experience, machinery and process capabilities, certifications, quality assurance/inspection standards, and so forth. Fabricators are incentivized to enroll in the registry because it provides an incidental benefit as a capability management system they can use to manage and track their resources and capabilities. A prime contractor with a part design model representing a product can conduct a search to identify qualified fabricators based on design-specific and general criteria. The system includes producibility logic to analyze an uploaded part design in order to help identify qualified fabricators. The system allows prime contractors to provide feedback on performance which can be factored into a quality assurance capability provided by the system. As with the NICECAD aspect of the integrated system, the GMR aspect provides data neutrality for users by supporting the upload and conversion of part design models from various format types into a standard neutral format. Therefore, a designer is not precluded from using the GMR system based on the fact that it uses a particular part design model format.

According to a third aspect of the system, an electronic bidding system is provided by an Electronic Trading Community (ETC) to allow virtual discussions and negotiations to take place over the networked system once a pool of qualified fabricators is identified. A request for quote (RFQ) or request for proposal (RFP) with design data is submitted to the system so that fabricators can submit proposals. The virtual computer aided design (CAD) capability allows quasi- real-time discussions, including audio, video and graphics. The graphics capability allows a prime contractor and prospective fabricator to view the three-dimensional part design, including the execution of various manipulations, such as virtual rotations and translations, pan, zoom and "fly throughs." The stored part design model data may include links to associated specifications, standards and other design specific documents so that the bidding fabricator has a full representation of what it is bidding on. As with the NICECAD and GMR aspects of the integrated system, the ETC provides "data neutrality" so that format boundaries do not become impediments for either the soliciting prime contractor/designer or the bidding fabricator.

In general, the above capabilities are provided in a networked, virtual environment that reduces transaction costs and meets engineering challenges as it transcends geographic, business and format boundaries. One or more central servers maintain the part design model in neutral format, such as AP 214 STEP format, well known to those of skill in the art. Substantially platform user independent graphical interfaces, such as browser pages, and server-client interactive applications, such as Java Applets™ make the system substantially user-system independent. In some instances, instead of using Java™ mini-applications or the like to run on a browser's so-called "virtual machine," certain graphics-intensive or computation-intensive applications may be compiled and executed at the user systems as semi- machine-dependent applications amenable to operations using a computer system with a standard operating system. Whether specialized applications are supported by miniapplications (e.g., such as those coded in Java™) provided through a browser or by server interface with a semi-machine-dependent application at a user station (e.g., a server-provided application coded in Open GL™ readily executed on a Unix™—or Windows™—based system), the goal is a substantial user platform independent network interface with the server system. Security is provided through encryption and multiple firewalls at the server(s) so as to protect proprietary and sensitive data.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist. At the outset, it should be observed that the several primary features of the system are depicted as residing on several servers. This is, of course, only for exemplary and illustrative purposes. The features of collaborative engineering, global manufacturer's registry, and electronic bidding, can be provided via one or many servers, which may be co-located or which may reside at different locations connected through a network. Likewise, the data stored by the system could be stored at a single location or amongst multiple locations in a so-called hybrid relational object oriented database architecture. In general, the so-called first aspect of the fully integrated embodiment of the invention, the collaborative engineering feature, is described as the Network Integrated Concurrent Engineering With Computer Aided Design or NICECAD. The second aspect of the invention, the global manufacturer's registry feature, is described as the Global Manufacturer's Registry (GMR) or the Interactive System for Engineering Design and Manufacture (EDM). The so-called third aspect of the invention, the electronic bidding capability feature, is described as the Electronic Trading Community or ETC.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

As discussed in the Summary of the Invention, the present invention is directed to providing a networked, virtual, collaborative environment for three aspects of an engineering development: (1) the design and development phase (referred to as the NICECAD or Network Integrated Concurrent Engineering Computer Aided Design); (2) the identification and evaluation of qualified fabricators or manufacturers for a design (referred to as the Global Manufacturer's Registry or GMR system or the Interactive System for Engineering Design and Manufacture (EDM), and (3) the solicitation and evaluation of requests for proposals or quotes from qualified bidders (referred to as the Electronic Trading Community or ETC).

The First Aspect of the Invention: System and Methods for Undertaking an Engineering Design and Development Effort in a Virtual and Collaborative Environment In general, the NICECAD server system provides Product Data Management (PDM), CAD functionality, engineering analysis and simulation (EAS), multimedia communications functionality, electronic commerce capability and front-end network interface and system administration support.

Figure 2:
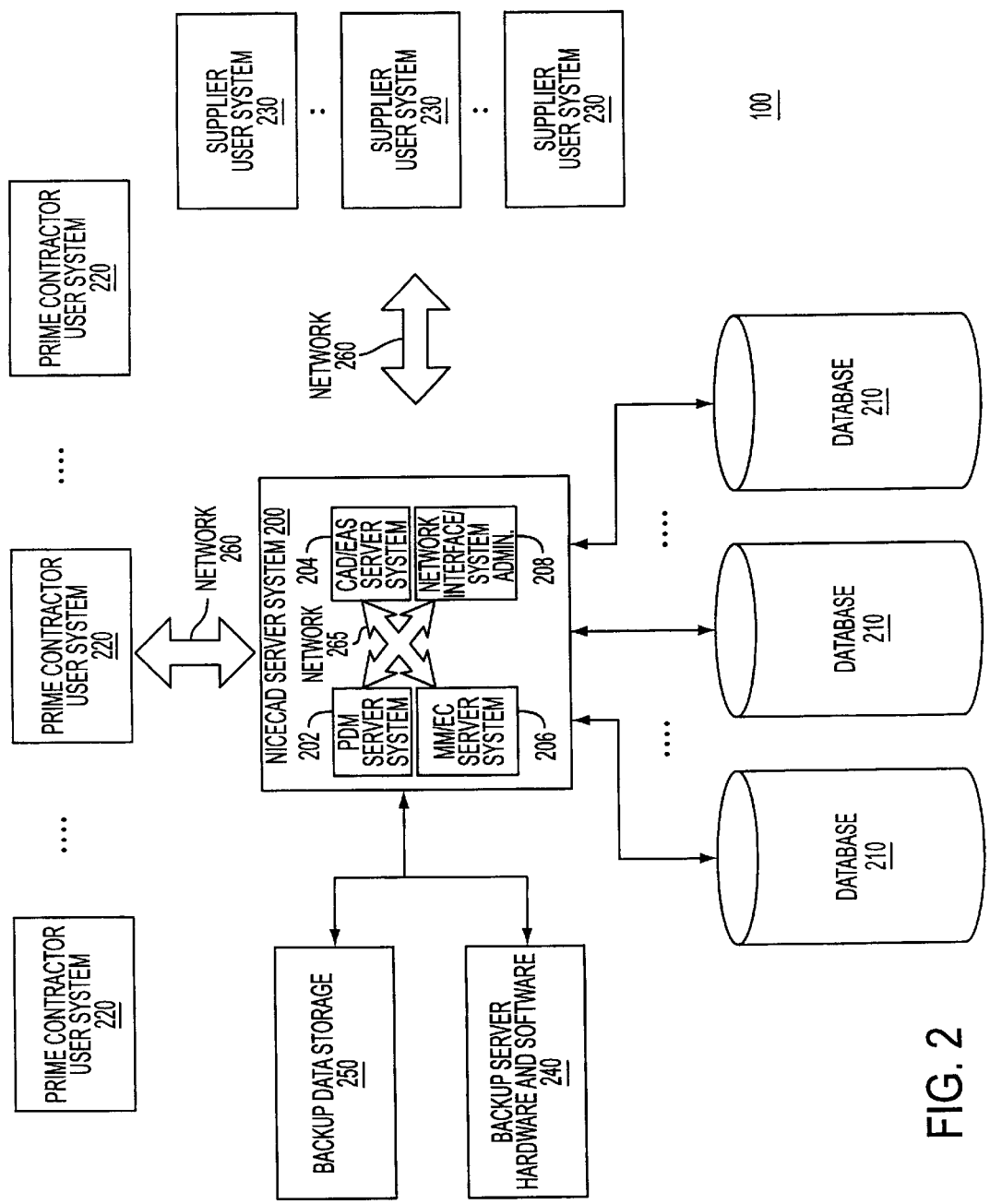
FIG. 2 is a block diagram illustrating an embodiment of a NICECAD system according to the present invention including a network, NICECAD server system, database, prime contractor user systems and supplier user systems.

FIG. 2 depicts an overview of an embodiment of a NICECAD system 100 according to the present invention, which provides for concurrent engineering in a "virtual," collaborative environment. This environment obviates engineering data format (e.g., CAD geometry), business and other boundaries that presently impede conventional approaches to concurrent engineering. Significantly, the virtual environment provides data neutrality by maintaining part design models in a common, neutral format, and providing utilities so that users' specialized part design model software formats do not present barriers to participation in a collaborative engineering effort.

NICECAD system 100 incorporates product data management (PDM), computer aided design (CAD), engineering analysis and simulation (EAS), multimedia communications and electronic commerce (EC) so that the entire project, including its engineering and business components, may be carried out in a virtual, collaborative and secure environment.

FIG. 2 depicts an embodiment of a NICECAD system 100 according to the present invention, comprising one or more prime contractor user systems 220; one or more supplier user systems 230; one or more databases 210; one or more NICECAD server systems 200; network 260; one or more backup data storage devices 250; and one or more backup server hardware and software devices 240.

Network 260 may comprise any network that allows communication amongst the components, and may encompass existing or future network technologies, such as the existing "Internet," "World Wide Web," Wide Area Network (WAN), Local Area Network (LAN), "Internet Protocol-Next Generation" (sometimes referred to as the coming "Supernet"), and any variation of packet switched networks (or other supporting data packing technologies) for permitting communication amongst user systems and servers. Regarding the Internet and like shared networks, high bandwidth systems have been developed and are becoming increasingly accessible. For example, the Abilene Network developed by University Corporation for Advanced Internet Development (UCAID) and the so-called Internet2 project are two examples of such high-capacity systems. The very high performance Backbone Network Service (vBNS) provided by MCI Corporation and used by the National Science Foundation and others is another example of such a high-capacity system.

Prime contractor user systems 220 may comprise any system capable of interfacing with network 260. Prime contractor user systems 220 may comprise "standard" computer systems that do not require specialized hardware or software to use NICECAD system 100. Prime contractor user systems 220 may comprise personal computers, microcomputers, minicomputers, portable electronic devices, a computer network, or any other system operable to interface with network 260 to send and receive data. Prime contractor user systems 220 may comprise computers running standard operating systems and supporting "browser" technologies for accessing and displaying data over a common network, such as personal computers with Windows NT™ and Microsoft Internet Explorer™ 5.0 or Netscape Communicator™ 4.06, an Apple Macintosh™ running MOSAIC™ web browser software, a Sun SparcStation™ running UNIX and Netscape Communicator™, and a Silicon Graphics™ UNIX-based workstation such as the SGI Octane™ running Netscape Communicator™. Prime contractor user systems 220 may comprise computer systems running a so-called "custom browser" specially-adapted for the present application. In one embodiment, such a custom browser may be provided by the NICECAD provider (e.g., NICECAD server system 200) as a downloadable file through a standard browser. As those of skill in the art may appreciate, prime contractor user systems 220 may comprise future variations of such systems that permit the interaction over a network with a server system.

In one embodiment, prime contractor user system 220 comprises a personal computer or workstation running a standard operating system such as Windows NT, and using a standard browser such as Microsoft Internet Explorer™ 5.0 capable of interpreting HTML 4.0, XML, VRML, and running Java™ applets or like "miniapplications." In another embodiment, prime contractor user system 220 comprises a personal computer running such a standard operating system and using such a standard browser in conjunction with client-side applications which, while being semi- machine-dependent in the sense they are not executed using a browser's so-called "virtual machine," are otherwise compiled and executed using a standard operating system. Applications coded in Open GL™ by Silicon Graphics, a language for graphics applications well known to those of skill in the art, and readily supported by Unix™—and Windows™—based systems, would be just one example of such a semi- machine-dependent application running on a prime contractor user system 220. In yet another embodiment, a server-supplied so-called custom browser application is provided which is specially-adapted for interfacing with NICECAD server system(s) 200 and any client side semi- machine-dependent applications (or, alternatively, Java™-type or Java™-like miniapplications) it provides. Such semi- machine-dependent applications may be server-provided, for example, as downloadable files through a standard or custom browser. In each manifestation of the invention, the overriding goal is to preserve a substantially platform independent network interface between user systems and the server system (e.g., NICECAD server system 200).

Likewise, supplier user systems 230 may comprise any system that may interact with NICECAD server system 200 over network 260. Like prime contractor user systems 230, supplier user systems 230 may comprise any computer systems, including any of the systems listed above. In one embodiment, supplier user system 230 comprises a personal computer or workstation running a standard operating system such as Windows NT™, and using a standard browser such as Microsoft Explorer™ 5.0. As with prime contractor user systems 220, supplier user systems 230 may comprise a personal computer using a server-provided custom browser adapted for the present application. As with computer systems used by prime contractors, supplier user systems 230 may comprise a personal computer running semi- machine-dependent applications to be compiled and executed using a standard operating system.

Backup data storage 250 comprises a system for backing up the data stored by the NICECAD system 100. Backup data storage 250 may comprise several backup technologies for redundancy. Backup data storage 250 may include tape media, CD-ROM, zip drives, optical disks or any other reliable means for backing up the data maintained by NICECAD server system 200. Generally, backup data storage 250 may be data that is stored locally with NICECAD server system 200 or remotely. Furthermore, NICECAD server system 200, databases 210 and backup data storage 250 may comprise part of a distributed database system. In one embodiment, backup data storage 250 may comprise redundant storage onto high capacity tape and recordable CD-ROM.

Backup server hardware and software 240 comprises one or more backup servers, including server modules, to reliably support NICECAD server system 200 to minimize the impact of "crashes" and other events otherwise interfering with smooth operation. In one embodiment, at least one redundant server may be provided to substitute for NICECAD server system 200 should it fail. Generally, backup server hardware and software 240 may reside locally with NICECAD server system 200 (or a part of NICECAD server system 200, if it is distributed across several different servers, to be discussed below), although it may be physically remote, and may even be accessible through a different network address (e.g., at a different URL or web site).

Databases 210 depict the storage media that may be employed to store data maintained by the NICECAD system. Databases 210 may be one or more physically distinct media, including, but not limited to, hard drives, floppy drives, CD-ROM, and any other existing or future storage technologies supporting ready access. Databases 210 may store information for a concurrent engineering development project, such as contracts data, engineering data, account data and other project related data (further discussed below in conjunction with FIGS. 3–8). In one embodiment, databases 210 resides locally with NICECAD server system 200. In another embodiment, databases 210 is remotely located from NICECAD server system 200.

NICECAD server system 200 comprises a server system supporting the interactive collaborative engineering environment. NICECAD server system 200 interfaces with prime contractor user systems 220 and supplier user systems 230 through network 260. NICECAD server system 200 may include the hardware and software to support and interface with prime contractor and supplier user systems on a substantially platform independent basis. This minimizes user systems' requirements for specialized hardware or software capabilities. This substantial platform independence arises from the fact that NICECAD server system 200 provides certain specialized applications as either client-side machine-independent applications, such as Java™ applets or the like, executable using a standard browser (or by a custom browser supporting such applications), and/or as client-side semi- machine-dependent applications, such as those coded in Open GL™ or like coding tools, to be executed on a machine with a standard operating system. Ultimately, significant benefits of the invention derive from the fact that the user system interface with NICECAD server system 200 is substantially platform independent.

Generally, NICECAD server system 200 includes system administration and network-related software modules, as well as the various specialized software modules for CAD, EAS, multimedia communications and EC. Certain of the software modules may be client-side interactive for supporting specialized concurrent engineering tasks. For example, NICECAD server system 200 may also include the hardware and software for multimedia operations such as audio, video and graphics, that may be transmitted over the network for presentation to user systems with standard client-side multimedia support.

In one embodiment, NICECAD server system 200 may be publicly accessible as a web site, but may provide multiple levels of security (e.g., multiple "firewalls") to ensure that proprietary project data may be protected. For example, NICECAD server system 200 may be accessed only by users with a user ID and password. In one embodiment, the data transmitted is compressed and encrypted using encryption at least as reliable as that provided by RSA 1024 bit encryption keys, a technology well known to those of skill in the art. In one embodiment, NICECAD server system 200 may comprise a "back end" processing server running UNIX™ for the various database and specialized processing operations, and a "front end" web server running Windows NT™ and Microsoft's Transaction Server™ for network-related operations.

As illustrated in FIG. 2, the architecture of NICECAD server 200 may be distributed. In other words, hardware and software for the various NICECAD system functions is not necessarily resident on one server system at one physical location. Thus, in one embodiment, as depicted in FIG. 2, NICECAD server system 200 comprises several systems for hosting software for various functions, such as PDM server system 202 for product data management functionality; CAD/EAS server system 204 for computer aided design and engineering analysis and simulation; MM/EC server system 206 for multimedia communications support and electronic commerce; and network interface/system administration 208 for system administration and network related tasks. Moreover, these distributed systems may interface through network 265, which may comprise any of the network technologies discussed in connection with network 260. Of course, those of ordinary skill can appreciate that this particular distributed architecture is exemplary, and the particular embodiment of FIG. 2 is intended to express the general principle that all of the NICECAD server system 200 functionality need not be co-resident. In one embodiment, where the NICECAD system functions are distributed in this fashion, a single network address, such as an Internet address or URL or web site address, is used by the user systems. Access to other parts of the NICECAD system through network 265 is automated so that the system appears transparent or "seamless" to the user system.

The Database used by the System for Engineering Development

Figure 3:
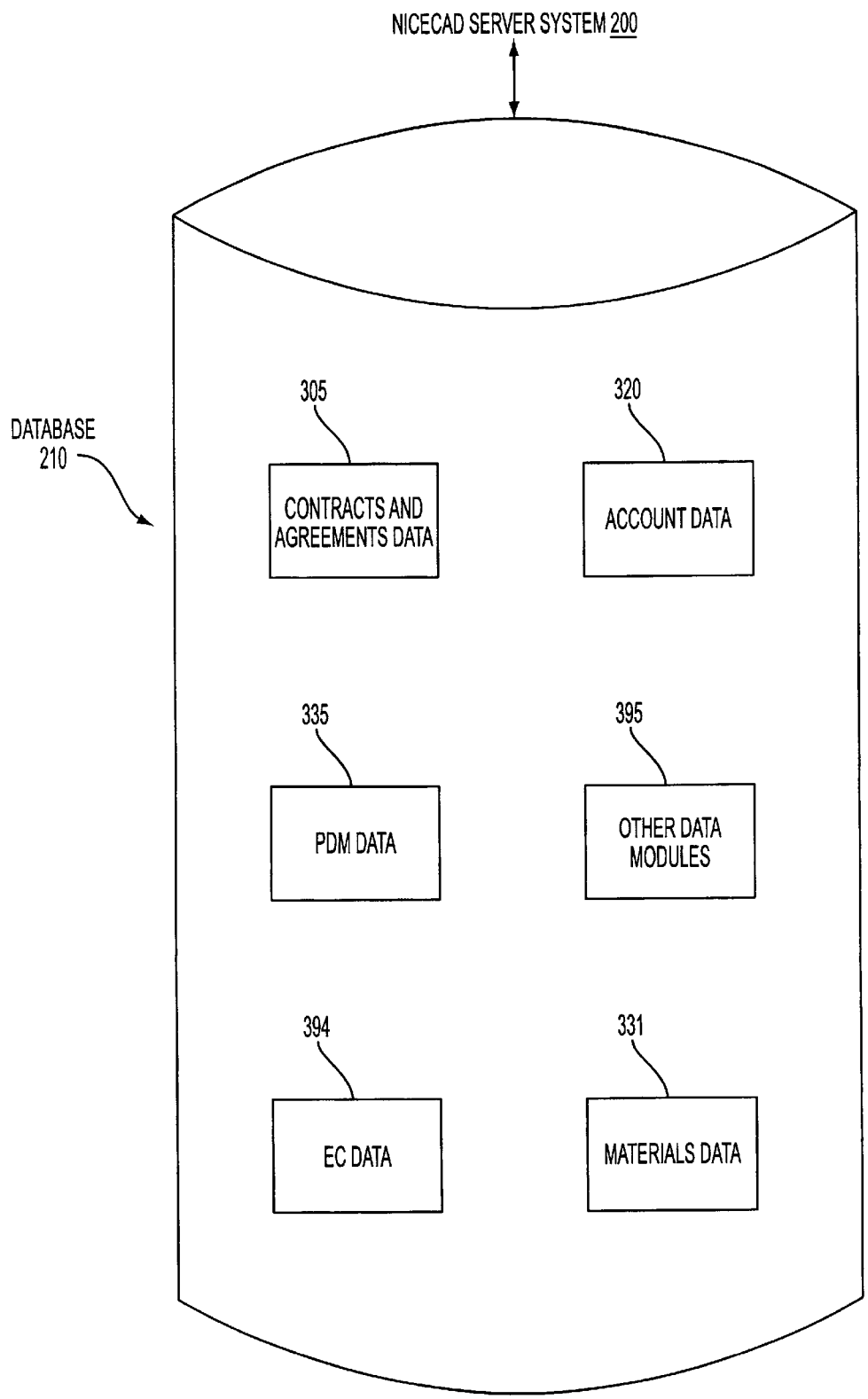
FIG. 3 is a block diagram, according to an embodiment of the present invention, illustrating a database including stored contracts and agreements data, account data, PDM data, electronic commerce data, materials data and other data.

FIG. 3 illustrates database(s) 210 maintained by NICECAD system 100, which may comprise contracts and agreements data 305; account data 320; materials data 331; electronic commerce data 394; PDM data 335; and optionally other data modules 395.

Figure 4:
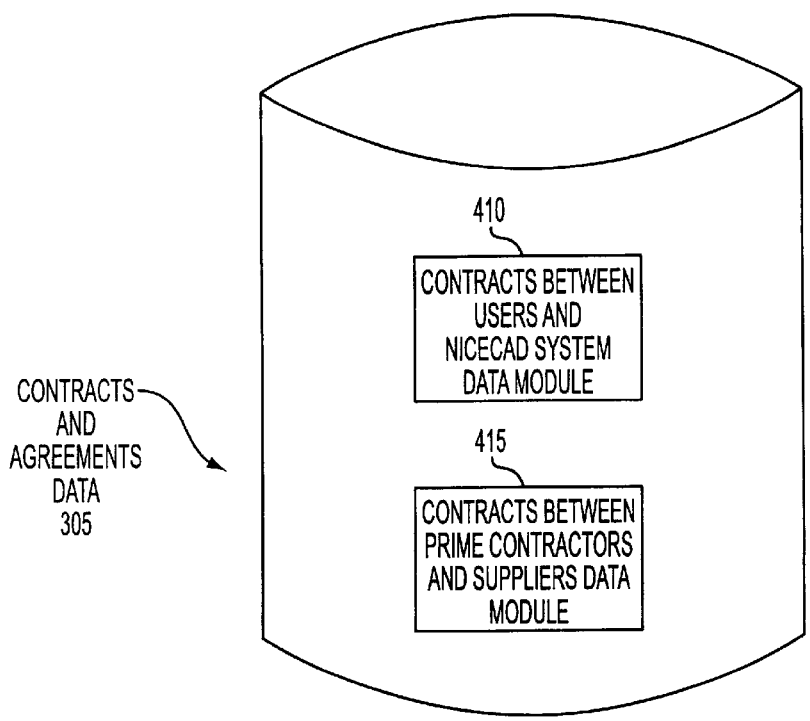
FIG. 4 is a block diagram, according to an embodiment of the present invention, illustrating stored contracts and agreements data of a database.

Contracts and agreements data 305 may comprise information stored by NICECAD server system 200 relating to contracts or agreements among the various actors. This data may comprise contracts between users and NICECAD system data module 410 and contracts between prime contractors and suppliers data module 415, as depicted in FIG. 4. The former may generally comprise those agreements regarding the terms of usage of the NICECAD system, such as fee structure, security, assignment of liability, and so on. The latter may contain records of contracts or agreements entered into between prime contractors and suppliers, or between suppliers. In one embodiment, such contracts may be prepared over the network by tailoring standard contracts and contract terms provided by the NICECAD system, further discussed in connection with FIG. 6.

Figure 5:
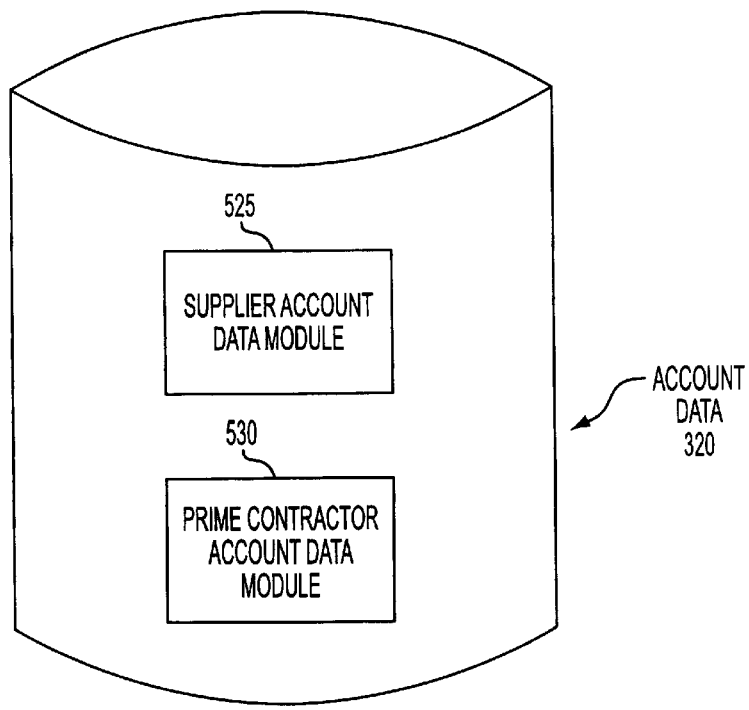
FIG. 5 is a block diagram, according to an embodiment of the present invention, illustrating account data of a database.

Account data 320 may comprise information stored by the NICECAD system pertaining to use by prime contractors and suppliers. For example, the information may comprise records reflecting all user transactions, including billing information, so that a complete history associated with a particular project is available. In one embodiment, every concurrent engineering development project is assigned an identifier, such as project number or project name, which may be used to retrieve account records in a relational database arrangement. In one embodiment, account data 320 may be logically divided into supplier account data module 525 and prime contractor account data module 530, as illustrated in FIG. 5.

Figure 6:
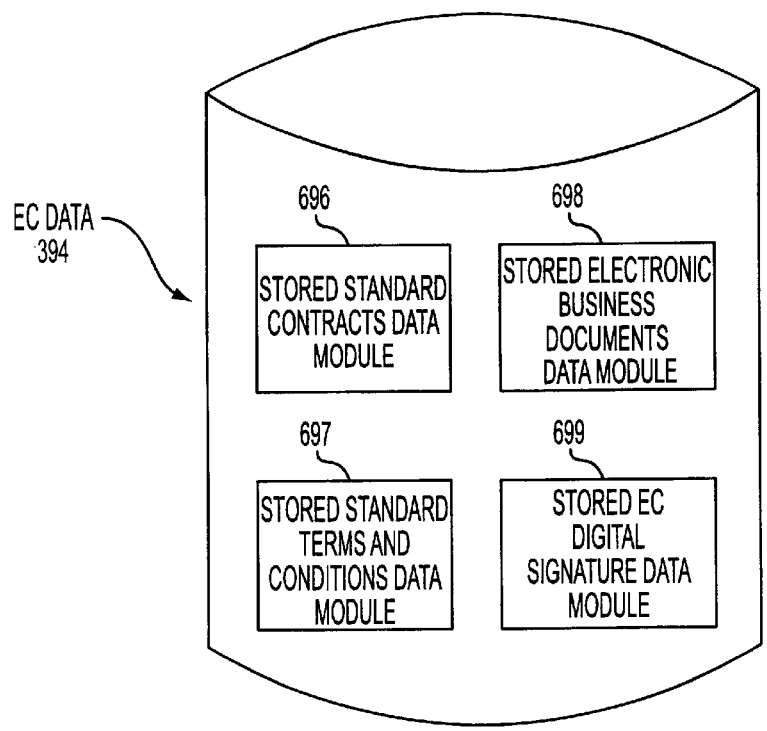
FIG. 6 is a block diagram, according to an embodiment of the present invention, illustrating electronic commerce data of a database.

Electronic commerece (EC) data 394 may comprise data related to electronic commerece transactions carried out using NICECAD system 100. The NICECAD server system 200 may be configured to allow business transactions pertaining to the engineering development effort to be carried out in the virtual environment, such as negotiations, contracting, and funds tranfer. EC data 394 may be used to store records of such transactions, and may comprise stored standard contracts data module 696; stored standard terms and conditions data module 697; stored electronic business documents data module 698; and stored EC digital signature data module 699, as illustrated in FIG. 6.

Stored standard contracts data module 696 may comprise a series of contract "templates" for prime contractors and suppliers to use as a starting point for creating an agreement. For example, in one embodiment there is a standard form agreement for a fabricator to produce a quantity of prototypes of a design within some time-frame. There may be another standard form contract for an EAS team to perform some specified analysis on a design. Stored standard terms and conditions data module 697 may comprise various terms and conditions to be used in preparing an agreement including such things as liquidated damages, arbitration clauses, procedures for engineering changes, and the like. Those of ordinary skill can appreciate that module 696 may be used with or without module 697, and that said modules could easily be combined.

Stored electronic business documents data module 698 may comprise documents or records related to all EC transactions. For example, when a prime contractor transfers funds to a supplier, a record may be stored in this module. If standard form contract or standard terms and conditions data is accessed, a record may be stored. If a contract is actually entered into using the NICECAD system 100, a record may be stored. In general, this module ensures that NICECAD system 100 provides an electronic "paper trail" that provides a history of the business transactions carried out using the NICECAD system.

Stored EC digital signature data module 699 may comprise data of a "digital signature" required to formalize agreements between users. Analogous to the usual process, an agreement may be considered finalized when the parties provide their digital signature signifying their assent to the terms.

Figure 7:
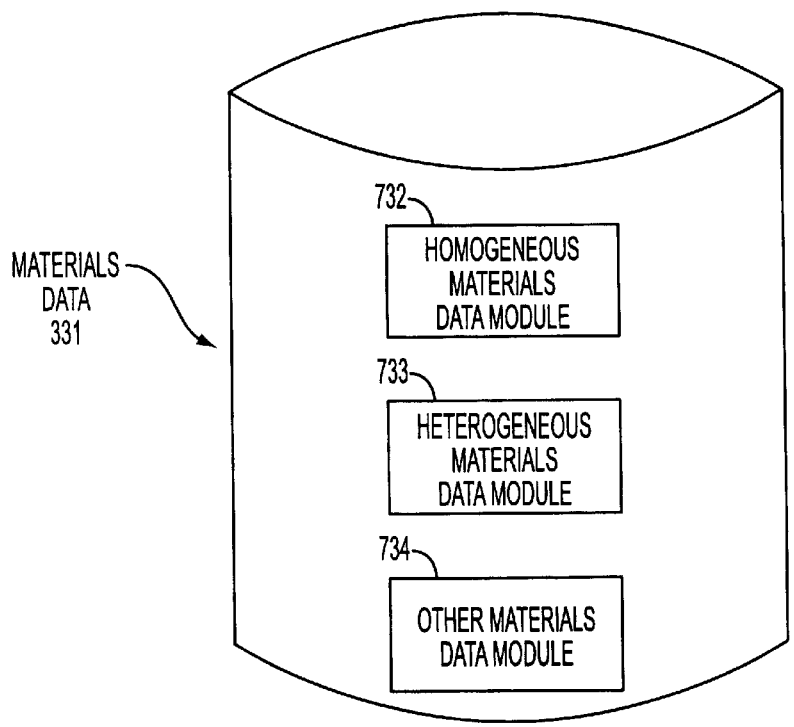
FIG. 7 is a block diagram, according to an embodiment of the present invention, illustrating materials data of a database.

Materials data 331 may contain information relating to materials that may be used to fabricate a part design model and may be used as a reference tool for designers, analysts and fabricators. Materials data 331 may contain property data as well as applications data. For example, materials data 331 may have an entry for a titanium alloy identifying properties such as elastic modulus, tensile strength, hardness, machinability, ductility or other properties. Materials data 331 might contain applications data for the titanium alloy, such as its limitations when used in a high oxygen environment. As illustrated in FIG. 7, materials data 331 may be logically subdivided into homogeneous materials data module 732 for homogeneous materials; heterogeneous materials data module 733 for heterogeneous materials; and other materials data module 734 for materials not easily classified. For example, properties and/or applications data for materials like metals, plastics, ceramics and the like, may be stored in module 732. Properties and/or applications data for materials like carbon fiber-epoxy or Kevlar™ composites may be stored in module 733.

Materials data 331 may be used as a reference source or it may be used in conjunction with the CAD tools to create a design. For example, materials data 331 may be used by a design team to assign or associate certain materials with entities of a part design model (such as a 3D solid model). Subsequently, a fabricator team analyzing the 3D solid model (e.g., when analyzing the design to prepare a bid) may ascertain that a particular material is to be used for a particular entity, and then may learn about applications and properties of that material by accessing materials data 331.

Figure 8:
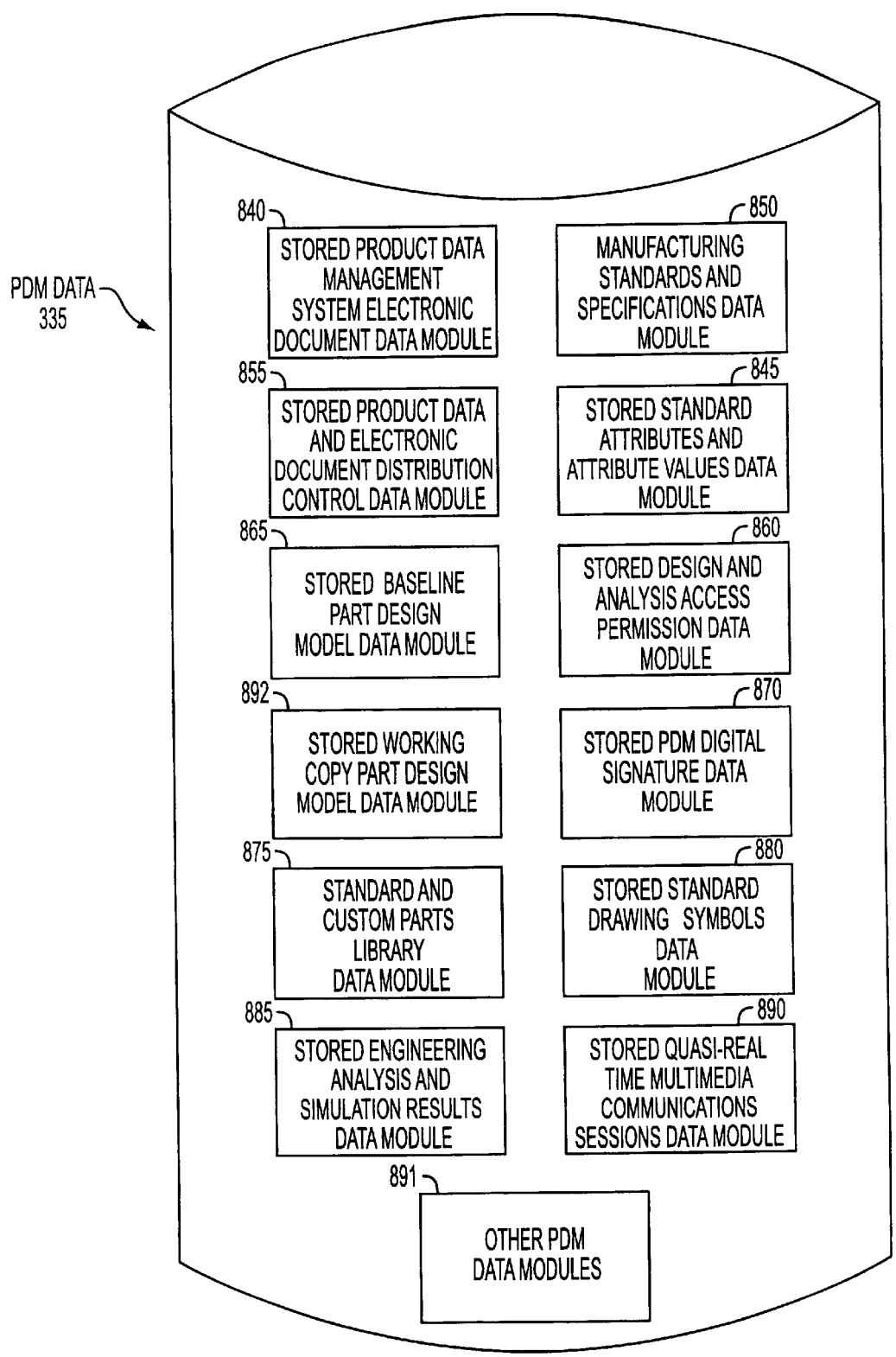
FIG. 8 is a block diagram, according to an embodiment of the present invention, illustrating PDM data of a database in greater detail.

PDM data 335 may contain the data stored for individual concurrent engineering development projects. Broadly speaking, the concept of PDM is to create an information infrastructure for the entire history of an engineering effort, including technical data (such as the design evolution and analysis/simulation results), as well as business or management data (such as contracts and budget/schedule information). Accordingly, PDM data 335 may include modules with project specific data (such as part design models for particular projects) and non- project specific data (such as reference modules to facilitate creating part design models). PDM data 335 may comprise the following modules: stored product data management system electronic document data module 840; stored product data and electronic document distribution control module 855; stored design and analysis access permission data module 860; stored baseline part design model data module 865; and stored working copy part design model data module 892; standard and custom parts library data module 875; stored engineering analysis and simulation results data module 885; manufacturing standards and specifications data module 850; stored standard attributes and attribute values data module 845; stored 880; stored quasi-real time multimedia communications sessions data module 890; and other PDM data modules 891, as illustrated in FIG. 8.

Stored product data management system electronic document data module 840 may comprise non-graphic project documents, such as project specifications, change documents, revision history documents, and budget and schedule documents. Change documents refers to any documents that may be prepared to implement a design change. For example, in Department of Defense applications, such documents are sometimes referred to as "engineering change proposals" or "engineering change orders." Revision history documents refers to any documents that list or provide a history of design changes.

Stored product data and electronic document distribution control data module 855 may comprise a module for maintaining "check-in/check-out" records that document when team members access certain documents in NICECAD system 100. In one embodiment, every time a user accesses or "checks out" a specification or part design model, a "time-stamp" and team member identifier is stored in this module (e.g., see FIG. 11, module 1104). This serves configuration management by providing an electronic "paper trail."

Check-in/check-out controls generally refers to the procedures employed by the NICECAD system to control access to proprietary part design model and specification data. As will be discussed further below, the prime contractor may assign access permissions to part or all of the part design model, project specification, and the EAS processing modules. This ensures that the prime contractor has control over which teams access which data, and which teams run which analysis. Whenever an authorized team member accesses the part design model or specification, the team member is said to have "checked out" that item. Once the team member completes the task, he/she may have to "check in" the item by informing the NICECAD system that the task is complete. By updating the check-in/check-out data in stored product data and electronic document distribution control data module 855, the NICECAD system provides configuration control by maintaining a history of which teams have accessed which part design models and documents.

It is important to appreciate that check-in/check-out records may still be maintained even if an approval authority does not limit access to the part design model, specifications, or EAS processing modules.

Stored design and analysis access permission data module 860 may comprise data assigned by the prime contractor determining which teams (or team members) may access the part design model, documents and EAS processing modules. The module may also comprise data determining which teams may access certain project documents, such as specifications. A part design model generally comprises a series of geometric and topological entities. Teams, such as EAS teams, may need access to all or part of a part design model in order to carry out the analysis for their specific discipline. They may need to access specifications or other documents to perform their tasks. Likewise, those teams may need to access one or more EAS processing modules to carry out the analysis. Stored design and analysis access permission data module 860 allows an approval authority to assign access permissions to limit access to those portions of the part design module, those specifications (or portions thereof), and those EAS processing modules as appropriate. This serves configuration control by limiting access to only those who need it.

Stored baseline part design model data module 865 may contain the current approved version of the design referred to as the "baseline." Each time a design change is approved by the prime contractor, the baseline part design model may change. A part design model may be created using the NICECAD CAD capability, and generally comprises a series of entities (e.g., topological or geometric features) which may be assigned attributes and attribute values. Attributes include such items as tolerance, surface finish, material, special fabrication instructions, etc. In general, stored baseline part design model data module 865 may contain the part design models, such as 3D solid models, including attributes, for the projects in NICECAD system 100. In one embodiment, this module may contain the entire history of baseline designs, each of which is assigned a version number for tracking purposes (e.g., Design 1.00, 1.01, 1.02, etc.). The latest version number may be the current baseline design.

Stored working copy part design model data module 892 may be used by designers and analysts as a virtual "scratch pad" for storing part design models. For example, an EAS team member who checks out the current baseline part design model from module 865 may not be permitted to "check in" that part design model. This is because it may be that only the prime contractor can authorize writing a baseline part design model to module 865. This provides configuration control and protects the integrity of the current baseline part design model. However, the EAS team member may use stored working copy part design model data module 892 to store a "working copy" of the part design model. For example, if a fabricator team analyzing producibility determines that certain design changes should be effected, a proposed revised baseline part design model may be stored in this module. Project team members may also use this module to temporarily store working copies of the baseline part design model while they are completing their analysis. This way the team member does not have to go through the check-out procedures repeatedly while performing the same analysis. In one embodiment, the working copies stored in this module by NICECAD server 200 are assigned working copy version numbers. In another embodiment, the working copy version numbers are maintained so that there is a complete history of all working copies of the part design model in the NICECAD system.

Standard and custom parts library data module 875 may comprise a library of "pre-built" standard and custom parts that may be accessed by designers to include in larger part design models. Availability of such data may expedite the design creation and modification process (e.g., see FIG. 9, module 932). Standard parts may include such common items as fasteners, gears, bearing sets and the like. Custom parts may include parts previously built by prime contractors or suppliers that are saved for use in later projects. For example, a sonobuoy manufacturer may save a series of custom parts for various configurations of sound-detecting underwater hydrophones.

Stored engineering analysis and simulation results data module 885 may comprise data stored by the NICECAD system reflecting the results of engineering analysis performed by EAS teams. The EAS analysis may be performed using internal NICECAD processing modules (e.g., see FIG. 9, module 946) or external processing modules. Stored engineering analysis and simulation results data module 885 ensures that the virtual NICECAD collaborative engineering environment includes a record of analysis performed on a part design model. Those of ordinary skill should appreciate that the term "engineering analysis and simulation" is generally descriptive of studies performed by various teams considering a design. The term is not meant to suggest that analysis and simulation are discrete tasks or disciplines. Some studies may involve only analysis of a design; some may involve only simulation of the operation or manufacture of a design; and some studies may require both simulation and analysis.

Manufacturing standards and specifications data module 850 may comprise fabrication standards, inspection standards and other standards. For example, to support Department of Defense applications, this module may contain various MIL-STD or MIL-SPEC documents defining such things as manufacturing standards, inspection standards, reliability, quality assurance, safety, and so on. This module may be used as a reference source providing users the text of the standards and specifications. This module may be used by designers to associate particular standards with graphical entities of a part design model. In one embodiment, a design team member may associate a standard (e.g., MIL-STD-5556.8) with a particular graphical entity when creating a part design model. When viewing the design using a CAD tool (e.g., see FIG. 9, module 932) a fabricator team member may see the standard associated with a particular entity that may be "clicked on" to link to the text of the standard.

Stored standard attributes and attribute values data module 845 may comprise a series of standard attributes and attribute values for use by a designer in creating a design. As previously mentioned, a part design model may comprise a series of geometrical and topological entities. Each entity may be assigned its own attributes, such as surface finish, material, tolerance, and the like. For some attributes, each attribute is given a value or category. For example, tolerance may be given a tolerance type (e.g., flatness, linear, angular, runout, etc.) and a tolerance range. For surface finish, a surface finish value is assigned. Stored standard attributes and attribute values data module 845 may be used in connection with a CAD tool (e.g., see FIG. 9, module 932) so that a designer may rapidly create an initial design including the assignment of attributes to the part design model entities.

Stored PDM digital signature data module 870 may comprise digital signatures, well known to those of skill in the art, by the "approving authority" for the part design model. In conventional collaborative engineering environments, the "approving authority" (usually the prime contractor) signifies approval of the baseline part design model and associated specification documents by affixing a written signature. In the virtual NICECAD environment, a digital signature may be associated or included to certify approval of certain items, such as the approved current baseline part design model, the approved final part design model submitted for fabrication, and various supporting specification documents. This digital signature feature aids configuration control by providing a quick and effective way to determine whether a particular electronic file represents an "approved" version or is a mere working copy (or proposed redesign). In one embodiment, design changes require a digital signature by the approving authority, whereby a new design must include the proper digital signature (e.g., a key) before it may be stored in stored baseline part design model data module 865. In other embodiments, digital signatures may not be required.

Stored standard drawing symbols data module 880 may comprise a series of standard drawing symbols, such as ASME Y14.5 symbols. These symbols may be used by a designer in creating a part design model using the CAD tool (e.g., see FIG. 9, module 932). In one embodiment, where the CAD tool includes a custom design visualization functionality (e.g., see FIG. 12, module 1210, discussed below), stored standard drawing symbols data module 880 may be automatically accessed by NICECAD server system 200 to provide the proper drawing symbols for a two-dimensional sectional view of a 3D part design model.

Stored quasi-real time multimedia communications sessions data module 890 may comprise records data of multimedia communications sessions (e.g., see FIG. 9, module 978) between teams members in a concurrent engineering development project. For example, if a design team and EAS team have a multimedia communications session using the NICECAD system to discuss certain design issues, a record may be stored reflecting the session. In one embodiment, data reflecting the actual transactions (such as audio, video and graphics) may be stored for a session. In another embodiment, memory resources are preserved by storing only descriptive information, such as the identity of the parties, duration of the session, part design model version numbers accessed and the like.

Other PDM data modules 891 may comprise any other data modules in PDM data 335. Other data modules 395 may comprise any other data modules in database 210.

The NICECAD Server System

Figure 9:
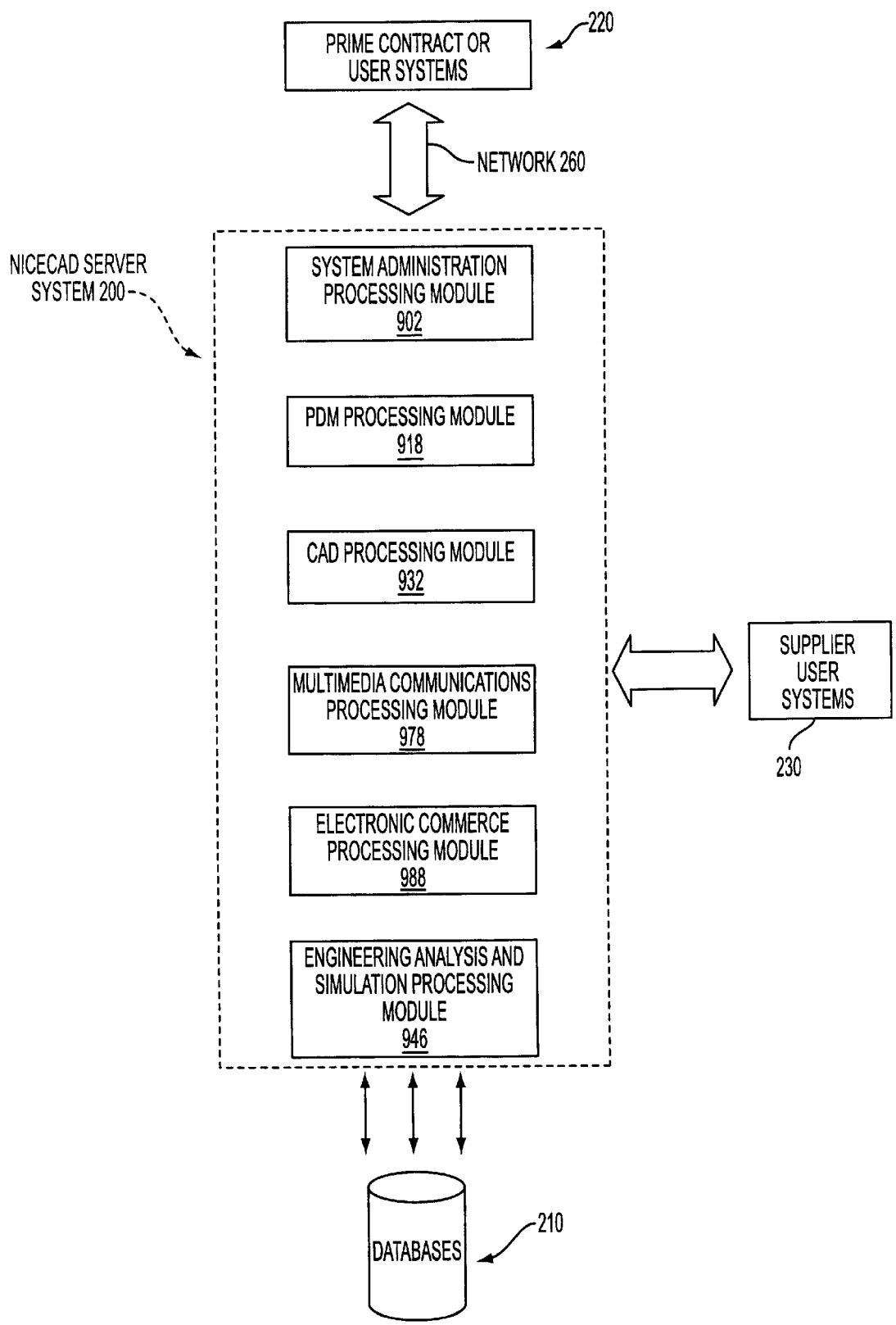
FIG. 9 is a block diagram, according to an embodiment of the present invention, illustrating a NICECAD server system, including its processing modules.

FIG. 9 illustrates NICECAD server system 200, which may comprise various software components or modules supporting processing functions. At the outset, it should be noted that in one embodiment, user access to the processing modules of FIGS. 9–15 may be via platform independent graphical user interfaces (e.g., browser pages) presented to the user's standard or custom browser. In another embodiment, user interface to processing modules may be further enabled by the provision of platform independent miniapplications (e.g., Java™ applets or the like) that may be run on user stations. Such applications may reduce or eliminate the need for specialized hardware/software at user stations, may provide client/server interactivity, and may be used to reallocate processing burdens between the server system and user systems. For example, applications involving 3D graphics presented at user stations and/or the transmission of 3D graphics between user stations and NICECAD server system 200 can be implemented using a high-level platform independent 3D graphics programming tool such as Java 3D™ 1.1 API.

As noted previously, in one embodiment user access to the processing modules of NICECAD server system 200 is facilitated using a custom browser specially adapted for the present application. Additionally, certain client-side applications are better provided as semi- machine-dependent applications that are compiled and executed using a standard operating system, although not via the "virtual machine" provided by a standard browser. For example, certain graphics-intensive applications, such as those for supporting the invention's virtual CAD and multimedia video/audio/graphics capability, ay be provided as Open GL™-coded applications rather than Java 3D™-coded applets.

It bears reiteration that NICECAD Server System 200, primarily for design development, and GMR Server System 1000 (discussed below), primarily for locating qualified fabricators, and GMR Graphics Server 2710 (discussed below), primarily for the bidding process, may exist at the same location on the same server system. In the preferred embodiment, the overall system provides a comprehensive functionality, hosted on a single system, for the entire product development lifecycle, from initial idea by a prime contractor/designer to production in quantity by an out-sourced fabricator. For illustrative purposes, we describe the various functional components as residing on separate servers, although this architecture is not required, and in the preferred embodiment, the three aspects of the invention are integrated into a substantially "seamless" virtual environment.

As illustrated by FIG. 9, NICECAD server system 200 may comprise system administration processing module 902; PDM processing module 918; CAD processing module 932; multimedia communications processing module 978; electronic commerce processing module 988; and engineering analysis and simulation processing module 946.

System Administrative Processing in the NICECAD System

Figure 10:
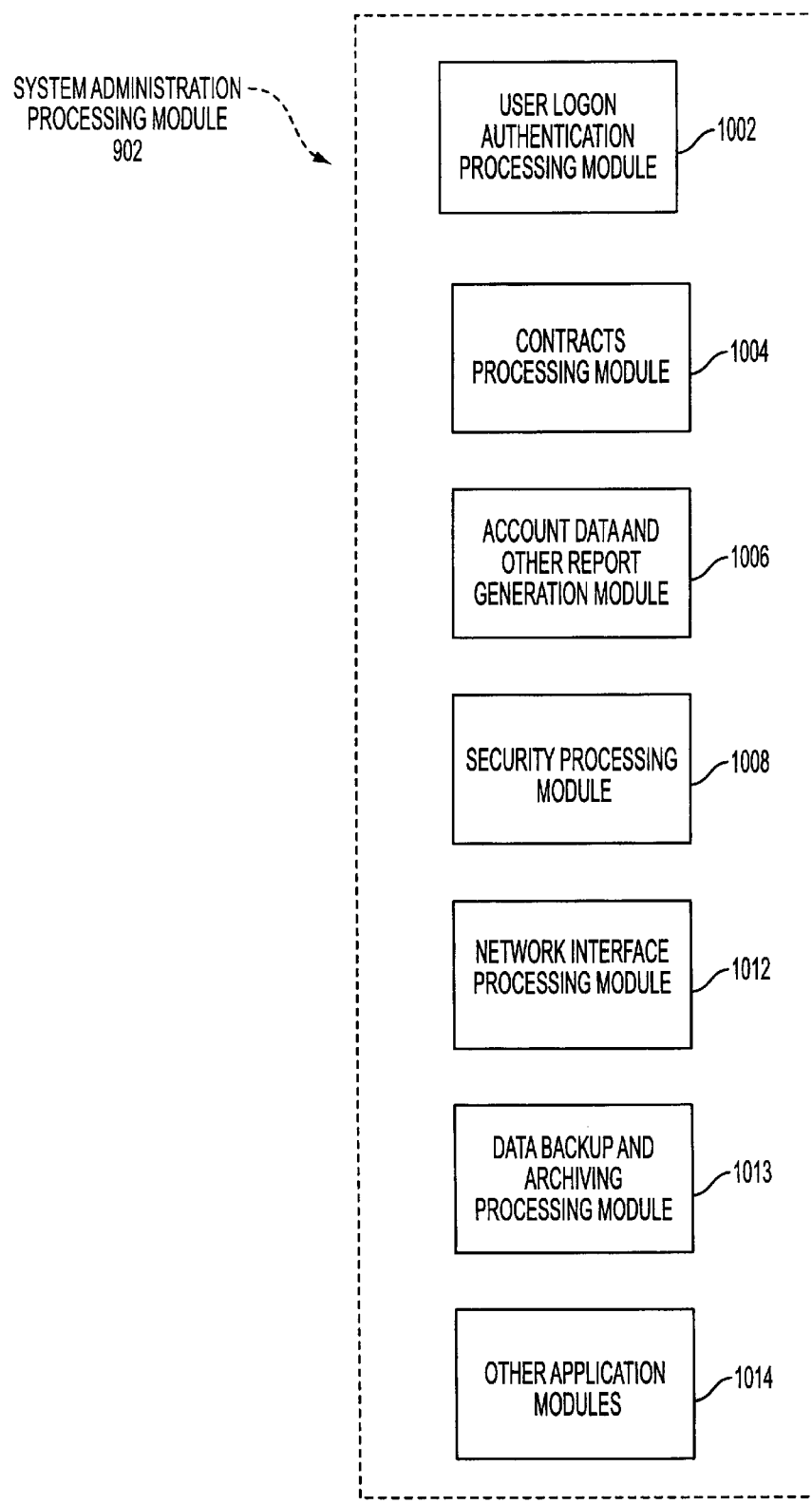
FIG. 10 is a block diagram, according to an embodiment of the present invention, illustrating a system administrative processing module of a NICECAD server system.

System administration processing module 902 generally supports system administrative processing and network related processing, and, as depicted in FIG. 10, may further comprise user logon authentication processing module 1002; contracts processing module 1004; account data and other report generation module 1006; security processing module 1008; network interface processing module 1012; data backup and archiving processing module 1013; and other application modules 1014.

User logon authentication processing module 1002 may comprise a security module for limiting access to the NICECAD system. User logon authentication module 1002 may enable a user to enter a user ID and password to log onto NICECAD system 100. Other security modules may also be provided. In one embodiment, a prime contractor initiates a development project on NICECAD system 100 and accordingly identifies the various teams (and team members). This module then gives the various team members authorization to log onto the system for a given project.

Contracts processing module 1004 may comprise a module that ensures that before a prime contractor or supplier uses NICECAD system 100, contracts specifying the responsibilities of each party regarding data protection, maintenance and system usage are formalized (e.g., see FIG. 4, module 410). In one embodiment, contracts processing module 1004 includes a platform independent client-side Java™ applet (or like miniapplication) that may be launched at user stations to facilitate the contract execution process.

Account data and other report generation module 1006 may comprise a module that formats and sends reports requested by users that, in one embodiment, may be sent as browser pages or links to downloadable files. This module may prepare reports of records of transactions on the NICECAD system or billing summaries. (See, e.g., FIG. 5, module 320). In one embodiment, a prime contractor may retrieve reports pertaining to all transactions relating to a given project, while suppliers may retrieve reports only pertaining to their own activity.

Security processing module 1008 may comprise a module for providing security for NICECAD system 100. It is important that project data and multimedia communications sessions are secure, so this module may provide multiple firewalls, encryption, hashing, or other known information technology security techniques to protect data and communications. In general, project data may be treated as proprietary to the prime contractor, and security processing module 1008 provides the proper safeguards. In one embodiment, security processing module 1008 may comprise a software component using Java™ Cryptography Extension (JCE) 1.2 and Java™ 2 for encryption and/or message authentication. In the preferred embodiment, data is compressed and also encrypted using technology at least as reliable as that provided by RSA 1024 bit encryption keys.

Network interface processing module 1012 may comprise a module for supporting the interface with user systems over network 260, or for interface with other parts of NICECAD server system 200 via network 265. In one embodiment, network interface processing module 1012 supports the interface with user systems on a substantially platform independent basis using browser pages or the like. In this manner, user interface with NICECAD server system 200 is achieved using more or less standard hardware and software. As previously noted, such browser pages may be configured to interface with a so-called standard, commercially available browser (e.g., Netscape™ or Microsoft Explorer™) or a custom browser specially adapted to support the graphics-intensive networked CAD and multimedia communications aspects of the present invention.

Data backup and archiving processing module 1013 may comprise a module supporting periodic backing up and archiving of data (e.g., see FIG. 2, module 250). This module may also support the resort to backup server hardware and/or software (e.g., see FIG. 2, module 240) when there are system crashes or other interruptions in availability of the primary server hardware and software (e.g., see FIG. 2, module 200).

Other application modules 1014 may comprise any other application modules run by NICECAD server system 200 to support system administration related tasks.

Product Data Management Processing in the NICECAD System

Figure 11:
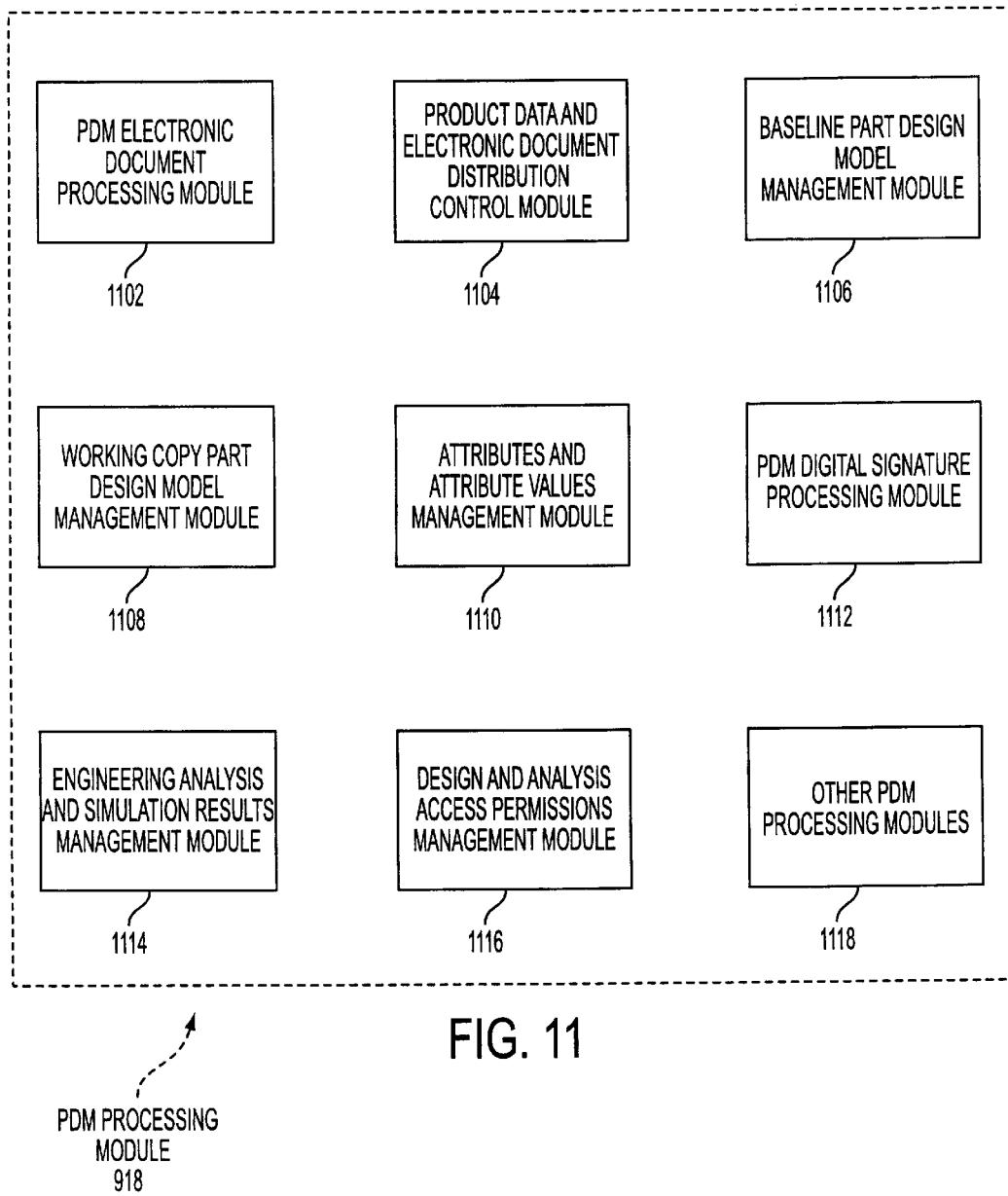
FIG. 11 is a block diagram, according to an embodiment of the present invention, illustrating a PDM processing module of a NICECAD server system.

PDM processing module 918 provides the processing associated with the NICECAD system's PDM functionality, and, as depicted in FIG. 11, may include PDM electronic document processing module 1102; product data and electronic document distribution control module 1104; baseline part design model management module 1106; working copy part design model management module 1108; attributes and attribute values management module 1110; PDM digital signature processing module 1112; engineering analysis and simulation results management module 1114; design and analysis access permissions management module 1116; and other PDM processing modules 1118.

PDM electronic document processing module 1102 may comprise a module that implements the general PDM capability of NICECAD system 100. This module may provide for the data management and configuration control of non-graphic project documents such as project specifications, change documents or revision history documents (e.g., see FIG. 8, module 840). In one embodiment, PDM electronic document processing module 1102 comprises a substantially COTS (commercial off-the-shelf) software package tailored for NICECAD system 100.

Product data and electronic document distribution control module 1104 carries out the check-out/check-in management procedures of the NICECAD system (e.g., see FIG. 8, module 855). As mentioned previously, the check-in/check-out procedures ensure the integrity of the part design model and associated specification documents. This module may provide that each time a controlled item, such as a part design model or a specification document, is accessed from the NICECAD system, a record is stored reflecting that transaction. In one embodiment, this record may comprise a time-stamp and user ID.

Baseline part design model management module 1106 may be a module that provides data management of the baseline part design model. In general, baseline part design model management module 1106 may be integrated with or may cooperate with a CAD processing module (e.g., see FIG. 9, module 932) so that the latter provides the substantive CAD capability and the former provides the PDM functionality. Baseline part design model management module 1106 may be integrated with a data module such as that of FIG. 8, module 865, to store the baseline part design model. In one embodiment, configuration control is furthered by having the NICECAD server system 200 configured so that baseline part design model management module 1106 permits only one category of user, such as approval authority users, to create or make changes to the baseline part design model. This module (1106) may cooperate with product data and electronic document distribution control module 1104 to enforce the check-in/check-out procedures. This module (1106) may provide that each version of the baseline part design model is given a version number.

Working copy part design model management module 1108 is similar to baseline part design model management module 1106, except that the former manages the data associated with so-called "working copies" of the part design model (e.g., see FIG. 8, module 892). This module may provide PDM management when cooperating with a CAD processing module that provides substantive CAD processing to a user relying on a working copy. This module may provide that each version of a working copy part design model is given a version number.

Attributes and attribute values management module 1110 may comprise a module that provides PDM management of attributes and attribute values (e.g., see FIG. 8, module 845) inputted by a user. This module may provide that attributes and attribute values assigned to a part design model be stored with the part design model (e.g., see FIG. 8, modules 865 and 892) or in a separate location. This module may cooperate with a CAD processing module (e.g., see FIG. 12, module 932) that permits a user to view the part design model and assign attributes and attribute values to selected entities. In one embodiment, this module cooperates with a platform independent client-side application (such as a Java™ applet running on a browser) or a semi- machine-dependent application that permits the user to view the part design model and assign attributes and attribute values by selecting entities with a mouse or like device.

PDM digital signature processing module 1112 may comprise a module for managing the digital signature data in NICECAD system 100. In one embodiment, this module provides the user a platform independent application, such as a Java™ applet, that permits the user to append or associate a digital signature with a part design model or document (such as a project specification). The digital signature component (e.g., the key) known to the user is uploaded to the NICECAD system, where PDM digital signature processing module 1112 ensures that it is properly validated and that appropriate records of the signing are made (e.g., see FIG. 8, module 870). In one embodiment, PDM digital signature processing module 1112 may comprise a software component using Java™ Cryptography Extension (JCE) 1.2 and Java™ 2 for creating the digital signatures.

Engineering analysis and simulation results management module 1114 may be a module that manages the EAS results for the NICECAD system (e.g., see FIG. 8, module 885). This module may cooperate with modules that perform the substantive EAS processing (e.g., see FIG. 15, module 946).

Design and analysis access permissions management module 1116 may comprise a module that provides the processing to allow a prime contractor or approval authority to assign access permissions to various teams or team members. This module may provide the processing to determine whether access is granted or denied when a data request is made. In one embodiment, NICECAD server system 200 facilitates the access assignment process by providing a platform independent interactive application, such as a Java™ applet, that lists various project data (such as the part design model and project specifications) and EAS processing modules, and the various team members. The prime contractor, through the use of keyboard input, "mouse," or similar device, may then assign viewing permissions for each item, which are then uploaded to the NICECAD server system 200 (e.g., see FIG. 8, module 860).

Other PDM processing modules 1118 refers to any other PDM processing modules for managing the data in a concurrent engineering development project.

Computer Aided Design (CAD) Processing

At the outset, it should be appreciated that CAD processing module 932 may be used by design and analysis team members during the design and development phase to create, analyze and modify a part design model represented as a three dimensional solid model file or the like. CAD processing module 932 may also be linked to the second aspect of the overall system (GMR database searching for qualified fabricators) insofar it provides a means to create and/or upload models for a part design that will be analyzed using the producibility logic to be discussed below in connection with FIGS. 20–25. Alternatively, the conversion utility of CAD processing module 932 could be used to upload and convert for storage in a neutral format a part design model already in existence (i.e., not initially created using the NICECAD collaborative, virtual environment). CAD processing module 932 may also be linked to the third aspect of the overall system (Electronic Trading Community) insofar it provides a means to create (or upload and convert a previously created part design model) and store a part design model that will be made available to fabricators preparing bids for a fabrication effort.

As previously discussed, computation- and graphics-intensive applications, such as the present inventions CAD functionality, may be provided according to several possible embodiments, each of which pursues the goal of a substantially independent network interface between user systems and a central server system. For example, in one embodiment, CAD processing module 932 and user systems (e.g., prime contractor user systems 220 or supplier user systems 230) interface through standard or server-provided custom browsers with 3D part design model graphics presentation and manipulation facilitated using server-supplied (e.g., by CAD processing module 932) Java™ applets (or like miniapplications which can be executed on a browser). In another embodiment, so-called semi- machine-dependent applications may be provided by CAD processing module for execution on a user system with a standard operating system to support demanding graphics applications.

Figure 12:
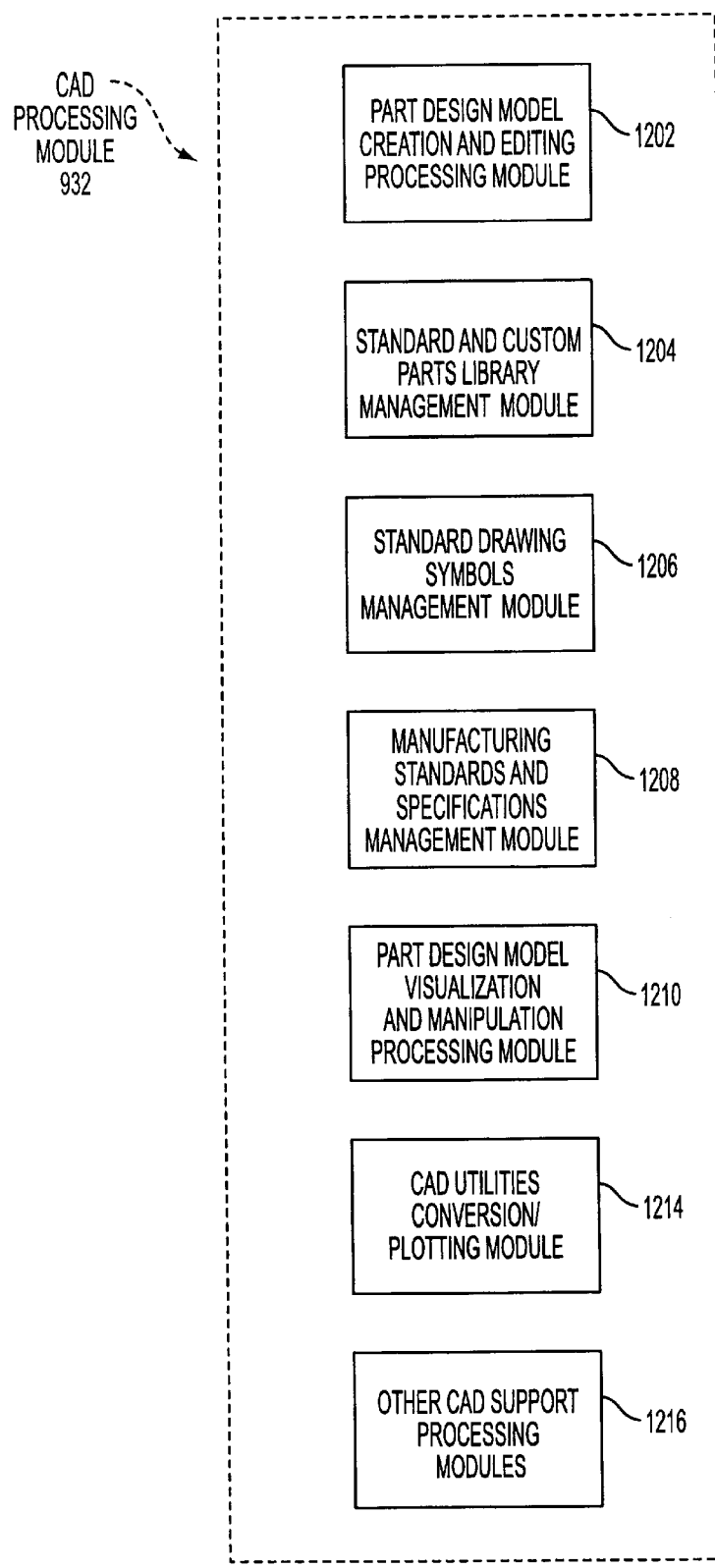
FIG. 12 is a block diagram, according to an embodiment of the present invention, illustrating a CAD processing module of a NICECAD server system.

CAD processing module 932 may be a module for supporting the CAD processing capability of NICECAD system 100 and, as depicted in FIG. 12, may further comprise part design model creation and editing processing module 1202; standard and custom parts library management module 1204; standard drawing symbols management module 1206; manufacturing standards and specifications management module 1208; part design model visualization and manipulation processing module 1210; CAD utilities conversion/plotting module 1214; and other CAD support processing modules 1216.

Part design model creating and editing processing module 1202 is a module that may provide the capability for a user to create and modify part design models, such as 3D solid models. In one embodiment, this module includes a platform independent client side application, such as a Java™ applet, so that the user may rely on standard hardware and software, including a standard graphical interface (such as a web browser), in order to create and modify part design models. In one embodiment, part design model creating and editing processing module 1202 comprises a commercially available software product, such as Mechanical Desktop™ from AutoDesk, SolidEdge™ from Unigraphics, or Quick HDL or Autologic HDL™ from Mentor Graphics Corp., that has been customized and implemented for a server-based networked application. In one embodiment, the provision of graphics (such as 3D graphics) over network 260 is implemented using graphics applications known in the art, such as Java 3D™ 1.1 API (Application Programming Interface), which can be used for creating and manipulating geometry of 3D graphical objects. As previously noted, another embodiment provides that particularly demanding graphics applications be provided as semi- machine-dependent applications, such as those coded in Open GL™, provided to user systems for execution. As before, the overriding goal is to maintain a substantially user platform independent network interface, preserve data neutrality, and focus the processing (computational) burden on the server system rather than the user systems.

Standard and custom parts library management module 1204 may be a module that coordinates the use of a library of standard and custom parts by a team member creating a design (e.g., see FIG. 8, module 875). In one embodiment, this module represents a custom feature added to or integrated with a commercially available CAD product, as discussed above.

Standard drawing symbols management module 1206 may be a module that coordinates the use of a library of standard drawing symbols by a team member creating a design (e.g., see FIG. 8, module 880). In one embodiment, this module represents a custom feature added to or integrated with a commercially available CAD product, as discussed above. This module may also associate the proper drawing symbols with entities of a part design model that is depicted as a two-dimensional section after being subjected to the "virtual cutting tool" (discussed further below in connection with module 1210).

Manufacturing standards and specifications management module 1208 may be a module that coordinates the use of a library of standards and specifications by a team member creating a design (e.g., see FIG. 8, module 850). In one embodiment, this module represents a custom feature added to or integrated with a commercially available CAD product, as discussed above. For example, the embodiment of part design model creation and editing processing module 1202 using a Java™ applet or the like may be linked to manufacturing standards and specifications management module 1208. In this embodiment, a user creating a part design model can readily assign standards and specifications to graphical entities. In another embodiment, this module permits a user viewing a design (such as a fabricator evaluating a design in order to develop a bid) to link from an attribute associated with an entity to the underlying specification or standard.

Part design model visualization and manipulation processing module 1210 may be a module that permits users to manipulate (e.g., translate, rotate, etc.), "mark up" and "cut" a part design model, such as a 3D solid model. This capability may be considered a supplement to the basic CAD functionality of part design model creation and editing processing module 1202. "Mark up" refers to comments or marks that may be appended to the part design model, which may be especially usefull when engaged in an interactive multimedia session (see FIG. 19, below). Part design model visualization and manipulation processing module 1210 may permit software "cuts" using a "virtual cutting tool" to provide two-dimensional (2D) sections of a 3D part design model. The 2D sections may be appended with drawing symbols from a library of drawing symbols (e.g., see FIG. 12, module 1206, and FIG. 8, module 880) so that the electronic equivalent of standard 2D drawings are generated. Part design model visualization and manipulation processing module 1210 also supports functionality to view the design according to different perspectives, including zoom and pan functions, and so-called virtual "fly throughs." "Fly throughs" allow the user to inspect interior regions of a part design not readily ascertainable in standard drawing perspectives.

In one embodiment, part design model visualization and manipulation processing module 1210 includes a platform independent client application, such as a Java™ applet, that is integrated with the NICECAD system's multimedia communications feature (e.g., see FIG. 13, module 978) so that single or multiple "on line" users may view 2D sectionals, fly throughs, and other views of the part design model that are generated in a substantially "on the fly" fashion. In one embodiment, part design model visualization and manipulation processing module 1210 comprises an application coded in Java 3D™ 1.1 for 3D graphics. In this embodiment, the part design model is presented as a Java 3D™-converted representation of the part design model stored in a neutral format, such as AP214 STEP format. In another embodiment, part design model visualization and manipulation processing module 1210 comprises a server-provided semi- machine-dependent application (such as one coded in Open GL™) for execution on user systems with standard operating systems.

CAD utilities conversion/plotting module 1214 may be a module that provides various CAD utilities, such as file format conversion and output plotting. For example, this module may permit users to convert part design models among various formats, such as AutoCAD™, ProEngineer™, IGES, STEP, and other CAD file formats known to those of skill in the art. This capability may be useful when an EAS team member is performing an "off-line" analysis requiring a format different from that normally stored in NICECAD system 100. This module may permit a user to generate electronic or hard copies of the part design model, such as 2D drawings generated using the cutting tool. In one embodiment, CAD utilities conversion/plotting module 1214 includes a platform independent Java™ applet or the like to facilitate file conversion or plotting. In the preferred embodiment, this platform independent application provides data compression functionality to reduce the time required for uploading in bandwidth-constrained environments. The corresponding software component at CAD processing module 932 supports decompression to reconstitute the original files.

As with other capabilities provided by the NICECAD system, CAD utilities/conversion plotting module has applications to all three aspects of the overall system (NICECAD, GMR and ETC). Therefore, it may be used by a designer to upload and convert an already-existent part design model file onto the system before conducting a search of the GMR database for qualified fabricators. It may be used by a designer or prime contractor (or by fabricators) to upload and/or convert part design model files when engaging in the bidding process.

Other CAD support processing modules 1216 may comprise any other processing modules supporting the NICECAD system's CAD functionality.

Multimedia Communications Processing

The multimedia communications functionality has applications to all three of the aspects of the present system. Therefore, the multimedia communications capability may be used by design team members when developing and evaluating a design. It may be used by a designer or prime contractor to engage in quasi- real-time discussions with potential fabricators regarding design and/or contractual issues.

Figure 13:
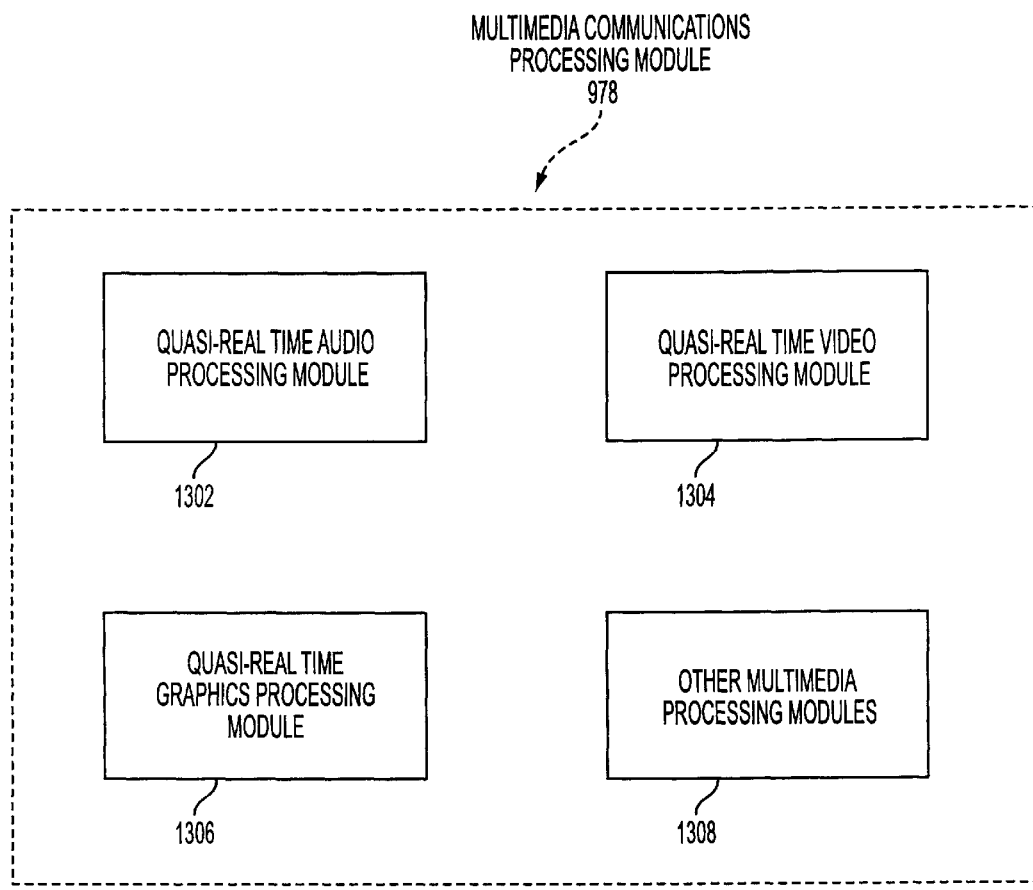
FIG. 13 is a block diagram, according to an embodiment of the present invention, illustrating a multimedia communications processing module of a NICECAD server system.

Multimedia communications processing module 978 provides the multimedia communications capability of the system and, as depicted in FIG. 13, may comprise quasi-real time audio processing module 1302; quasi-real time video processing module 1304; quasi-real time graphics processing module 1306; and other multimedia processing modules 1308.

Quasi-real time audio processing module 1302 permits users to engage in an "on-line" interactive communications session through NICECAD server system 200. In one embodiment, the system provides a secure environment so that users may engage in oral communications using quasi-real time audio processing module 1302 without concern about disclosing proprietary or sensitive information.

Quasi-real time video processing module 1304 permits users to engage in a NICECAD communications session that includes video to thereby conduct a secure teleconference-like session through NICECAD server system 200 over network 260.

In one embodiment, the communications support provided by quasi-real time audio processing module 1302 and quasi-real time video processing module 1304 are coordinated so that video and audio are presented to each participant in a substantially synchronized manner. In one example, the NICECAD system's capability for transmission of audio and video is implemented using a software tool for synchronization, control, processing and presentation, such as Java™ Media Framework (JMF) 1.0 API or JMF 2.0.

Quasi-real time graphics processing module 1306 is a module that may permit participants in an on-line communications session to view graphics, such as a 3D part design model or 2D section cuts, rotations, fly-throughs, zooms or pans in a substantially concurrent manner. In one embodiment, this module may be linked or coordinated with a module such as part design model creation and editing processing module 1202 (which may include a server-provided Java™ applet or semi- machine-dependent application) or part design model visualization and manipulation processing module 1210 (which may include a Java™ applet). This embodiment provides a substantially real time on-line session for creation and editing of a part design model and/or manipulation, translation and "virtual cuts" of a part design model. This would allow, for example, one design team member to engage in the design effort with another remotely located design team member. This would allow, for example, a design team member to interact with a remotely located fabricator team member to view sectional cuts at the same time in order to discuss producibility issues. In one embodiment of the invention, this functionality of the NICECAD system is provided using applications coded in Java 3D™ 1.1 API for supporting the transmission of graphics over network 260.

Other multimedia processing modules 1308 comprises any other modules supporting the NICECAD system's multimedia communications capability.

Electronic Commerce Processing

Figure 14:
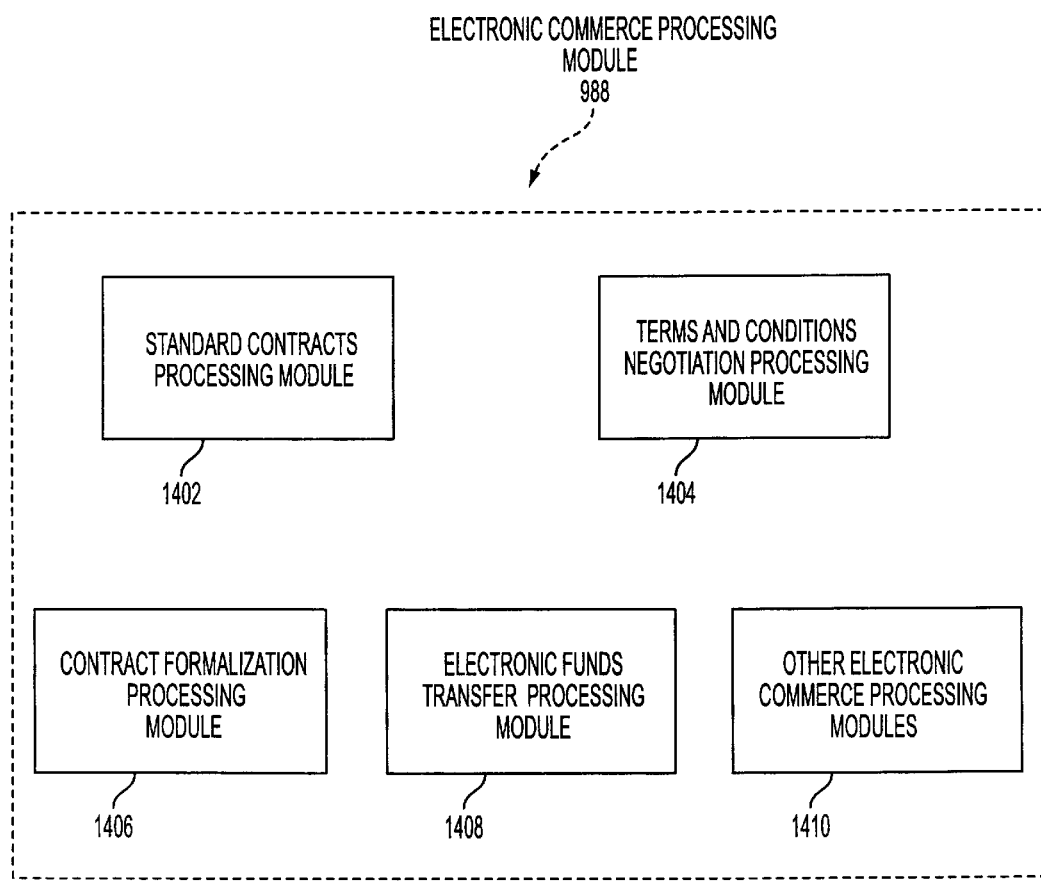
FIG. 14 is a block diagram, according to an embodiment of the present invention, illustrating an electronic communications processing module of a NICECAD server system in greater detail.

Electronic commerce processing module 988 provides the electronic commerce capability of the system and, as depicted in FIG. 14, may comprise standard contracts processing module 1402; terms and conditions negotiation processing 1404; contract formalization processing module 1406; electronic finds transfer processing module 1408; and other electronic commerce processing modules 1410.

Standard contracts processing module 1402 may be a module that permits users (such as a prime contractor and a supplier or fabricator) to access standard form contract templates (e.g., see FIG. 6, module 696). Terms and conditions negotiation processing module 1404 may comprise a module that permits users to select from a database or file of standard terms and conditions (e.g., see FIG. 6, module 697). Contract formalization processing module 1406 may comprise a module that permits users to formalize or enter into a contract that has been negotiated. This may include the provision of digital signatures of one or more of the users to indicate their assent to the terms (e.g., see FIG. 6, module 699). Electronic funds transfer processing module 1408 may comprise a module that permits funds to be transferred electronically from one user to another. Thus, the entire contracting process, including drafting, negotiation and funds transfer can be conducted in the virtual environment. Other electronic commerce processing modules 1410 may comprise any other modules supporting the electronic commerce facilities of the system.

In one embodiment, electronic commerce processing module 988 may comprise a platform independent client-side application, such as a Java™ applet, that is provided to facilitate the processing tasks performed by one or more of modules 1402–1410.

Engineering Analysis and Simulation (EAS) Processing

Figure 15:
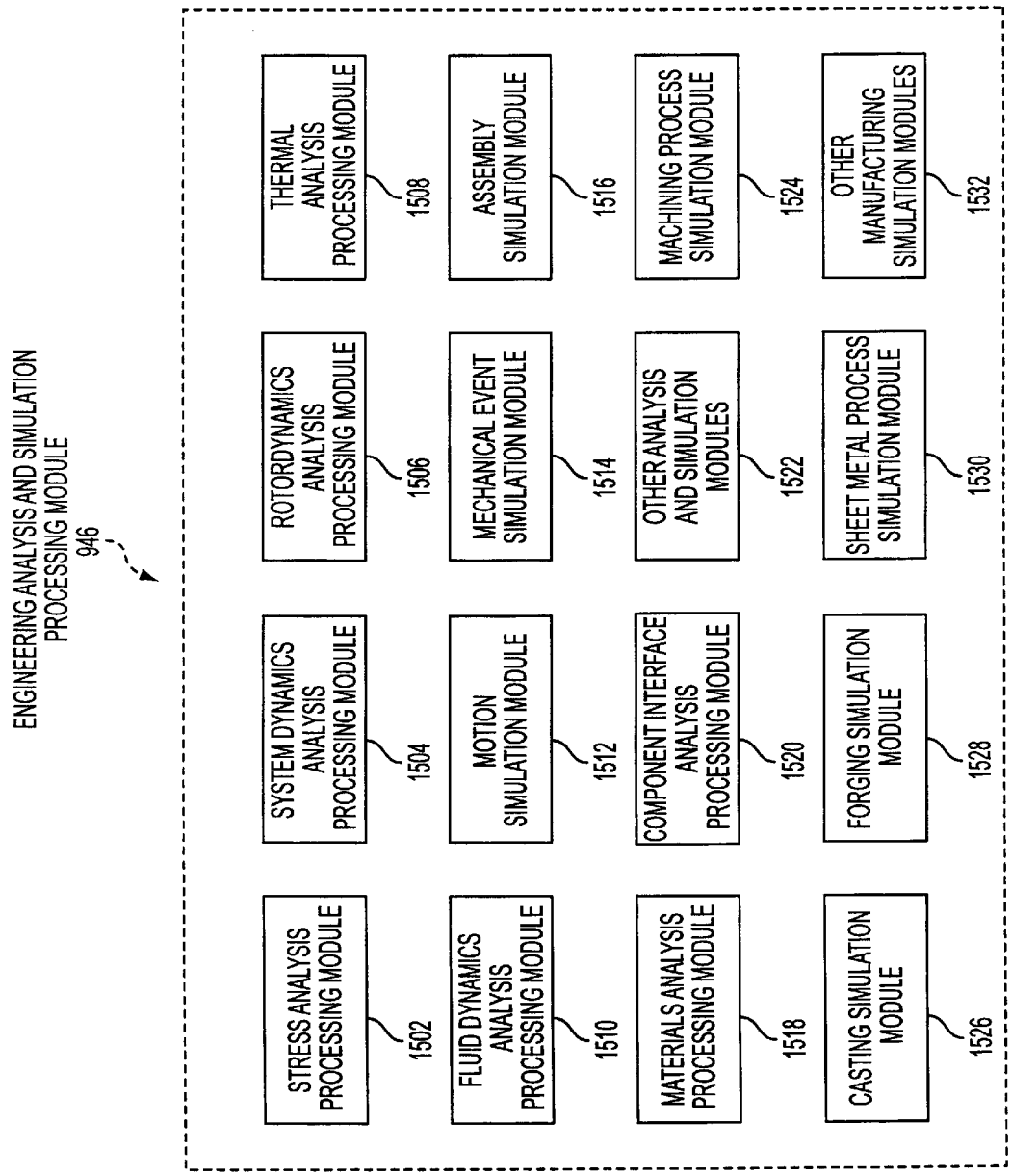
FIG. 15 is a block diagram, according to an embodiment of the present invention, illustrating an engineering analysis and simulation processing module of a NICECAD server system in greater detail.

Engineering analysis and simulation processing module 946 permits users, such as EAS team members, to carry out various analyses and simulations and, as depicted in FIG. 15, may comprise stress analysis processing module 1502; system dynamics analysis processing module 1504; rotordynamics analysis processing module 1506; thermal analysis processing module 1508; fluid dynamics analysis processing module 1510; motion simulation module 1512; mechanical event simulation module 1514; assembly simulation module 1516; materials analysis processing module 1518; component interference analysis processing module 1520; other analysis and simulation modules 1522; machining process simulation module 1524; casting simulation module 1526; forging simulation module 1528; sheet metal process simulation module 1530; and other manufacturing simulation modules 1532.

Stress analysis processing module 1502 may use finite element or equivalent numerical analysis techniques to determine the stress distribution throughout in a part design model. System dynamics analysis processing module 1504 may use numerical techniques to evaluate the dynamic behavior of a part design model, such as resonance points, acoustical properties and the like. Rotordynamics analysis processing module 1506 may use numerical techniques to evaluate behavior of rotating parts, such as to evaluate vibration performance at a design speed and through the transition from startup to the design speed. Thermal analysis processing module 1508 may use numerical techniques to evaluate a part design model at various temperatures in terms of stress magnitudes and deformation or weakening that may affect performance.

Fluid dynamics analysis processing module 1510 may use numerical techniques to evaluate performance of a part design in a fluid environment, and may include measurement of such parameters as pressure, temperature, and density distributions. Motion simulation module 1512 may use numerical simulation techniques to evaluate performance of a part design while in motion, such as to determine interference between components or with other objects in the operational environment, and to determine whether pressures and forces are excessive. Mechanical event simulation module 1514 may use numerical techniques to evaluate a part design model's behavior in response to mechanical events, such as crashes or collisions, and may provide predictions of the extent of deformation, dents and the like. Assembly simulation module 1516 may use numerical techniques to simulate the assembly process for a part design model to evaluate the producibility thereof.

Materials analysis processing module 1518 may use numerical techniques to evaluate a part design model in terms of the materials to be used. For example, certain entities may be designed to be made of Kevlar™, and this analysis may be used to evaluate behavior based on the properties of said material (e.g., see FIG. 7, module 331). Component interface analysis processing module 1520 may use numerical techniques to evaluate the interface between parts of a part design model, or between the part design model and external items. Other analysis and simulation modules 1522 refers to any other modules used to evaluate a part design model.

Modules 1524–1532 are especially relevant to fabricators evaluating producibility of a part design model. Machining process simulation module 1524 may be used to evaluate whether a part design model (or portion thereof) may be manufactured using particular machines. For example, the dimensions of the part design model may be considered to determine which machines may be used and what material stock may be used. Casting simulation module 1526 may be used to determine whether casting processes may be used to produce a part design model. Forging simulation module 1528 may be used to determine whether forging processes may be used to produce a part design model. Sheet metal process simulation module 1530 may be used to evaluate whether the part design model may be made of sheet stock. Other manufacturing simulation modules 1532 refers to any other manufacturing simulations that may be offered by the NICECAD system.

Figure 21:
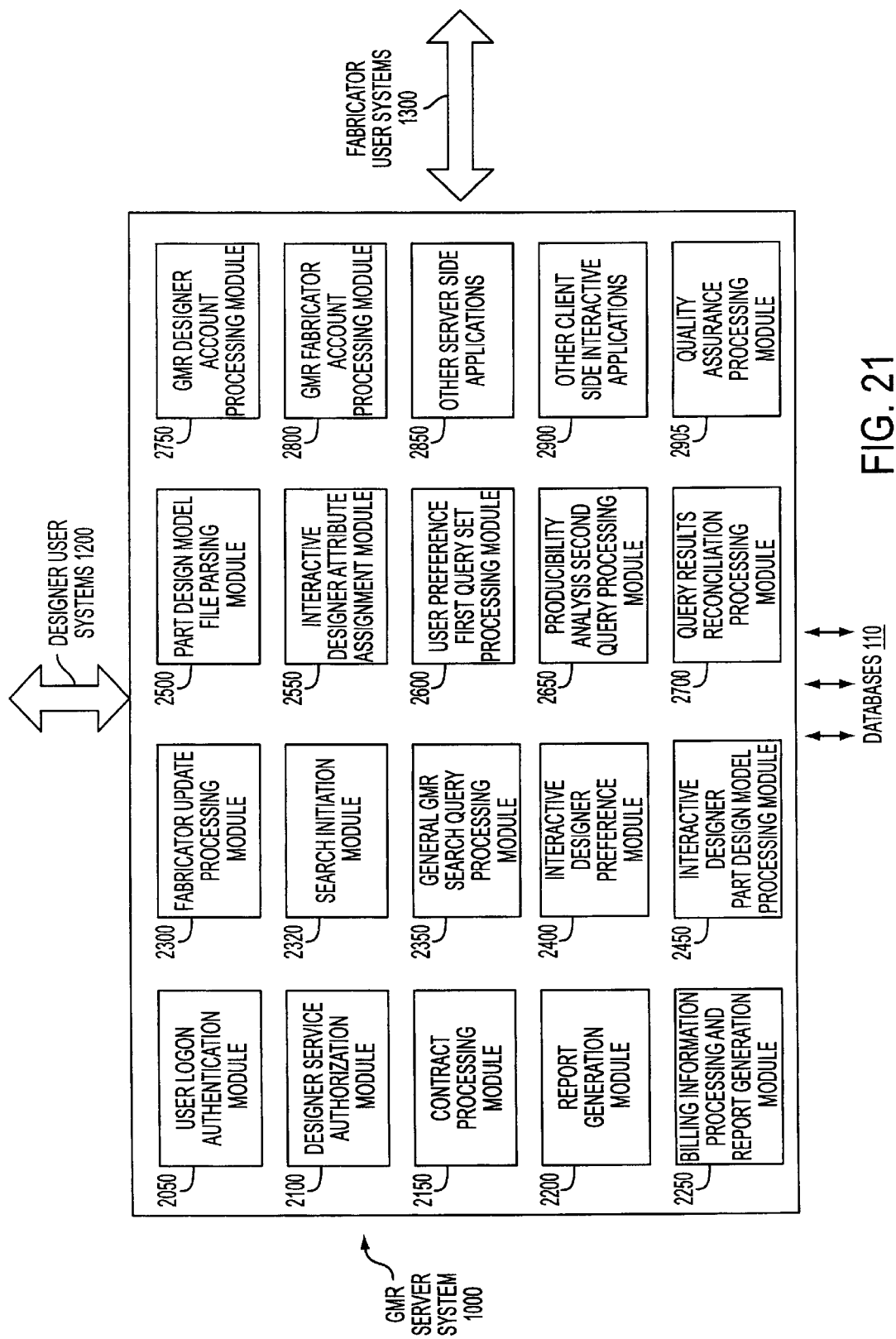
FIG. 21 is a block diagram, according to an embodiment of the present invention, illustrating a GMR server system in greater detail, including the various processing modules and applications that it may comprise.

For purposes of clarity, it should be noted that there may be correspondence between the analytical tools provided by modules 1502–1532, especially those pertaining to the production engineering discipline, and the producibility logic supported by the GMR system (e.g, module 2650, FIG. 21). In general, modules 1502–1532 represent software which is used by design team members during the design and development phase to evaluate a proposed design. Typically, the current baseline part design model (or parts thereof) is the input, and the output is some measure of performance or compliance with applicable specifications. On the other hand, the producibility analysis performed by module 2650 (FIG. 21) represents analysis performed by the server for the purposes of generating the second query set (to be discussed below) for purposes of searching the GMR database for qualified fabricators. Therefore, while the results of the producibility analysis may be made available, and while the substantive analysis may involve some of the same computations, the results are used for different applications in the two contexts (NICECAD and GMR searching).

Regarding implementation of the aforementioned modules, in one embodiment the modules may comprise executable files or code that may be accessed by the user for downloading and execution (e.g., the NICECAD system may present a browser page to the user, who could then select from a list of analysis and simulation options). In this embodiment, the "number crunching" associated with the analysis or simulation is performed by the user station system. In another embodiment, the aforementioned modules are made available to users through a platform independent application, such as a Java™ applet, whereby the user may assign the inputs for the analysis (such as the part design model and various analysis or simulation parameters) and the "number crunching" is substantially performed by NICECAD server system 200. In this fashion, the processing demands on the user system are minimized, and little or no specialized hardware or software is required.

It should also be noted that EAS processing module 946 (or parts thereof) may be integrated or coordinated with CAD processing module 932 (or parts thereof). For example, an analysis that requires 2D sections of a part design model may include the execution of a module such as part design model visualization and manipulation processing module 1210 (FIG. 12). Access to EAS processing modules may be constrained by access permissions assigned by an approval authority (e.g., see FIG. 11, module 1116). Checkout records may be stored whenever a team member accesses one of the EAS processing modules (e.g., see FIG. 11, module 1104).

Figure 16A:
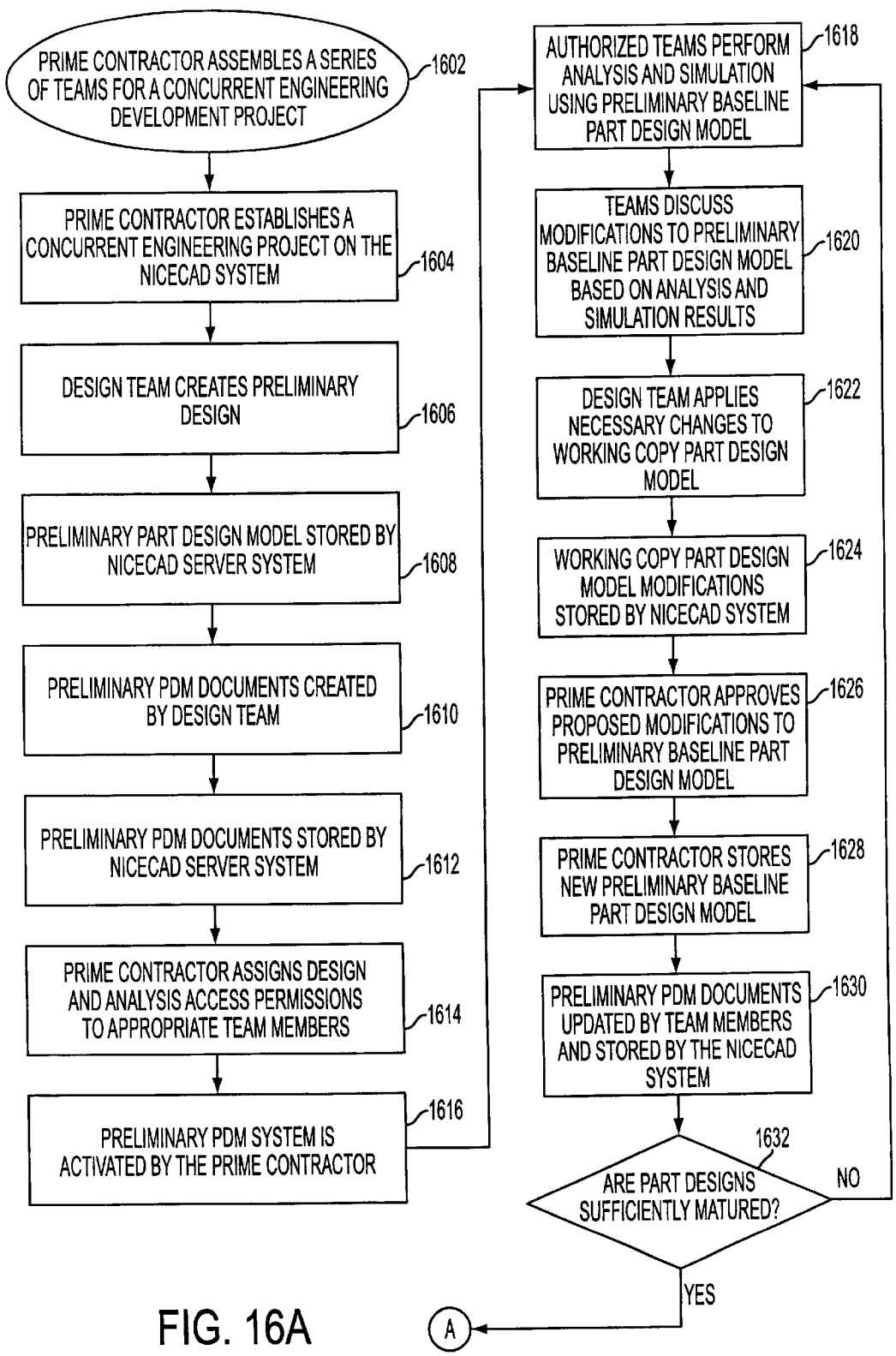
FIGS. 16A & B depict a flowchart illustrating a method, according to an embodiment of the present invention, to carry out a concurrent engineering project.
Figure 16B:
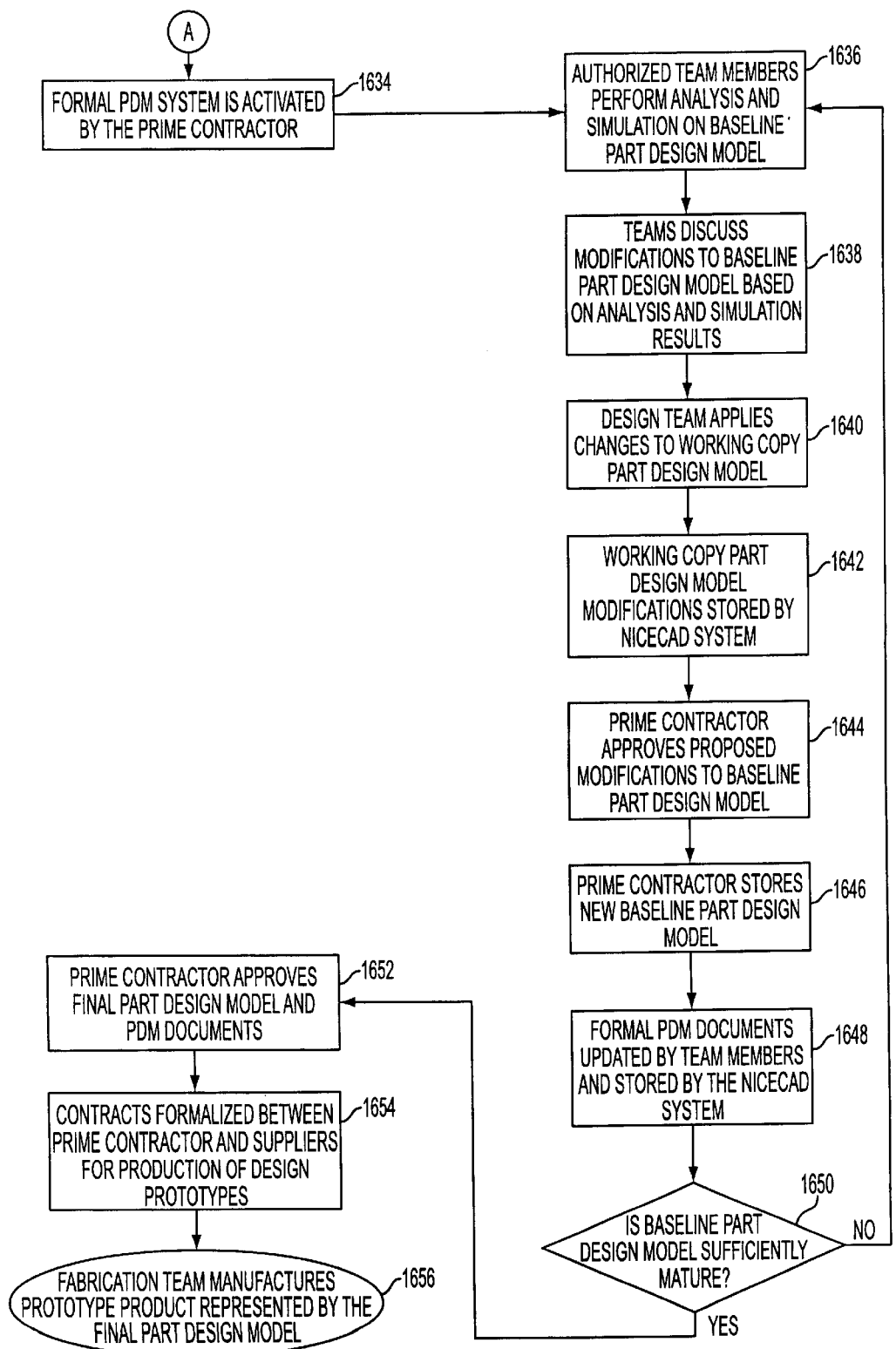

Overview of a Method for a Concurrent Engineering Project using a Virtual Collaborative Environment FIGS. 16A and 16B provide an overview of a method for undertaking a concurrent engineering project in a virtual collaborative environment, such as that provided in the system previously disclosed.

Referring to FIG. 16, a prime contractor first assembles a series of teams, as in step 1602, and the prime contractor establishes a project on the virtual system, as in step 1604, which may rely on a software component such as PDM electronic document processing module 1102. This may require the creation of contracts between the prime contractor and suppliers (FIG. 4, module 415), the prime contractor and the NICECAD system, and supplier(s) and the NICECAD system (FIG. 4, module 410). NICECAD system server 200 may set up accounts for suppliers and the prime contractor (FIG. 5, module 320) and basic project data in the database (FIG. 8, PDM data 335). User ID's and passwords may be established for the prime contractor and suppliers (FIG. 10, module 1002).

The design team may create a preliminary design, as in step 1606, which could be done with the assistance of a software component such as part design model creation and editing processing module 1202 of FIG. 12 and baseline part design model management module 1106 of FIG. 11. The preliminary baseline part design model(s) (for simplicity, we refer to the model for a part in the singular as the part design model, although those of ordinary skill can appreciate that a design may comprise a plurality of part design models) is stored by the NICECAD server system, as in step 1608, which could be stored in stored baseline part design model data module 865 of FIG. 8. The design team may also create preliminary PDM documents, such as a system specification, performance specification, project schedule or other generally non-graphical project documents, as in step 1610. This step may be carried out using a software component such as PDM electronic document processing module 1102 of FIG. 11. The preliminary PDM documents are stored by NICECAD server system 200, as in step 1612, which may be in a module such as stored product data management system electronic document data module 840 of FIG. 8.

Figure 1:
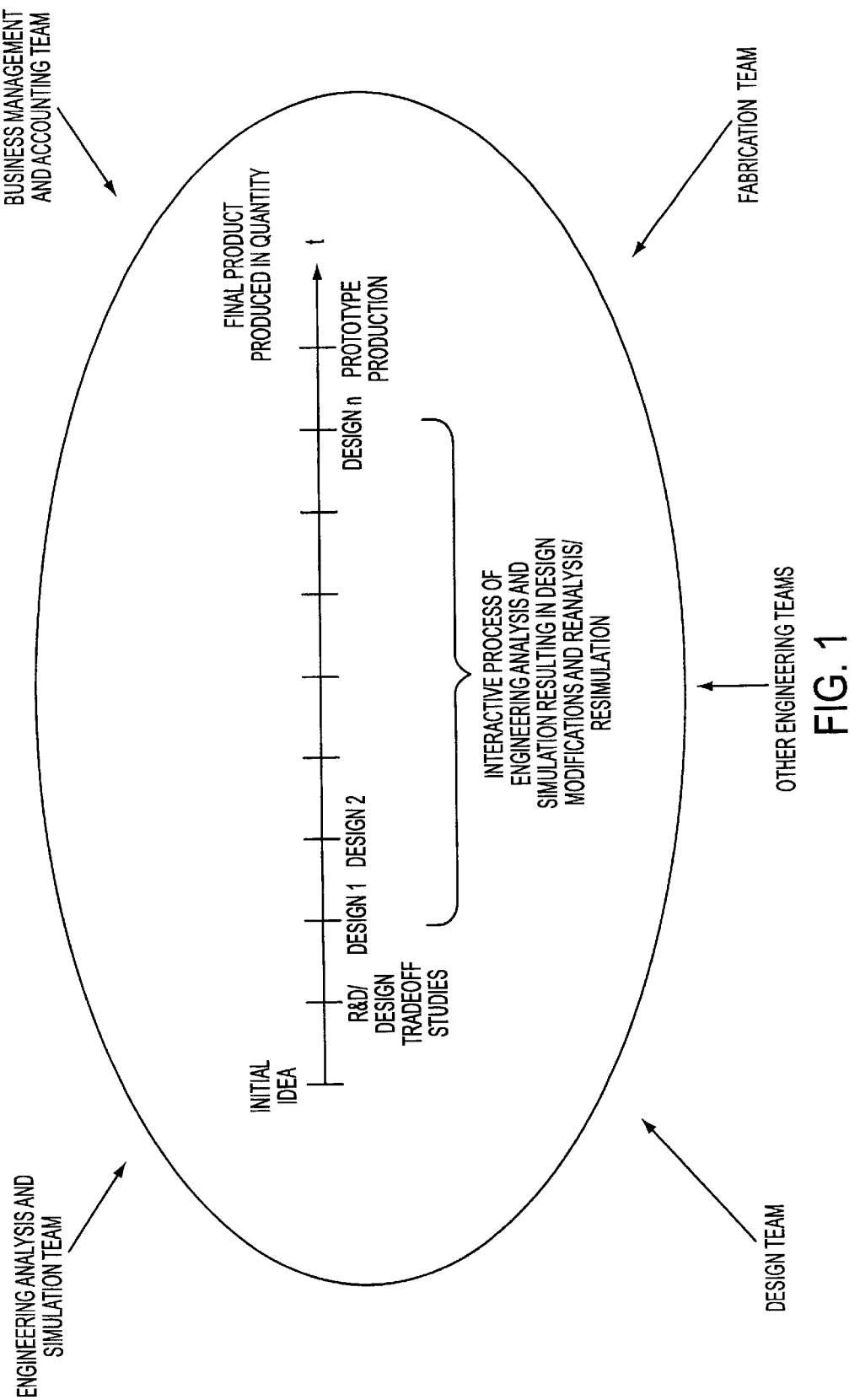
FIG. 1 is an diagram illustrating the concurrent engineering principle, the various teams which may be involved, and the chronology of a typical concurrent engineering development project.

The prime contractor may assign design and analysis access permissions to teams or individual team members, as in step 1614 (e.g., see FIG. 8, module 860; FIG. 11, module 1116). The prime contractor may then activate the preliminary PDM system, as in step 1616 (e.g., see FIG. 11, module 1102). Those of skill in the art understand that product data management is a rigorous process that may involve strict procedures and significant documentation. In the early phases of the development process (such as during the creation of the initiatial design), the design may change significantly as different approaches are considered and traded off. Consequently, a less rigorous preliminary PDM system may be used during the initial stages (e.g., see from "initial idea" to "Design 1," FIG. 1) so that the PDM requirements do not overburden the project at the early stage.

Based on authorizations assigned by the prime contractor, teams perform analysis and simulation to evaluate the preliminary baseline part design model according to various disciplines, as in step 1618 (e.g., see FIG. 9, module 946; FIG. 15). Results may be stored in the NICECAD system (e.g., see FIG. 8, module 885; FIG. 11, module 1114). The teams may then discuss proposed modifications to the preliminary baseline part design model based on such analyses, as in step 1620. This may be performed in the virtual NICECAD environment using quasi-real time video, audio and graphics (see FIG. 13; FIG. 12, module 1210). Records of these sessions may be stored (e.g., see FIG. 8, module 890). Based on such discussions, the design team may make changes to the preliminary baseline part design model by modifying a working copy part design model, as in step 1622. "Working copy" generally indicates that the model is a working copy, and does not necessarily represent an approved baseline. The working copy part design model, as modified, may then be stored by the NICECAD system, as in step 1624, to a working copy storage such as that of FIG. 8, module 892.

The prime contractor (or other approval authority) may approve proposed modifications to the preliminary baseline part design model, as in step 1626, based on the recommendations made by the design team and analysis team(s). This step could involve the creation of a digital approval signature (e.g., see FIG. 8, module 870; FIG. 11, module 1112), although in one embodiment no such formality is required while in the preliminary PDM phase. The prime contractor may then store the new preliminary baseline part design model, as in step 1628. In one embodiment, this new model may be stored in module 865 of FIG. 8 and a revision history in module 840 of FIG. 8 would be updated. Preliminary PDM documents may be updated as required for the new design, as in step 1630.

If the preliminary baseline part design model is still not sufficiently mature (decision block 1632, "No"), the prime contractor may request that additional analyses be performed, in which case the method returns to step 1618. If the preliminary baseline part design model is considered sufficiently mature (decision block 1632, "Yes"), the prime contractor may commence the formal PDM process, as in step 1634. Those of ordinary skill can understand that the point of "sufficient maturity" of a design is a determination that is based on the judgment and experience of the prime contractor project manager(s).

The methodology of the project development effort during formal PDM is similar to that of preliminary PDM, only the PDM management is more rigorous. Therefore, steps 1636–1648 are performed like steps 1618–1630. During formal PDM, however, the documentation requirements and data management are enhanced. For example, as previously discussed, version numbers may be assigned to each baseline part design model and to each working copy part design model. A revision history of the baseline part design model may be maintained. Strict check-in and check-out procedures may be enforced. Digital signatures may be required for any change to the baseline part design model and associated PDM documents (specifications and the like).

After each round of analysis and simulation, the prime contractor determines whether the baseline part design model is sufficiently mature to begin fabricating prototypes. If not (decision block 1650, "No"), the method returns to step 1636 for additional analysis. If the baseline part design model is considered mature (decision block 1650, "Yes"), the prime contractor may approve the final part design model and PDM documents, as in step 1652. In one embodiment, this may entail digital signatures approving the final part design model and PDM documents (e.g., see FIG. 8, module 870; FIG. 11, module 1112).

At this point, contracts between the prime contractor and fabricators may be entered into, as in step 1654, for the production of prototypes. The fabrication team may then produce prototypes in quantity based on the final part design model, as in step 1656.

A Method Using a Virtual Collaborative Environment to Create an Initial Design

Figure 17:
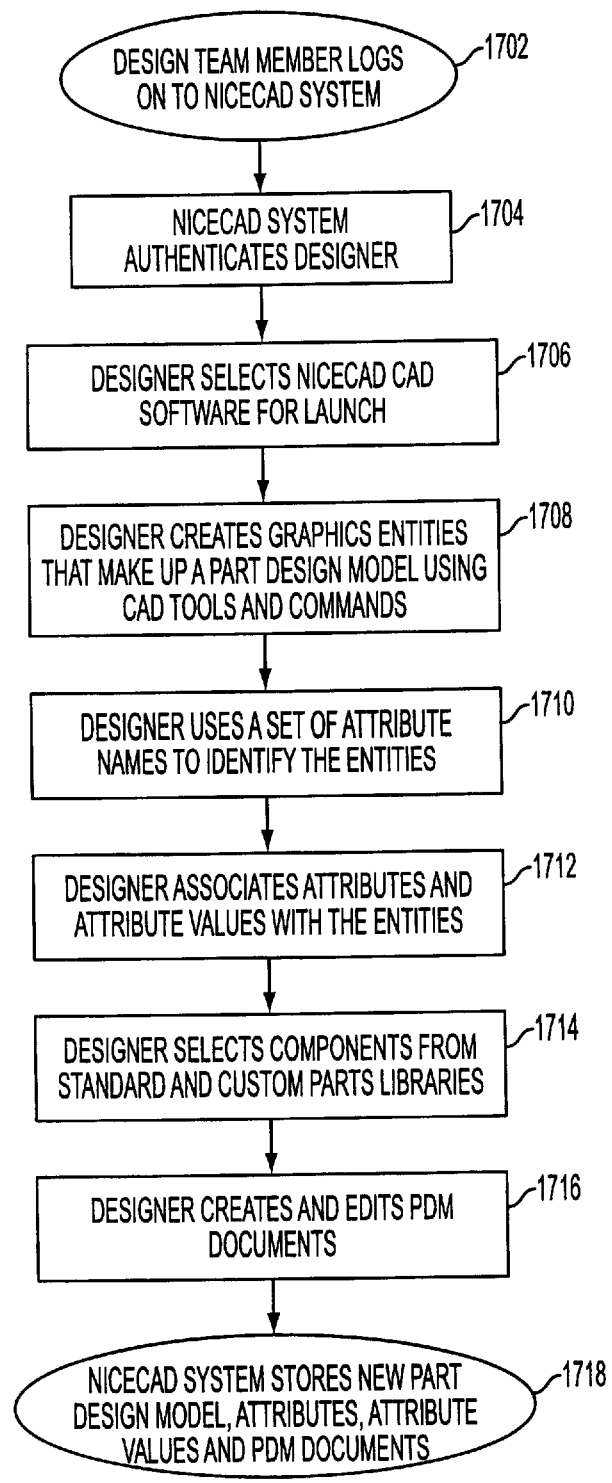
FIG. 17 is a flowchart illustrating a method, according to an embodiment of the present invention, for a design team member to create an initial design.

FIG. 17 depicts a method for creating an initial design using the collaborative networked environment. A designer team member (hereinafter abbreviated as "designer") logs on to the system, as in step 1702. The system authenticates the user, as in step 1704 (e.g., see FIG. 10, module 1002). The designer selects NICECAD CAD software for launch, as in step 1706. In one embodiment, this could be carried out by part design model creation and editing processing module 1202 of FIG. 12, which may be coupled to modules 1204-1208 for parts, drawing symbols and standards/specifications to be used in creating the part design model. In one embodiment, the NICECAD CAD software may include a platform independent application, such as a Java™ applet, that provides for client/server interactive CAD processing. In another embodiment, the NICECAD CAD software may include server-provided semi-machine-dependent applications executable with standard operating systems.

The designer creates graphic entities that comprise a part design model using CAD tools and commands of the NICECAD CAD software, as in step 1708. CAD packages generally comprise a series of software tools and commands, as well known to those of skill in the art. The designer may use a set of attribute names to identify the entities, as in step 1710. The designer associates attributes and attribute values to selected entities, as in step 1712. The designer associates components from standard and custom parts libraries as needed (it may not be necessary), as in step 1714.

Steps 1710–1714 may be accomplished using data from certain modules, such as stored standard attribute and attribute values data module 845 of FIG. 8 for attributes; manufacturing standards and specifications data module 850 of FIG. 8 for standards/specifications; stored standard drawing symbols data module 880 of FIG. 8 for drawing symbols; and standard and custom parts library data module 875 of FIG. 8 for prebuilt parts. This may be accomplished using various processing modules, such as attributes and attribute values management module 1110 of FIG. 11; standard and custom parts library management module 1204 of FIG. 12; standard drawing symbols management module 1206 of FIG. 12; and manufacturing standards and specifications management module 1208 of FIG. 12.

The designer creates and edits PDM documents (preliminary or formal) to properly track the new part design model, as in step 1716. Processing modules such as PDM electronic document processing module 1102 of FIG. 11 and data modules such as stored product data management system electronic data module 840 of FIG. 8 may be used to carry out this step. In one embodiment, this step may comprise the provision of a platform independent GUI interface and/or application, such as browser pages and/or a Java™ applet, that permits the designer to select various options, such as whether to create a system specification or performance specification. It may allow the designer to decide options for the revision history (FIG. 8, module 840) and whether version numbers should be assigned to all baseline part design models (e.g., see FIG. 8, module 865) and/or working copy part design models (e.g., see FIG. 8, module 892).

The system then stores the new part design model, attributes, attribute values, and PDM documents to the system, as in step 1718. Processing modules from FIG. 11 and data modules from FIG. 8 may be employed.

Figure 18A:
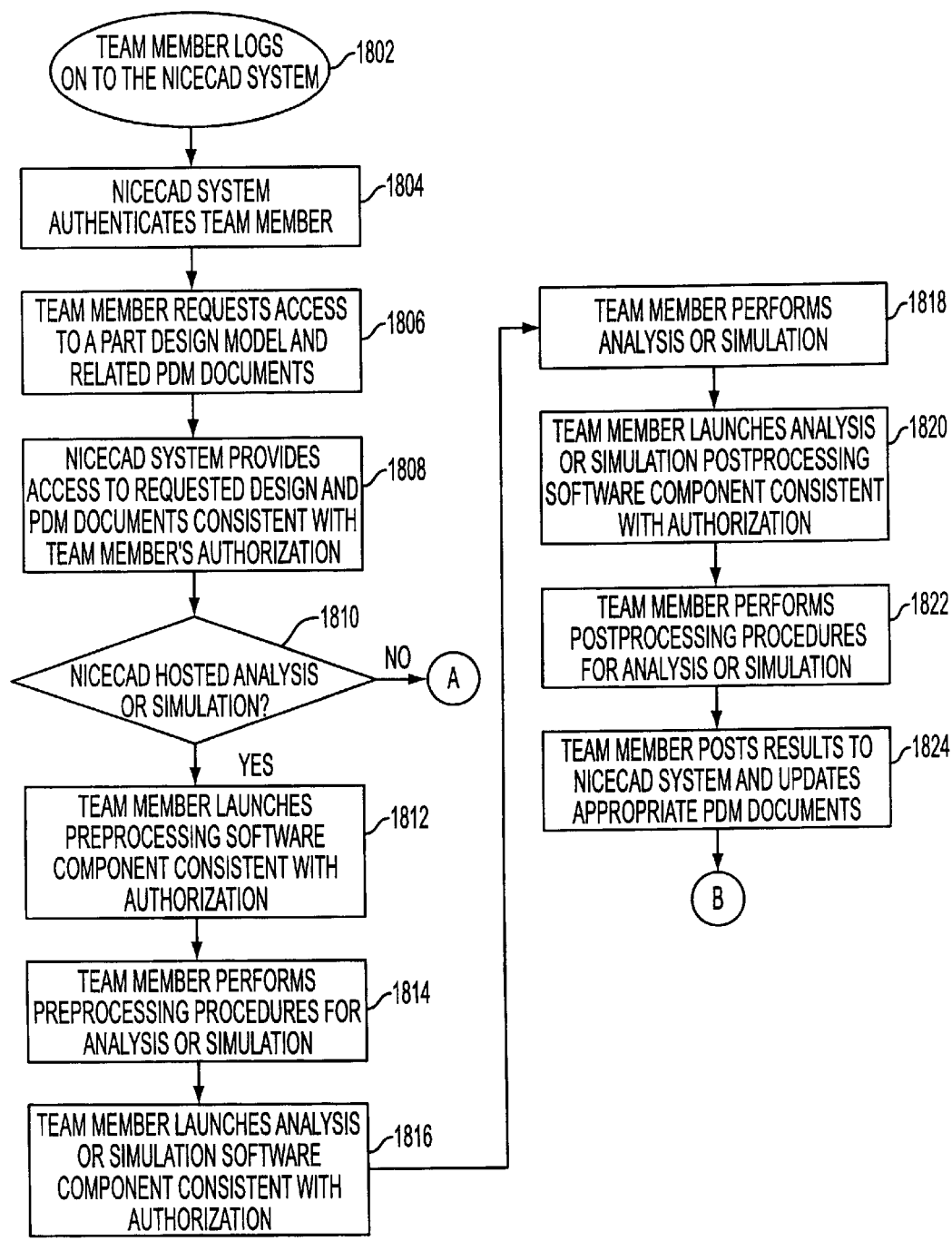
FIGS. 18A & B depict a flowchart illustrating a method, according to an embodiment of the present invention, for a team member to perform engineering analysis and simulation on a part design model.
Figure 18B:
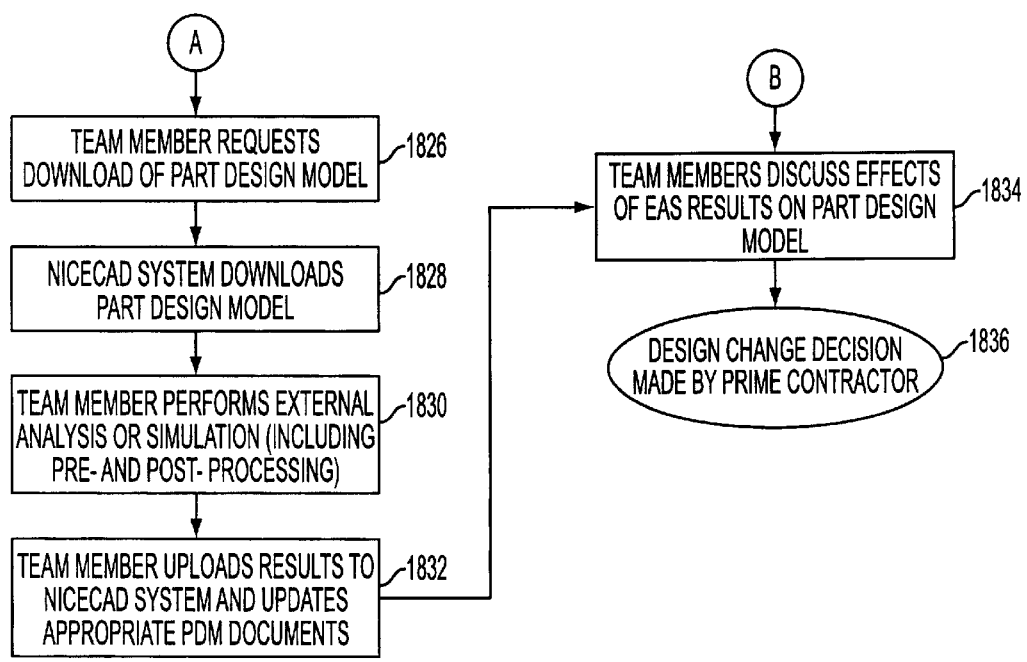

A Method Using a Virtual Collaborative Environment for Engineering Analysis and Simulation FIGS. 18A and 18B illustrate a method for using the system to perform engineering analysis and simulation using the virtual environment. Before disclosing the method, it should be appreciated that the terms "preprocessing," "analysis or simulation," and "postprocessing" are descriptive terms that represent a functional allocation of the analysis/simulation process. Those terms are used to explain the process and are not meant to imply that the EAS analysis process must be segregated in a particular fashion. As those of skill in the art can appreciate, "preprocessing," "analysis or simulation," and "postprocessing" may be part of a single software "run" or may pertain to several discrete acts. For example, in the case of stress analysis, there may be preprocessing by representing a part design model as a mesh or network of points ("finite elements"). Then there may be the finite element analysis that computes the stress at each point. Then there may be the postprocessing that converts the numerical results into a presentation (e.g., a graph). Those of ordinary skill should appreciate that such acts may be performed as three separate sub-analyses (e.g., a separate module performing each and having its own set of results or ouput) or as part of a single analysis (e.g., a single module or software component performing the entire analysis).

Returning to FIGS. 18A & B, the team member logs on to the NICECAD system, as in step 1802, and the NICECAD system authenticates the team member, as in step 1804. The team member requests access to a part design model, as in step 1806. As discussed previously, there may be a plurality of part design models associated with a given engineering development project, so that the team member may seek access to one or more of these.

NICECAD server system 200 provides access to the part design model and PDM data consistent with the authorization for that team member, as in step 1808. As previously discussed, a module such as design and access permissions management module 1116 of FIG. 11 may permit a prime contractor to assign access permissions for the part design model, PDM documents, and EAS processing modules. This data may be stored in a module such as stored design and analysis access permission data module 860 of FIG. 8. Using modules such as these, NICECAD server system 200 could permit (or deny) access to the part design model and PDM data, according to step 1808.

If the EAS to be conducted relies on external programs or processing modules (or even so-called pen-and-paper analysis), the system skips to step 1826 (decision block 1810, "No"). If the EAS relies on NICECAD hosted or provided EAS modules, the system proceeds to step 1812 (decision block 1810, "Yes"). In the latter case, EAS software for the analysis may be provided by the NICECAD system.

In step 1812, the team member launches an EAS preprocessing software component consistent with authorization. As noted above, the prime contractor may assign access permission data for the EAS modules, so the team member must be authorized to access that EAS software component. In one embodiment, launching the preprocessing software component comprises running a software program that is downloaded from the server and run on the team member's user system. In another embodiment, launching comprises running a platform independent application, such as a Java™ applet, that is interactive with NICECAD server 200 so that the bulk of the processing is performed by NICECAD server 200.

In step 1814, the team member performs preprocessing procedures for the analysis or simulation. In step 1816, the team member launches the analysis or simulation software component consistent with authorization (see step 1812 for several embodiments). In step 1818, the team member performs the analysis or simulation, which may require a series of computations. As noted with respect to step 1816, the step may comprise running a platform independent application, such as a Java™ applet, so that the performance of the analysis or simulation may actually be a shared task between the server and the team member's user system.

In step 1820, the team member launches the analysis or simulation postprocessing software component consistent with authorization, and in step 1822, the team member performs the postprocessing procedures. In step 1824, the team member posts results to NICECAD server system 200 and updates appropriate PDM documents. A processing module such as EAS results management module 1114 of FIG. 11 and data module such as stored EAS results data module 885 of FIG. 8 may be used to carry out this step. While step 1824 states that the team member posts the results, in one embodiment the NICECAD system may provide that all EAS results be automatically stored.

Upon completion of the analysis or simulation, step 1834 provides that team members discuss effects of the EAS results on the part design model. Generally, this discussion may include one or more members from the design team and the particular EAS team, although this may vary based on circumstances. As discussed with respect to FIG. 13, such discussions may take place over the networked virtual environment using quasi-real time audio and/or video and/or graphics. Based on said discussions, the prime contractor makes a decision on whether a design change to the part design model should be effected, as in step 1836.

If the analysis or simulation is to rely on external software (decision block 1810, "No"), the team member may request the download of the part design model, as in step 1826. In step 1828, NICECAD server system 200 downloads the part design model. In one embodiment, steps 1826–1828 may include giving the team member the option to select a file format (e.g., IGES, STEP, etc.) for the downloaded part design model. In one embodiment, this step may be facilitated by providing browser pages and/or a Java™ applet or the like. In step 1830, the team member performs the external analysis or simulation. In step 1832, the team member uploads the results to the NICECAD system and updates appropriate PDM documents. Steps 1834 and 1836 are performed as previously discussed.

Figure 19A:
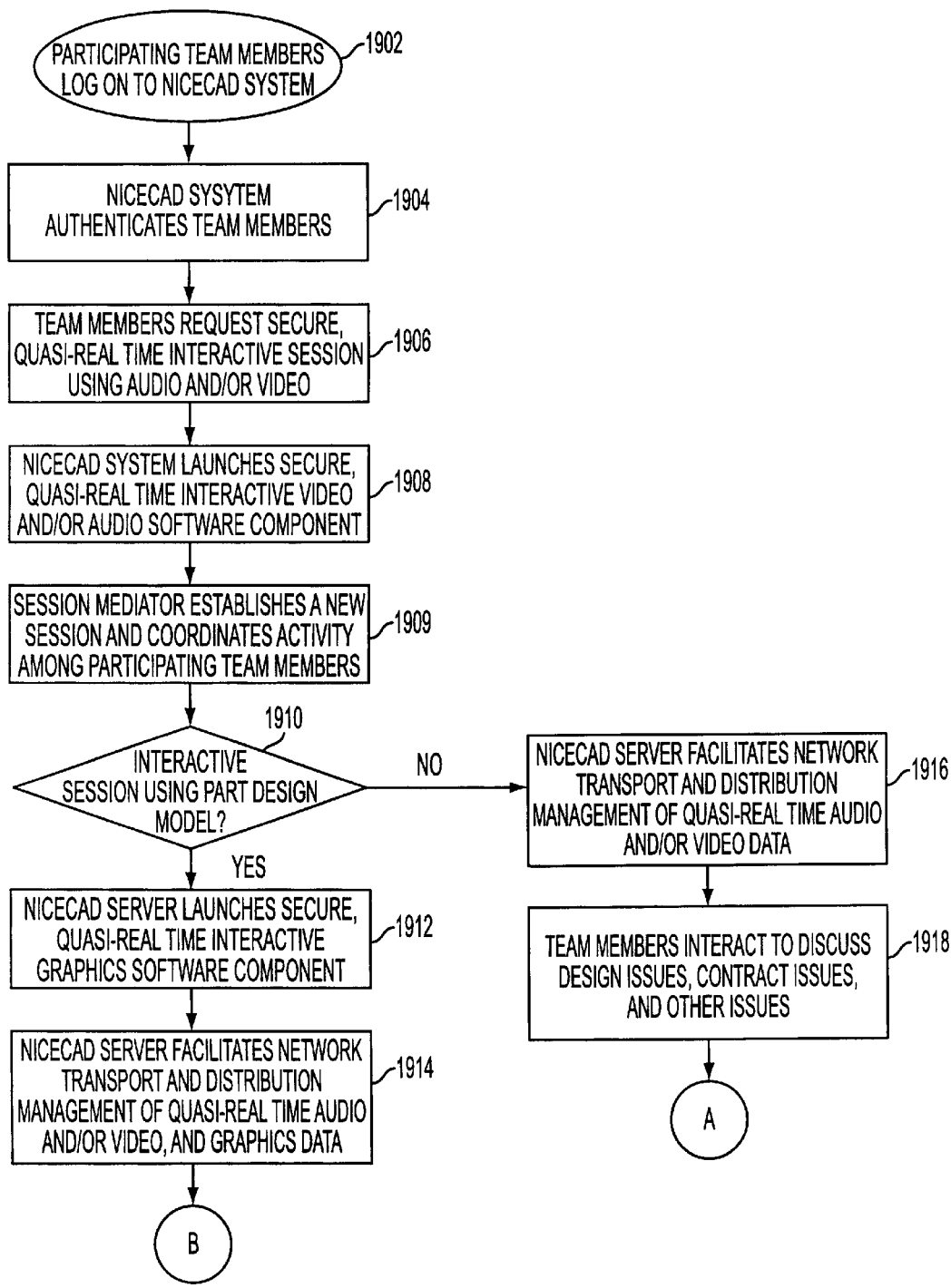
FIGS. 19A & B depict a flowchart illustrating a method, according to an embodiment of the present invention, for quasi-real time interaction among users on the NICECAD system.
Figure 19B:
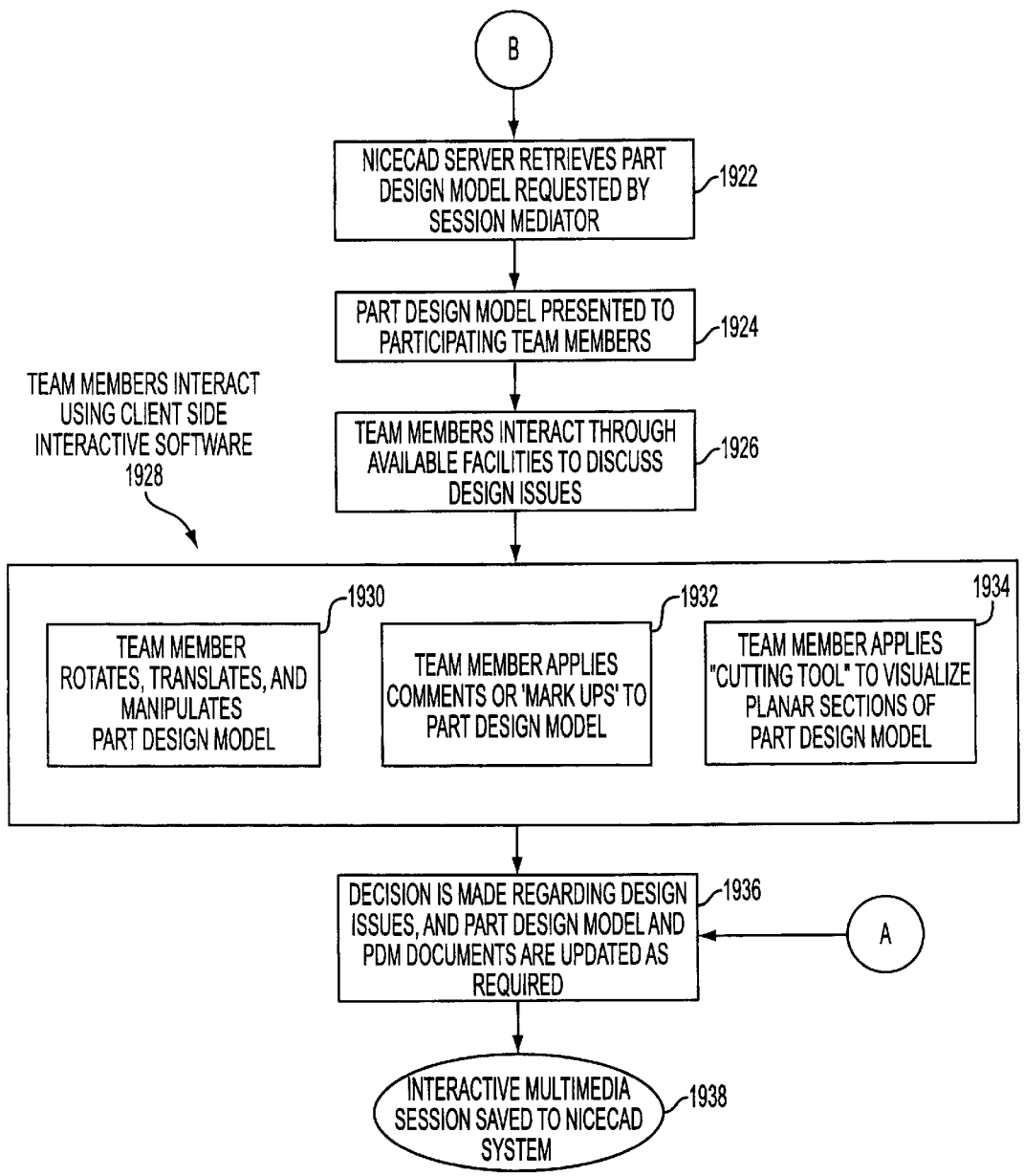

A Method Using a Virtual Collaborative Environment for Quasi-Real Time Interaction FIGS. 19A & B illustrate a method for team members to engage in an interactive communications session using the system. As can be readily appreciated, the multimedia communications capability has ready applications in all three aspects of the present system: the development of the design, the search for qualified fabricators, and the negotiation and bidding process. The detailed description below describes the communications session in the context of design development, but this is exemplary only, and the multimedia communications capability finds ready application in the other aspects of the invention.

In step 1902, participating team members log on to the NICECAD system, and in step 1904, the NICECAD system authenticates the team members. In step 1906, the team members request a secure interactive session using audio and/or video. In one embodiment, the system may provide additional levels of security for such a session, such as providing encryption with greater key lengths. Continuing with step 1908, NICECAD server system 200 launches the interactive video and/or audio software component(s) (e.g., see FIG. 13, modules 1302–1304). Steps 1906–1908 may be carried out through the use of a platform independent application, such as a Java™ applet.

In step 1909, the session mediator establishes the new session and coordinates activity among the participating team members. The "session mediator" generally refers to the team member who has responsibility for the interactive session and acts as the "virtual chairperson." In one embodiment, the session mediator establishes the new session by providing the identity of the participating team members and a description of the session (e.g., "NICECAD session of Jun. 1, 2010, to discuss proposed design changes as a result of stress analysis") to NICECAD server 200.

If the interactive session is not going to require a part design model (decision block 1910, "No"), the method will skip to step 1916, discussed below.

If the interactive session is going to need a part design model (decision block 1910, "Yes"), the method proceeds to step 1912. In step 1912, the NICECAD server system 200 launches the interactive graphics software component (e.g., see FIG. 13, module 1306). According to step 1914, NICECAD system server then commences network transport and management of the audio and/or video and graphics data (e.g., see FIG. 13, modules 1302–1306). NICECAD server 200 retrieves the part design model requested by the session mediator, as in step 1922. The part design model is presented to the participating team members (e.g., see FIG. 12, module 1210; FIG. 13, module 1306), as in step 1924, and the team members interact using audio and/or video to discuss design issues, as in step 1926.

In step 1928, team members may interact by processing or manipulating the part design model using interactive software supplied by NICECAD server system 200 (e.g., see FIG. 12, modules 1210 and 1202). In one embodiment, NICECAD server system 200 permits only one team member to control the part design model at a time, and after each change, the results are presented to all participating team members.

Step 1928 may be further illustrated by subdividing it into steps 1930–1934. In step 1930, a team member rotates or translates or otherwise manipulates the part design model to focus particular design issues. In step 1932, a team member applies comments or "mark ups" to the part design model to highlight particular aspects of the part design model. In step 1934, the team member applies the virtual "cutting tool" to generate 2D sections of the part design model. As previously described, module 1210 may support "fly through" functionality, so that users can also simultaneously view internal regions of the part design.

In step 1936, a decision is made regarding the design issues, and the part design model and PDM documents are updated as required. In one embodiment, only the prime contractor has approval authority for design changes. In another embodiment, the NICECAD system may permit the prime contractor to delegate this authority (such as for a particular interactive session) at its discretion. In step 1938, the interactive session is saved to the NICECAD system (e.g., see FIG. 8, module 890).

Returning to the "No" branch of decision block 1910, the interactive session may not require the part design model, in which case audio and/or video may be used. In step 1916, the NICECAD server commences the network transport and management of the audio and/or video. In step 1918, the team members interact to discuss issues of interest, such as design issues, contract issues and so on. The method continues with steps 1936 and 1938 as previously discussed.

A Second Aspect of the Invention: A System and Methods for Providing a Searchable Database of Registered Fabricators for Producing a Part Design (GMR)

A second aspect of the invention is directed to a system and methods for providing a searchable registry of fabricators which can be searched by a designer or prime contractor seeking to manufacture a product represented by a part design model. As can be readily appreciated, the design (represented by a part design model and specifications) may have been developed using the previously described system and methods (the NICECAD aspect). In such a scenario, much or all of the necessary design information resides on the system (e.g., the three dimensional part design model may be stored in module 865 and the specification documents may be stored in module 840, both of FIG. 8). However, the overall system provides maximum flexibility insofar that the second aspect of the invention has application even where the design is not already stored on the system. Therefore, the second aspect of the invention, the searchable GMR registry, permits a designer or prime contractor to upload and, if necessary, convert an independently-developed part design model in order to locate qualified fabricators.

Overview of the Searchable GMR

Figure 20:
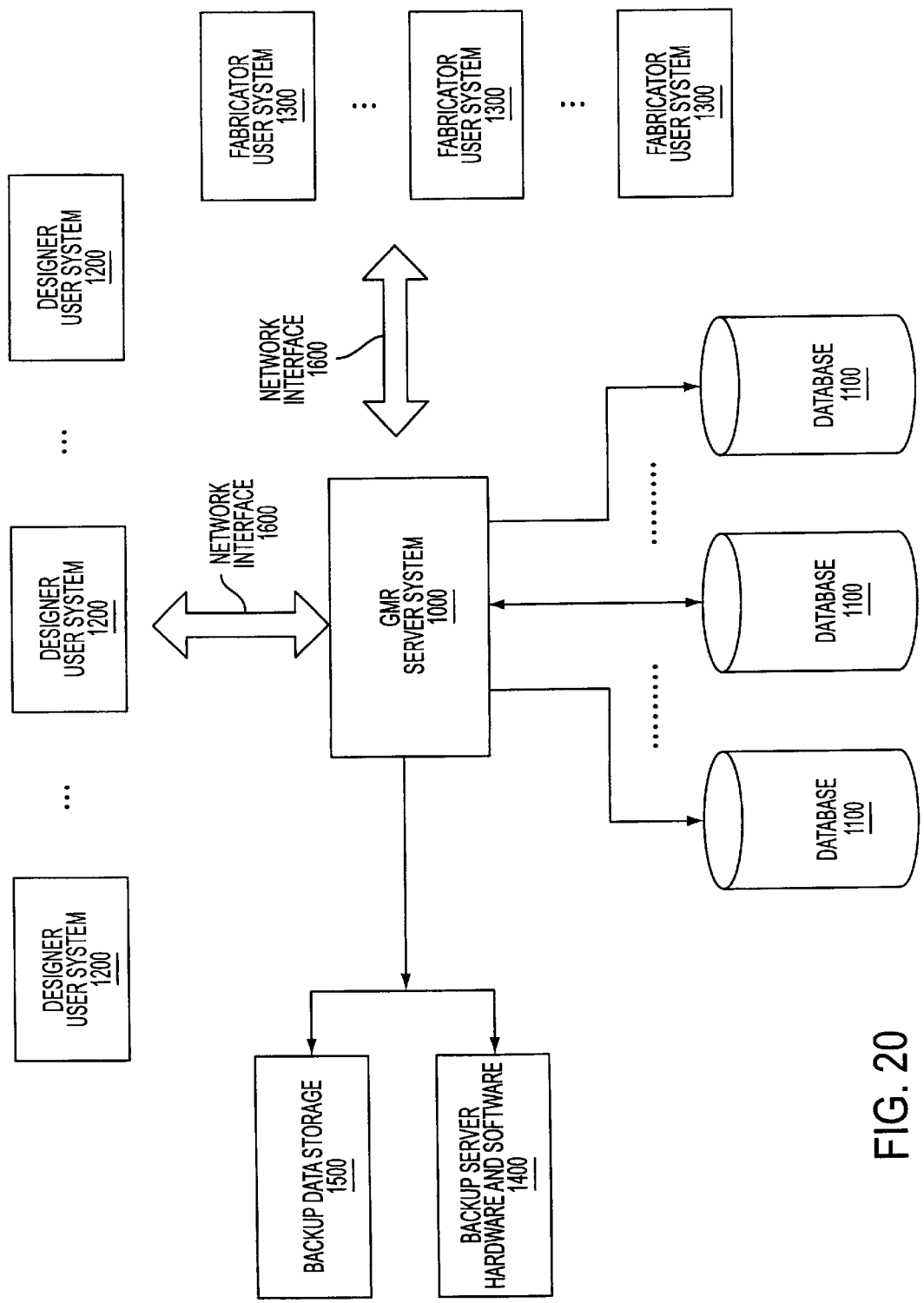
FIG. 20 is an overview diagram of an interactive EDM system according to an embodiment of the invention, including the network interface, GMR server system, GMR database, fabricator user systems and designer user systems.

FIG. 20 depicts an overview of the second aspect of the invention, which is generally referred to herein as the searchable Global Manufacturer's Registry (GMR). In the illustrated embodiment, there is GMR server system 1000, databases 1100, designer user systems 1200, fabricator user systems 1300, network interface 1600, backup server hardware and software 1400 and backup data storage 1500.

As previously noted, the illustrated architecture is exemplary insofar that GMR Sever System 1000 and NICECAD Server System 200 could easily be hosted on the same server system. For clarity, FIGS. 20–25 depict and the following description focuses on the second aspect of the invention as an independent system. However, in the preferred embodiment both aspects are implemented as an integrated system. In that case, network interface 1600 (FIG. 20) and network interface 260 (FIG. 2) are the same. Likewise, database 1100 (FIG. 20) and database 210 (FIG. 2) may comprise elements of an integrated database. Backup server hardware and software 1400 and backup data storage 1500 (FIG. 20) and backup server hardware and software 240 and backup data storage 250 (FIG. 2) could be integrated. And finally, it should be noted that the terms "fabricator" user systems 1300 and "designer" user systems 1200 (both of FIG. 20) and "prime contractor" user systems 220 and "supplier" user systems 230 (both of FIG. 2) are broadly descriptive. A designer searching the GMR database may be the prime contractor, and an outsourced fabricator is considered to be a supplier.

Network interface 1600 may comprise any network that allows communication amongst the components, and may encompass existing or future network technologies, as previously discussed in connection with network 260 (FIG. 2). In one embodiment, use of the Internet as network 1600 is beneficial since it may maximize the universe of designers and fabricators who may participate in the GMR system.

Designer user systems 1200 may comprise any system capable of interfacing with network 1600. Designer user systems 1200 may comprise "standard" computer systems that do not require specialized hardware or software to use the GMR system. Designer user systems 1200 may comprise personal computers or any like computer systems described in connection with prime contractor user systems 220 (FIG. 2). In the preferred embodiment, designer user system 120 comprises a personal computer or workstation running a standard operating system such as Windows NT, and using a standard browser such as Microsoft Internet Explorer™ 5.0 capable of interpreting HTML 4.0, XML, VRML, and running Java™ applets, so as to support a substantially platform-independent interface with GMR Server System 1000. As discussed previously in connection with the NICECAD aspect of the integrated system, user systems such as designer user systems 1200 may comprise computer systems using a custom browser tailored to the present application. As before, in other embodiments, such user systems may be executing server-provided semi- machine-dependent applications, particularly for graphics-intensive applications, which might be coded in a language such as Open GL™. Even where such applications are executed by user systems, a platform independent network interface can be maintained.

Similarly, fabricator user systems 1300 may comprise any system that may interact with the central server system over network 1600.

Backup data storage 1500 comprises a system for backing up the data stored by the interactive EDM system, and can comprise the storage technologies and/or architectures discussed previously in connection with module 250 of FIG. 2.

Backup server hardware and software 1400 comprises one or more backup servers, including server modules, to reliably support the second aspect of the invention, and may comprise backup means discussed in connection with module 240 of FIG. 2.

Databases 1100 depict the storage that may be employed to store data maintained by the GMR system, including storage technologies discussed in connection with database 210 of FIG. 2. Databases 1100 may store the fabricator specific information stored in Global Manufacturers Registry data module (e.g., see FIG. 22, block 3000), as well as designer account data, fabricator account data, and other data. In one embodiment, databases 1100 resides locally with GMR server system 1000, although future network technologies supporting greater bandwidth may support remote location.

GMR server system 1000 comprises a server system supporting the interactive GMR system. GMR server system 1000 interfaces with designer user systems 1200 and fabricator user systems 1300 through network 1600. GMR server system 1000 may include the hardware and software to interface with designer and fabricator user systems on a substantially platform independent basis so that the designer and fabricator user systems do not require their own specialized hardware or software. Generally, GMR server system 1000 includes system administration, database manipulation, and network-related operations software modules. GMR server system 1000 may also include the specialized software, some server side and some client side interactive, for supporting upload, conversion, processing and analysis of part design models, such as two-dimensional models or three-dimensional solid models.

GMR server system 1000 may also include the hardware and software for multimedia operations such as voice, video and graphics, that may be transmitted over the network for presentation to user systems with standard client-side multimedia support. In the preferred embodiment, where the first and second aspects of the invention are part of an integrated system, this multimedia support is provided by multimedia communications processing module 978 (FIG. 13) and multimedia session records are stored at module 890 (FIG. 8). The CAD capability for permitting multimedia sessions involving the viewing and manipulation of a part design model are provided by CAD processing module 932.

In one embodiment, GMR server system 1000 may be publicly accessible as a web site, but may provide multiple levels of security (e.g., multiple "firewalls") to ensure that proprietary designer and fabricator data may be protected. In addition to firewalls, strong (e.g., RSA 1024 bit) encryption may be provided to protect proprietary data. GMR server system 1000 may be accessed only by users with a user ID and password. In one embodiment, GMR server system 1000 may comprise a "back end" processing server running UNIX for the model processing and database operations, and a "front end" web server running Windows NT™ and Microsoft's Transaction Server™ for network-related operations. Of course, where the first and second aspects of the invention are integrated, then such functions are performed by system administration processing module 902 (FIG. 9).

The GMR Server System

FIG. 21 illustrates some of the various software components or modules of GMR server system 1000. GMR server system 1000 may comprise user logon authentication module 2050; designer service authorization module 2100; contract processing module 2150; report generation module 2200; billing information processing and report generation module 2250; fabricator update processing module 2300; search initiation module 2320; general GMR search query processing module 2350; interactive designer preference module 2400; interactive designer part design model processing module 2450; part design model file parsing module 2500; interactive designer attribute assignment module 2550; user preference first query set processing module 2600; producibility analysis second query processing module 2650; query results reconciliation processing module 2700; GMR designer account processing module 2750; GMR fabricator account processing module 2800; other server side applications 2850; quality assurance processing module 2905 and other client side interactive applications 2900. As previously noted, where the NICECAD and GMR aspects of the invention are integrated, some of these modules may be subsumed in similar modules described in connection with the first aspect of the invention.

User logon authentication module 2050 may comprise a security module for limiting access to the interactive GMR system. Designer service authorization module 2100 may comprise a module that sends designer authorization information including, for example, information to tell the designer requesting a service, such as a search request, that the request may result in a billing action and that proceeding further constitutes final authorization. Contracts processing module 2150 may comprise a module that ensures that before a fabricator registers with the system, and before a designer uses the system, contracts specifying the responsibilities of each party regarding data protection, maintenance and system usage are formalized. Report generation module 2200 may comprise a module that formats and sends reports requested by users that, in one embodiment, may be sent as browser pages or links to downloadable files. Billing information processing and report generation module 2250 may be a module that processes and stores billing information whenever a billable transaction occurs. Billing information processing and report generation module 2250 generally automatically processes transactions as they occur and, in one embodiment, may also process billing summary reports upon user request.

Fabricator update processing module 2300 may be a module that allows fabricators to load their fabricator specific data into the database, as well as update their data when their background or capabilities change (e.g., the manufacturing facility relocates or a new machine is purchased). One of the advantages provided by the GMR capability of the invention is that it not only provides a searchable database for designers/prime contractors, but it also can function as a capability management system for fabricators. The fabricators can input, update and otherwise maintain an inventory of their capabilities and experience that can be used for capability management and marketing independent of its application for GMR searches. This incidental benefit to the GMR system provides an incentive for fabricators to register in the first instance. It also means that the burden of maintaining the fabricator capability data does not rest on the GMR system provider.

Search initiation module 2320 may be a module that permits a user to initiate a search session. In one embodiment, search initiation module 2320 may present to the user's browser a "search page" from which particular searches can be launched.

General GMR search query processing module 2350 may be a module that permits a user to conduct a general search of the GMR database for data that may be generally accessible (or nonproprietary). In one embodiment, general GMR search query processing module 2350 supports searches by both designers and fabricators who wish to access general information regarding registered fabricators. Generally, a so-called general search involves search criteria that are not directly related to a design. For example, a general search may query such information as a fabricator's location, shop certifications (e.g., ISO 9000/9001/9002), operator certifications (e.g., are CNC milling machine operators factory trained?), and like information.

Interactive designer preference module 2400 may comprise a module that permits a designer to input so-called "preference" data in order to search the GMR database based on a limited GMR search. For a limited GMR search, the designer is not required to upload a part design model, but may select a series of criteria for qualifying fabricators (such as lead times, material, lot sizes, machinist/craftsman certifications, etc.) that are considered global. Unlike a general search, the limited search may result in the search of limited access (or proprietary) fabricator data (e.g., see FIG. 22, blocks 3200–3400) and, consequently, this option may be limited to designers. In one embodiment, the designer may select a set of preferences from a browser interface with GMR server system 1000 that, following confirmation, may be temporarily stored and tagged with owner ID, session ID and time stamp (see FIG. 22, stored designer preference data module 3550). These preference inputs may then be processed to generate a first query set. It should be noted that while a preference query may search proprietary data to identify qualifying fabricators, the underlying proprietary data is generally not provided to a searching designer. The fabricator "owns" the proprietary data maintained on the GMR system, and generally only the owner can view and edit said proprietary data.

Interactive designer part design model processing module 2450 may comprise a module that permits a designer to upload a file representing a product or part to be fabricated (the term part design model used herein generally refers to such a file). According to one embodiment, the part design model may comprise a three-dimensional (3D) solid model. In another embodiment, the part design model may comprise a two-dimensional (2D) model. In one embodiment, interactive designer part design model processing module 2450 sends a page to the designer's browser that provides for the launch of a client-side Java™ applet that may be executed to permit the following operations: browse local memory for the file, select the file format, and upload the file to GMR server system 1000. In one embodiment, interactive designer part design model processing module 2450 may convert the uploaded part design model to a neutral or common format, such as an AP214 STEP file, so that stored models share the same file format. This furthers the data neutrality attribute of the invention previously discussed. In one embodiment, interactive designer part design model processing module 2450 may also provide utilities for the designer, such as for the conversion of solid model files among different file formats, such as between IGES, STEP AP203 and AP214 model formats and other CAD-vendor specific formats, known to those of skill in the art.

Part design model file parsing module 2500 may comprise a module that identifies graphical entities (e.g., geometric and/or topological features) contained in an uploaded part design model file and converts them to a neutral format before storage. In one embodiment, each entity may be tagged with an owner ID, session ID and time stamp before storage in an object database (e.g., see FIG. 22, module 3600). If the uploaded file contains non-graphical data such as geometric dimensioning and tolerancing information (known to those of skill in the art as GDT data), these data items may be extracted, converted to a neutral format, and tagged before storage in the object database. Part design model file parsing module 2500 may also perform a check to ensure that no duplicate entities exist.

Interactive designer attribute assignment module 2550 may comprise a module that permits a designer to assign attributes to entities of the stored part design model. A part design model may comprise a series of geometrical and topological entities, each of which may be assigned its own attributes (such as surface finish, material, direction vector, etc.).

In one embodiment, interactive designer attribute assignment module 2550 may provide for the launch of a Java™ applet or like miniapplication at designer user system 1200 for attribute assignment. A textual list and graphical presentation of the model entities may be sent by GMR server system 1000 to designer user system 1200 for presentation. A list of standard attributes (e.g., see FIG. 22, stored standard attributes data module 3500) may also be sent by GMR server system 1000 to designer user system 1200 to facilitate the process. The list may include such items as feature name (so the designer may name the entity), tolerance type (e.g., flatness, linear, angular, runout, etc.), tolerance range, surface finish value, and fabrication standard (e.g., MILSPEC, ISO, ANSI, ASME, and others known to those of skill in the art). For example, the designer may also input direction vectors for each entity that define the outside surface of the model. By keyboard entry or "point and click" use of a mouse (or similar pointing device), the designer may be enabled to select entities and assign attributes and attribute values. Upon completion of attribute assignment, the assigned information may be associated with the entities stored by GMR server system 1000 in the database. It should be noted that, in the case of a "complete" solid model (e.g., a STEP AP214 file), sufficient information may exist for an acceptable producibility analysis to be run without further inputs, in which case attribute assignment may be avoided.

User preference first query processing module 2600 may comprise a module that prepares a first query as a result of the designer's preference inputs (see interactive designer preference module 2400 above) which may be run against the database to identify a first results list of qualified fabricators. In the case of a limited search, this may be the end of the designer session. In a limited search, appropriate results (e.g., the identity of all qualified fabricators) may be stored in the designer's account data and appropriate results (e.g., referral results providing basic information about the designer) may be stored in each qualified fabricator's account data. Notice may be then given to the designer and qualified fabricators that results have been posted. For a fill search, on the other hand, the first results list may be combined with the second results list before posting, as described in detail below.

An non-exhaustive list of the types of information in a preference query includes: whether the fabricator is ISO9001 certified; whether the vendor has specified trade association affiliations; whether the vendor is a minority-owned business or meets other requirements or standards under the federal acquisition statutes and regulations; whether the vendor meets the specified GMR quality assurance rating (discussed further below); whether the vendor is within 1000 miles of the designer's location; whether the vendor can support specified transportation modes, such as air, rail, and truck; whether the vendor can operate in a so-called "just-in-time" inventory environment; whether the vendor has the ability to process Catia™ CAD/CAM design data; how many MILSPEC contracts has the vendor completed successfully; and has the vendor breached past contracts or otherwise fail to fully meet past contractual obligations.

For a full search (which may include the upload of a part design model, producibility analysis and a second query, among other steps), producibility analysis second query processing module 2650 performs a producibility analysis of the uploaded, converted and attribute-assigned part design model in order to prepare the second query set for a second results list of qualified fabricators.

One Example of Producibility Analysis Logic

As one of ordinary skill can appreciate, various steps may be performed for the producibility analysis. According to one embodiment, the steps performed ensure that the material from which a part is to be made is compatible with any preferred processes selected by the designer. If no preferred processes are specified, all processes for which the material may be acceptable are identified for inclusion in the second query set.

Each surface entity may be checked for a direction vector defined by the designer; if none exists, the system attempts to define a direction vector for all surfaces in order to permit an interference check. Each surface may be then projected along its direction vector in order to check for interference. If interference exists, then the conflicting surface entities are noted and the designer may be given appropriate notice (e.g., by e-mail) so that the conflict may be resolved (e.g., by modifying the attribute assignment). The results of the interference check may be used to ensure that designer-selected processes are appropriate for the part, particularly to ascertain any machine tool/die interference in the case of machining, forging, sheet metal and other such processes. For example, a forged part must have surfaces shaped in such a way as to permit a die press (e.g., drop forge) to fall along a straight path when the blank is struck. For example, a complex part may not be machinable, but may be cast and then finished with slurry processing and machining processes. If no processes are specified by the designer, all appropriate fabrication processes identified by this analysis may be included in the second query set.

The system may perform a volume approximation of the part represented by a 3D part design model in order to assess producibility using various processes, such as casting, where volume may be an important consideration.

The part design model may also be evaluated for the existence of passages or voids (e.g., closed channels, holes and other internal features that may require material removal). The size and topology of these passages or voids may be evaluated for producibility using various processes, such as machining, where passage topology may be an important consideration.

The part design model may also be evaluated based on an envelope enclosing the part represented by the model. The dimensions of the envelope may be used to assess which machines may be used to manufacture the part and also what material stock may be used. For example, a cylindrical part will likely be made using a lathe and may require rod stock of a certain size.

The producibility analysis steps may also estimate the part design model thickness to determine if the part may be made of sheet stock, and to what extent specific features or entities may be produced using sheet metal processes.

Each entity assigned a tolerance may be evaluated for whether it may be achieved for the selected processes. If no process is specified, all processes capable of achieving the desired tolerance may be included in the second query set.

The part design model may be evaluated for topological symmetry to estimate the suitability of symmetrical manufacturing processes such as spinning or lathing. Acceptable processes may then be included in the second query set.

For each surface finish specified by the designer, all finishing processes capable of achieving that finish may be identified and included in the second query set. Each specified surface finish, as well as each tolerance, may also be evaluated to ensure compatibility with the overall part design model topology.

As one of ordinary skill in the art can appreciate, there are a multitude of variations of the producibility analysis that do not depart from the spirit of the invention disclosed herein, which is to employ some automated logic to perform part-specific analysis in order to identify fabricators.

Producibility analysis second query processing module 2650 may be a module that uses the results of the producibility analysis to prepare a second query set. The second query set may be compared to databases 1100 to generate a second results list of qualified fabricators. In one embodiment, the raw producibility analysis results, including producibility analysis methodology, may be also be stored and made available to the designer.

When a full search (i.e., using the first query set based on preference data and the second query based on the part design model/producibility analysis) is conducted, multiple sets of qualified fabricators may be produced. A predetermined number, such as two sets, may be produced, for example, one set corresponding to each query. Query results reconciliation processing module 2700 reconciles the produced fabricators to render a single list of qualifying fabricators (e.g., for two sets of results, those appearing in both result lists). If the results cannot be reconciled (e.g., there are no qualified fabricators appearing in both lists), the results may be analyzed to identify the most likely cause of the reconciliation failure. This information may then be stored in the designer's results report.

GMR designer account processing module 2750 may comprise a module that maintains and updates all account data for each designer. In particular, this module may provide that records are stored for each designer session (a designer session may be one complete cycle of a search), including the search results, as well as all transactions (a designer transaction refers to any time the designer logs onto the system, such as to retrieve results or have a custom report prepared). In one embodiment, GMR designer account processing module 2750 may provide that a designer user ID, session ID, time stamp and descriptive information (including the search results) be stored following each completed session. In one embodiment, GMR designer account processing module 2750 provides that a designer user ID, session ID, and time stamp are stored following each transaction (e.g., if the designer 99 logs on to have the results from sessions 101 and 102 downloaded at 1:30 p.m., then all of this information may be recorded as a transaction).

GMR fabricator account processing module 2800 is similar to GMR designer account processing module 2750, only the former may record account data for each registered fabricator. GMR fabricator account processing module 2800 may store records for each session (a session may be a general search by the fabricator, GMR input/update of fabricator specific data, or the referral results emanating from a designer search that identified this fabricator as qualified) and each fabricator transaction (a fabricator transaction refers to any time the fabricator logs onto the system, such as to retrieve referral results or have a report generated), or may only store some sessions or transactions. In one embodiment, a fabricator user ID, session ID and time stamp may be recorded for each session and transaction. For example, when a designer search identifies a particular fabricator as qualified, the referral results may be posted in the fabricator's account by this module.

Quality assurance processing module 2905 comprises a module that provides the quality assurance rating capability of the system. Following the performance (or lack thereof) of a fabrication effort by a GMR-registered fabricator, the prime contractor is given an opportunity to provide feedback to the GMR system regarding performance in terms of timeliness, quality, and other relevant considerations. In one embodiment, GMR server system 1000 may be accessed by the prime contractor for browser pages or the like to provide a performance assessment. The quality assurance survey may include a series of questions which can be answered quantitatively (e.g., answered as 1–5, with "5" being "excellent" or "strongly agreed" and "1" being "poor" or "strongly disagree"). Such data can be compiled and statistically aggregated into a series, or one overall, quality assurance rating. The quality assurance browser forms may also include questions to be answered in a narrative manner, not necessarily to be compiled, but to be made available to subsequent users of the GMR system. Quality assurance processing module 2905 supports not only the collection and compilation of such data, but also the distribution of the data to system users.

Other server side applications 2850 refers to any other predominantly server side applications run by GMR server system 1000 to support the interactive EDM system. For example, this module may include software for system administration, database manipulation, and network-related operations. This module may include software to support multimedia applications such as the transport of voice, video and graphics over the network.

Other client side interactive applications 2900 refers to any other predominantly client side applications that may be supported by GMR server system 1000. For example, if multimedia operations require specialized capabilities exceeding standard user system multimedia support, other client side interactive applications 2900 may provide those capabilities in the form of downloadable executable code. In one embodiment, such client-side capabilities are supported through the use of machine independent Java™ applets supported by standard browsers.

The Global Manufacturer's Registry (GMR) Database

Databases 1100 contains the data used by the GMR system. Internal analysis criteria data module 3450 represents any stored constants and other data used to implement the producibility logic (e.g., see FIG. 2, module 2650). Stored standard attributes data module 3500 represents attributes, and may also include attribute values, that may be made available to designer user system 1200 to select for attribute assignment (e.g., see FIG. 2, module 2550). In one embodiment, this data may be transmitted to an applet launched at designer user system 1200 so that the designer may readily assign attributes and values to selected graphical entities. In the integrated embodiment, module 3500 is integrated with module 845 of FIG. 8. Stored designer preference data module 3550 may comprise stored preference data that may be input by the designer for the first query set (e.g., see FIG. 2, module 2400). Stored designer part design model data module 3600 may comprise the stored part design models, including graphical and non-graphical entities and any associated attributes. As noted above, in one embodiment, each entity may be appropriately tagged to facilitate data management.

Account data 3900 may comprise account data maintained by the system for designers and fabricators. In one embodiment, account data 3900 may comprise both session records (such as searches, including search results; referrals, including description of the referring designer; GMR updates; etc.), and transaction records (such as results retrieval, report printouts, etc.). Account data 3900 may be further logically divisible into designer account data module 3800 and fabricator account data module 3850. Where the GMR and NICECAD aspects of the system are part of the integrated embodiment, account data 3900 may be combined with account data 320 of FIG. 3.

Figure 22:
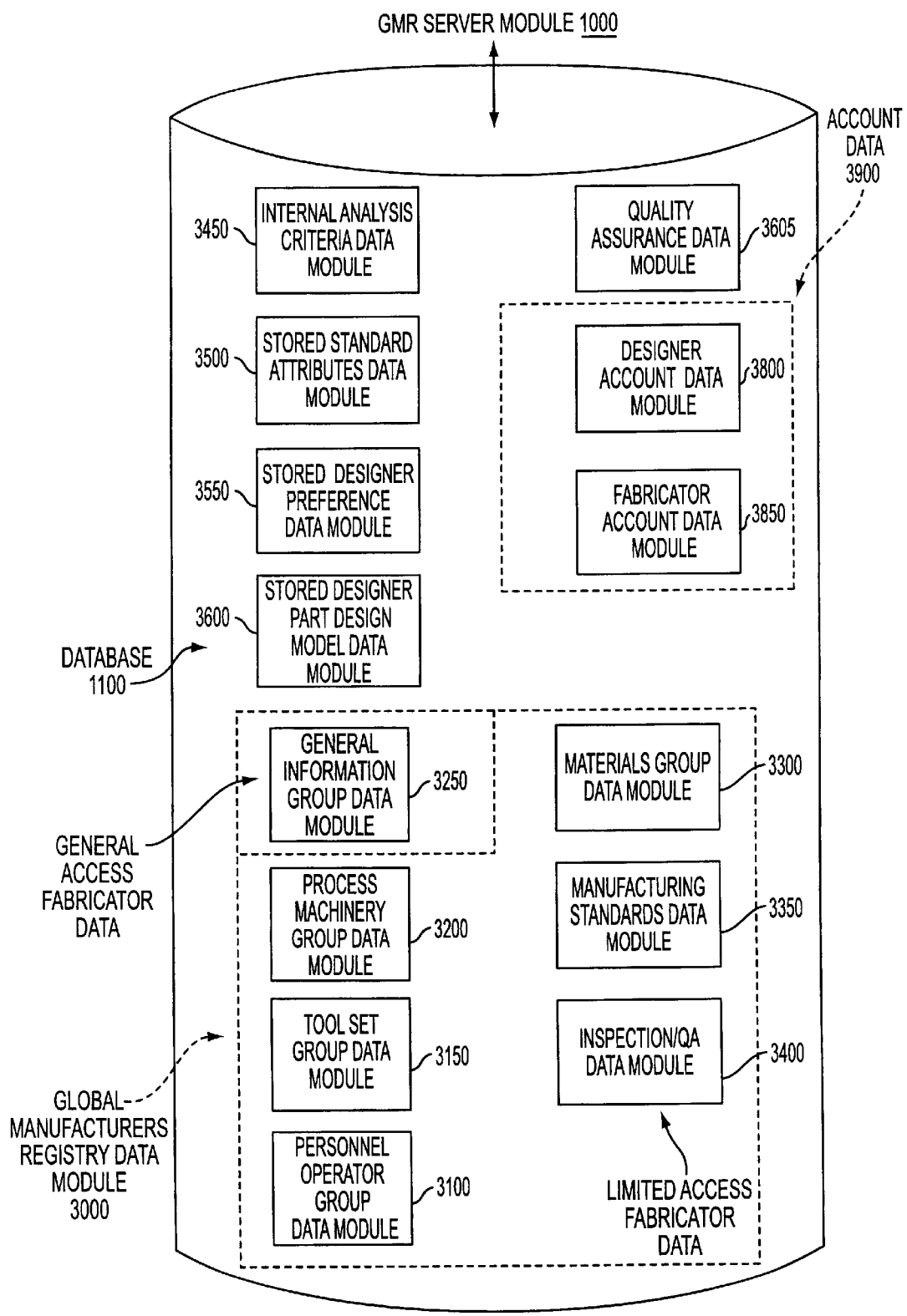
FIG. 22 is a block diagram, according to an embodiment of the present invention, illustrating the GMR database in greater detail, including the stored fabricator data, account data and other data.

Quality assurance data module 3605 comprises quality assurance data collected reflecting the performance of fabricators on the GMR system. The module may comprise both the underlying data submitted by designers/prime contractors using electronic survey forms or the like, as well as the aggregated GMR quality assurance rating that derives therefrom. While FIG. 22 depicts quality assurance data module separate from GMR data module 3000, it should be appreciated the GMR quality assurance rating(s) are searchable by system users. For example, a preference query (to be discussed below) might include criteria regarding quality assurance rating, such as to identify only fabricators with a net rating of "3" or better.

Global Manufacturers Registry (GMR) data module 3000 comprises fabricator specific data stored for registered fabricators. As indicated by the arrows on FIG. 22, the module may contain both general access (non-proprietary) data and limited access (proprietary) data. In one embodiment, limited access data may be directly accessible only by the owner (e.g., the fabricator that submitted the data). In one embodiment, the data owner may also give authorization for particular users to access the owner's proprietary data. In general, the interactive GMR system itself may issue queries that search both types of data to locate qualified fabricators in response to a designer search request. This may be the case even though the results presented to the designer contain no proprietary information.

As those of ordinary skill should appreciate, GMR data module 3000 may contain a multitude of different types of fabricator information that may be used for designer searches, so that the categories depicted below are illustrative only and non-exhaustive.

General information group data module 3250 may contain general information, such as location, certifications and affiliations, transportation modes, CAD capabilities, trade restrictions (import/export tariffs, technology transfer restrictions, etc.), electronic commerce capability, computer hardware/software capability, status as federally-recognized minority-owned, small business or other special categories, and other items not related to specific machinery or manufacturing capabilities.

Process machinery group data module 3200 may contain information pertaining to the machinery and processes used by the fabricator. Information such as machine models, stock types and sizes, tolerances associated with the machine, production rates, lead times, set-up costs and times, numerical control systems, and other information may be included. Since different machines may support different processes, the inputs may vary from machine type to machine type. For example, a forging process may have a different input set than a vertical mill. Information about specific process capabilities may be included, such as electro-chemical machining, core casting, investment casting and powdered metal processing. Information pertaining to outsourced processes may also be included.

Tool set group data module 3150 allows a fabricator to catalog standard and custom tools used by machines. In one embodiment, standard machine tool lists (listing such items as end mill cutters, drills, abrasives, etc.) may be provided to limit the amount of information required by the fabricator. In one embodiment, an interactive application in the form of a Java™ applet may be provided to fabricator user system 1300 so that custom tools may be built interactively from a component list (e.g., see FIG. 21, module 2300).

Personnel operator group data module 3100 may contain information about the machinists, craftsman and operators of machines and processes, including years of experience and any certifications. In one embodiment, privacy may be maintained by limiting input to non-personal data.

Materials group data module 3300 may comprise information regarding those materials the fabricator can work. For example, maximum and minimum stock sizes, stock types (e.g., billet, rod, bar, sheet, powder, etc.) and material types (e.g., steel, aluminum, titanium, etc.) may be specified. In one embodiment, the fabricator may select from a standard list of materials, including material stock types, provided to the fabricator.

Manufacturing standards data module 3350 comprises data regarding those standards to which a fabricator can manufacture a part (e.g., MILSPEC, ISO, ANSI, ASME, and others well known to those of skill in the art).

Inspection/QA data module 3400 comprises fabricator-specified data regarding inspection processes, equipment and applicable standards. In other words, the fabricator may specify what methods are used to verify that a part has been made to designer specification and under what standards inspections are conducted.

As should be appreciated by those of ordinary skill, a variety of database structures and database management programs may be used for databases 1100. In one embodiment, an object-oriented database structure may be employed combining Oracle 8™ and ObjectStore™ software, well known to those of skill in the art.

A Method for a Search Session using the GMR System

Figure 23:
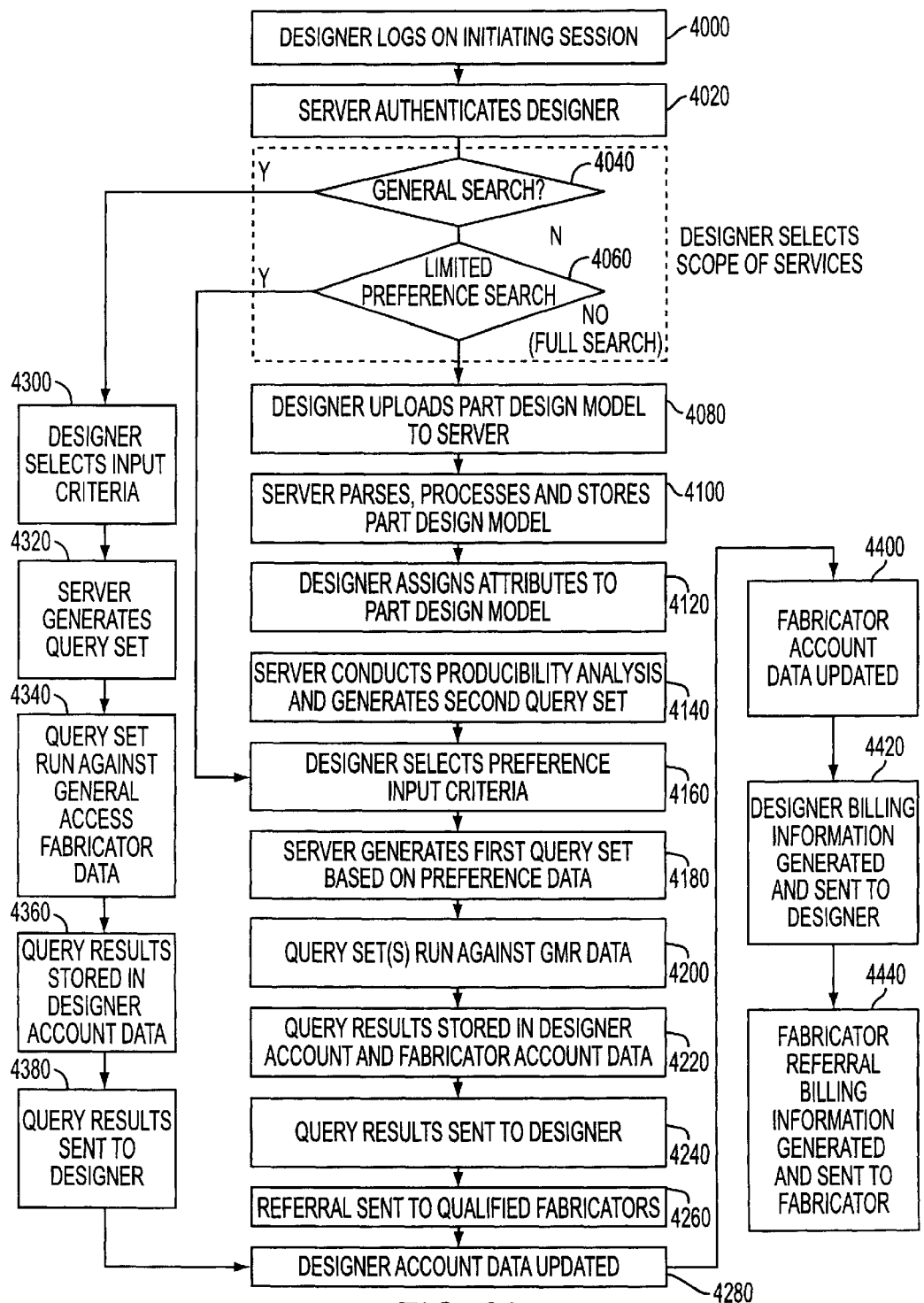
FIG. 23 is a flowchart illustrating a method, according to an embodiment of the present invention, for a designer search session using an interactive EDM system.

According to an embodiment of the present invention, a method for a designer search session using the GMR system is described in FIG. 23. Referring to FIG. 23, the designer first logs onto the interactive system, as in step 4000, by connecting designer user system 1200 to GMR server system 1000 through network 1600. The system is generally preferred to be secure, so that GMR server system 1000 authenticates or verifies that the designer is an authorized user, as in step 4020. GMR server system 1000 may carry out this function through a software component such as user logon authentication module 2050, depicted in FIG. 21.

Following authentication, the designer selects the scope of services that are requested for the search session. According to one embodiment, the designer may select a general search of non-proprietary data, as in step 4040. The non-proprietary data may be data such as that stored in general information group data module 3250, depicted in FIG. 22. In one embodiment, the designer makes this selection from a search page presented on a browser at designer user system 1200. This may be performed by a software component such as search initiation module 2320, in FIG. 21.

If the designer requests a general search, then the designer may select search criteria for the search of non-proprietary data, as in step 4300. For example, GMR server system 1000 may transmit a list of options for each of the data items contained in general information group data module 3250. According to this embodiment, the designer may select options such as desired location (e.g. East Coast or Pennsylvania fabricators), certifications/affiliations and CAD capabilities through the browser at designer user system 1200.

Based on input criteria selected by the designer, GMR server system 1000 prepares a query set appropriate for the general search, as in step 4320, which may then be run against general access fabricator data, as in step 4340, to identify fabricators meeting the criteria set by the designer. Steps 4320 and 4340 may be carried out by a software component such as the general GMR search query processing module 2350 depicted in FIG. 21. The results of the general search carried out by step 4340 may then be stored in the designer account data, as in step 4360, and sent to the requesting designer, as in step 4380.

In one embodiment, the general search results may be tagged with a user ID, session ID and time stamp before storage in the designer account, such as that depicted as designer account data module 3800 of FIG. 22, so that the designer may later retrieve them when desired. Thus, step 4380 may encompass a subsidiary step of GMR server system 1000 issuing an e-mail to the designer giving notice that the results have been posted. Upon such notice, the designer may log onto the system to retrieve the results by selecting the appropriate session in the designer's account for output as a report, to be discussed later in connection with FIG. 24.

Once the search has been conducted and the results posted, the designer account data may be updated to reflect completion of the task (including storage of the results), as in step 4280, as well as the corresponding fabricator account data, which may be updated for those fabricators identified as a result of the search, as in step 4400. Steps 4280 and 4400 may be carried out by software components such as those depicted as modules 2750 and 2800, respectively, in FIG. 21. Finally, any applicable billing information may be generated and sent to the designer, as in step 4420, and to fabricators identified as a result of the search, as in step 4440. These billing processing steps may be carried out by a software component such as module 2250 of FIG. 21, and may be stored in designer account data module 3800 and fabricator account data module 3850 of FIG. 22.

Returning to the "no" branch of decision block 4040, the designer may desire a search of the entire fabricator database, including proprietary data. As previously mentioned, the preferred embodiment provides that a limited search searches proprietary data to identify qualified fabricators to a searching designer, but the underlying proprietary data is not revealed to the designer. In this case, the designer may select between a limited preference search or full search, according to step 4060. As discussed above in connection with the system of FIG. 21, a limited preference search may result in a first query set, and first query results list, without necessitating a producibility analysis. A full search uses the part design model and the producibility analysis so that a second query set and second query results list may be produced. If the user desires a limited preference search, the method skips to step 4160, to be discussed below.

Otherwise, the designer may upload a part design model to GMR server system 1000, as in step 4080. Interactive designer part design model processing module 2450 may perform step 4080 using a platform independent Java™ applet. Where the NICECAD and GMR aspects of the invention are integrated, the part design model may have been previously created (e.g., using CAD processing module 932 of FIG. 12) and stored (e.g., at PDM data 335 of FIG. 8). In that case, step 4080 of uploading the part design model may not be required because it is already stored on the system in a neutral format.

In step 4100, GMR server system 1000 parses the part design model received from a designer into its constituent graphical and non-graphical entities that may be tagged and stored into an object-oriented database, such as the that depicted as stored designer part design model data module 3600 of FIG. 22. The designer may then assign attributes (and attribute values) which may be associated with the entities stored with the part design model, as in step 4120. The step of attribute assignment may be carried out by a software component such as that depicted as module 2550 of FIG. 21. As with step 4080, in the integrated embodiment of the invention, the complete, attribute-assigned part design model may already be stored, in which case step 4120 is not necessary.

Once the stored part design model is sufficiently complete, in step 4140, producibility analysis (details of which are provided above in connection with module 2650 of FIG. 21) may be performed to generate a second query set. As indicated above, the producibility analysis results may be considered intermediate to the extent they are primarily used for generating the second query set; however, the raw results and underlying methodology may be made available for the designer's consideration.

Step 4160 provides for the designer to select preference input criteria in order to conduct a search based on general parameters, as previously discussed. Step 4160 may be performed by a software component such as interactive designer preference module 2400 of FIG. 21, and may include the provision of a Java™ applet to facilitate preference selection. Based on the preference input criteria, a first query set for searching the database may be generated by GMR server system 1000, as in step 4180.

Once these query sets (e.g., the first query set in the case of a limited search and both the first and second query sets in the case of a full search) are generated, those sets are compared to the GMR data, as in step 4200. The query sets may be compared to all of the fabricator data, as depicted as GMR data module 3000 in FIG. 22, or only a subset of such data. In the case of a full search, two sets of results may be obtained, in which case step 4200 may include the application of reconciliation logic to combine the results into a single set (e.g., see FIG. 21, module 2700). Of course, as should be appreciated by those of ordinary skill in the art, the need for reconciliation logic may be obviated by simply reporting both sets of results.

In step 4220, the search results for the limited/full search may be saved into designer account data module 3800 (e.g., reporting qualified fabricators) and fabricator account data module 3850 (e.g., providing a referral describing the designer for which each fabricator has been qualified). Similar to step 4380, step 4240 provides for the query results to be sent to the designer, which may simply encompass an e-mail informing the designer that the results are posted and available for retrieval. Other notification may also be provided. Similarly, step 4260 provides for the referral emanating from the search to be forwarded to qualified fabricators, which may also encompass an e-mail notice.

Steps 4280 and 4400–4440 are repeated substantially as previously described.

A Method for a Designer to Retrieve Reports Using the GMR System

Figure 24:
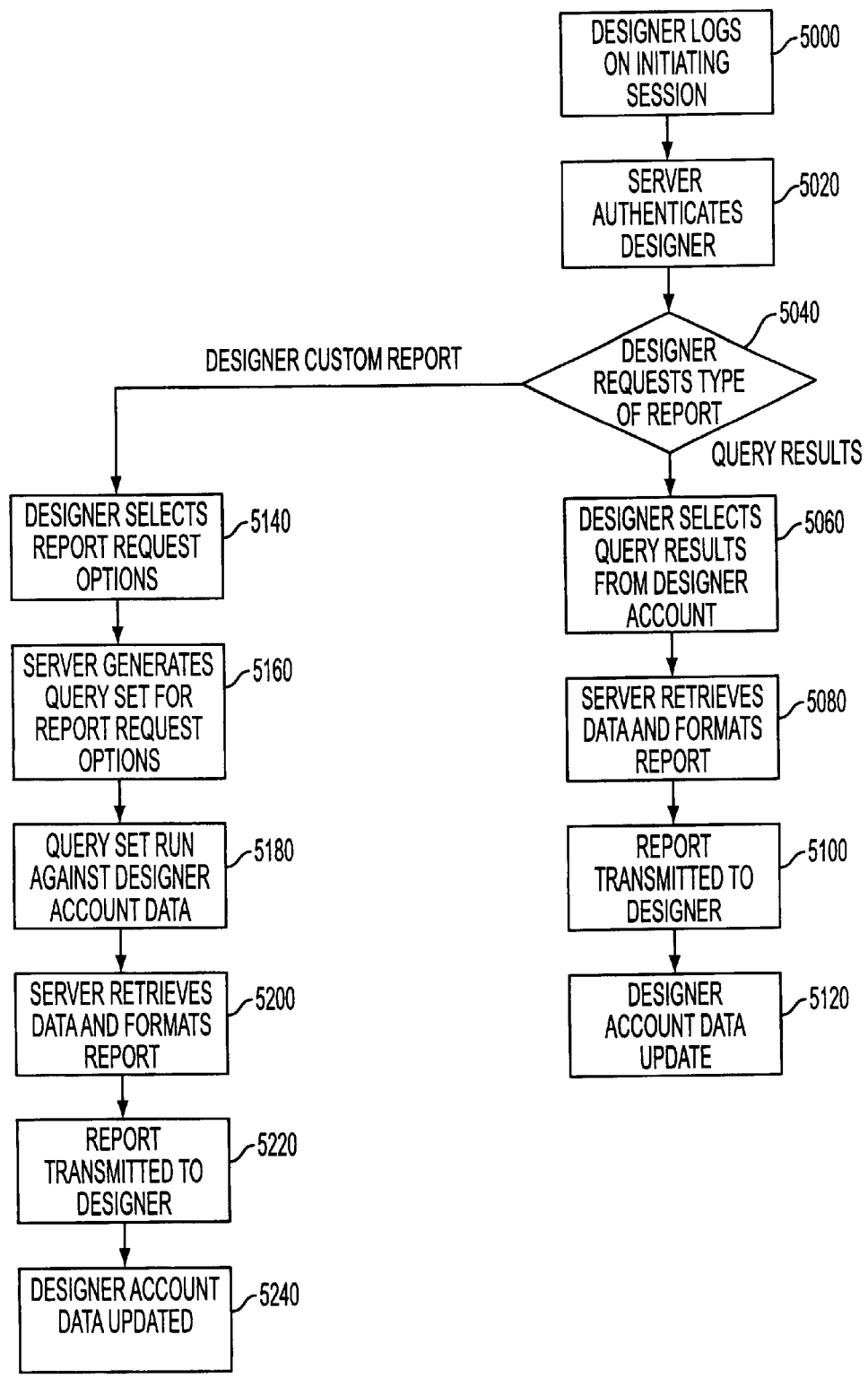
FIG. 24 is a flowchart illustrating a method, according to an embodiment of the present invention, for a designer to retrieve reports using an interactive EDM system.

According to an embodiment of the present invention, a method for a designer to retrieve reports from the interactive GMR system is described in FIG. 24. Referring to FIG. 24, the designer may log on according to step 5000, and may be authenticated according to step 5020. Next, the designer selects the type of report to be generated, as in step 5040. According to this embodiment, the designer may request a "standard" report detailing the query results from selected search sessions ("Query Results"), or a "custom" report summarizing transactions in which the designer has engaged ("Designer Custom Report"). In one embodiment, source data for both options may be stored with the designer account data, such as in designer account data module 3800 in FIG. 22.

If the designer wishes a standard report of query results, the designer selects the desired query results from the designer account, as in step 5060. In one embodiment, one or more browser pages listing past search sessions may be sent to designer user system 1200, along with various report format options, so that the designer may select and transmit the desired options back to GMR server system 1000. According to step 5080, GMR server system 1000 then retrieves the selected data from the designer account and formats the report as requested. According to step 5100, the report may be then transmitted to the designer. In one embodiment, the designer may be given the option of viewing the report directly as browser pages or of linking to a file for download as a standard word processing text document (e.g., in Microsoft Word™, Word Perfect™, etc.). The designer account data may be updated to reflect this transaction, as in step 5120.

If the designer desires a custom report, then the designer selects custom report options according to step 5140, which permits a search of the designer's entire account, including session records, transaction records, and billing records, for example.

According to one embodiment, step 5140 may include the use of a Java™ applet sent from GMR server system 1000 to facilitate the custom reporting option, which may include report format options. Based on the custom report options selected by the designer, GMR server system 1000 generates an appropriate query set, according to step 5160, which may then be run against the designer account data, according to step 5180. The results of the query may be retrieved and formatted for the report, according to step 5200. The report may then be transmitted to the designer, pursuant to step 5220, which, in one embodiment, entails browser pages and/or a link to a downloadable file. As before, the designer account data may be updated, as in step 5240.

A Method for a Fabricator Session Using the GMR System

Figure 25:
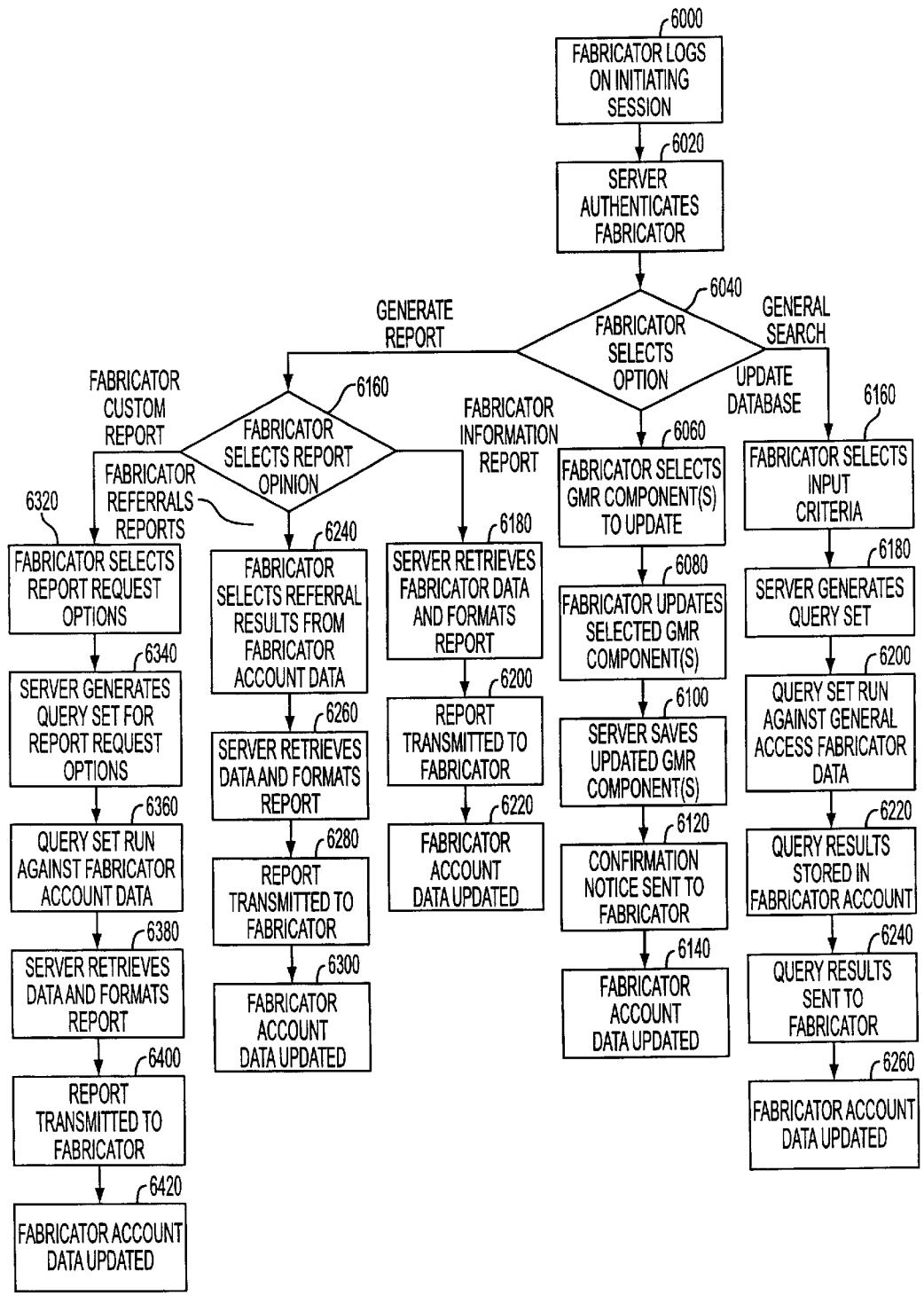
FIG. 25 is a flowchart illustrating a method, according to an embodiment of the present invention, for a fabricator session using an interactive EDM system.

According to an embodiment of the present invention, a method for a fabricator session using the interactive EDM system is described in FIG. 25. Referring to FIG. 25, the fabricator logs on to initiate the session, as in step 6000, and GMR server system 1000 authenticates the fabricator, as in step 6020. The fabricator selects an option, as in step 6040, which may include a "Generate Report" option, "Update Database" option, or "General Search" option.

If the fabricator selects the "General Search" option, the steps performed may be similar to those for a designer's general search (see FIG. 23, steps 4300–4380). The fabricator selects input criteria for the search of non-proprietary data, according to step 6160; GMR server system 1000 generates an appropriate query set, according to step 6180; the query set may then be run against general access fabricator data, according to step 6200; the search results may be stored in the fabricator account, according to step 6220; and the search results may be sent to the fabricator, according to step 6240; and the fabricator account data may be updated to reflect the search session, according to step 6260.

The "Update Database" option may be selected if the fabricator wishes to update he fabricator data stored in GMR data module 3000. Accordingly, step 6060 provides for the fabricator to select the database components that are to be updated. For the GMR database allocation depicted as GMR data module 3000 in FIG. 3, the fabricator might select, for example, the process machinery group data stored in module 3200 to reflect the purchase of a new machine. According to step 6080, the fabricator may then update the selected database component with the appropriate information, which may be then sent to back to GMR server system 1000. In one embodiment, GMR server system 1000 may facilitate the update by sending browser pages to the fabricator containing the existing information for that component, which the fabricator may then amend before selecting a send command on the browser page. Step 6100 provides for GMR server system 1000 to save the updated fabricator information to the appropriate location in the database (e.g., see FIG. 22, process machinery group data module 3200). Once the database has been successfully updated, a confirmation notice may be sent to the fabricator, as in step 6120. Finally, the fabricator account data may be updated to reflect the update session, as in step 6140.

The "Generate Report" option may be selected if the fabricator wishes to view a report. In this embodiment, three categories of fabricator reports may be supported, as reflected by the three paths emanating from decision block of step 6160. If the fabricator wishes to review stored fabricator information in the database to ensure it is current, then the "Fabricator Information Report" option may be selected. Accordingly, GMR server system 1000 retrieves the stored fabricator data (e.g., data for that fabricator ID contained in GMR data module 3000, FIG. 22) and formats the report, as in step 6180. The report may then be transmitted to the fabricator, as in step 6200, which, in one embodiment, may be accessed either as platform independent browser pages or a link to a formatted text file. Finally, the fabricator account data may be updated to reflect the transaction, as depicted by step 6220.

It is noted that the "Generate Report" and "Update Database" options for a fabricator session represent one embodiment of supporting the so-called "capability management system" previously mentioned. That is, the stored fabricator data on the GMR database is not only used to facilitate searches by designers hoping to identify qualified fabricators, but it incidentally also provides a ready means for fabricators to manage their resources and information. This provides a substantial benefit to fabricators listed in the GMR registry because it obviates or greatly reduces the need for using internal hardware, software and human resources for capability management. This provides a substantial benefit to the GMR provider and participating designers because it may induce fabricators to "enroll" in the registry in the first instance. Thus, fabricators otherwise not inclined to list with the registry may do so because of the benefit of the substantially cost-free capability management resource they will receive. These are significant benefits. In fact, a preferred embodiment may present options for viewing/modifying fabricator data explicitly as the "Manufacturer Capability Management System," so as to highlight this beneficial aspect of the GMR system. In presenting it as such, the GMR provider may also highlight the fact that it is network-based (e.g., "Internet Accessible" or "World Wide Web Accessible" or the like) and secure (e.g., "All Proprietary Information Securely Maintained").

The "Fabricator Referrals Report" option may be selected if the fabricator wishes to view referral results saved in the fabricator account data. The fabricator selects the desired referral results from the fabricator account, as in step 6240, which, in one embodiment, may be via browser pages sent from GMR server system 1000 listing all referrals in the account. Based on the fabricator's selection, GMR server system 1000 then retrieves the appropriate referral results and formats the report, as in step 6260. The report may then be sent to the fabricator, as in step 6280. The fabricator account data may then be updated to reflect the transaction, as in step 6300.

The "Fabricator Custom Report" option may be selected if the fabricator desires a customized report from the fabricator's account data. This option permits a search of the fabricator's account, similar to that for a designer custom report (discussed above). The fabricator selects the report options, according to step 6320, which, in one embodiment, may be facilitated through a server-supplied Java™ applet. Thereafter, GMR server system 1000 prepares a query set based on the selected options, as in step 6340, which may be run against that fabricator's account, as in step 6360. GMR server system 1000 retrieves the data and formats the report, as in step 6380, transmits the report to the requesting fabricator, as in step 6400, and updates the fabricator account data to reflect the transaction, as in step 6420.

A Third Aspect of the Invention: A System and Methods for Providing an Electronic Trading Community for a Part to be Built The third aspect of the invention provides an electronic trading community (ETC) whereby a prime contractor/designer with a part design model can electronically solicit bids or proposals by issuing a request for quote (RFQ) or request for proposal (RFP) to fabricators. In the preferred embodiment, the ETC capability of the system is integrated with the first and second aspects of the invention, the NICECAD capability for virtual collaborative engineering, and the GMR capability for identifying qualified fabricators. In that embodiment, a prime contractor may utilize the NICECAD capability to create a part design model, stored at a server in a neutral format, in the virtual engineering environment. The prime contractor may then utilize the GMR capability to identify a pool of qualified fabricators. The prime contractor may then utilize the third aspect of the invention to solicit bids from this pool, or from a subset of the pool if the prime contractor decides to exclude certain fabricators for some reason.

Figure 26:
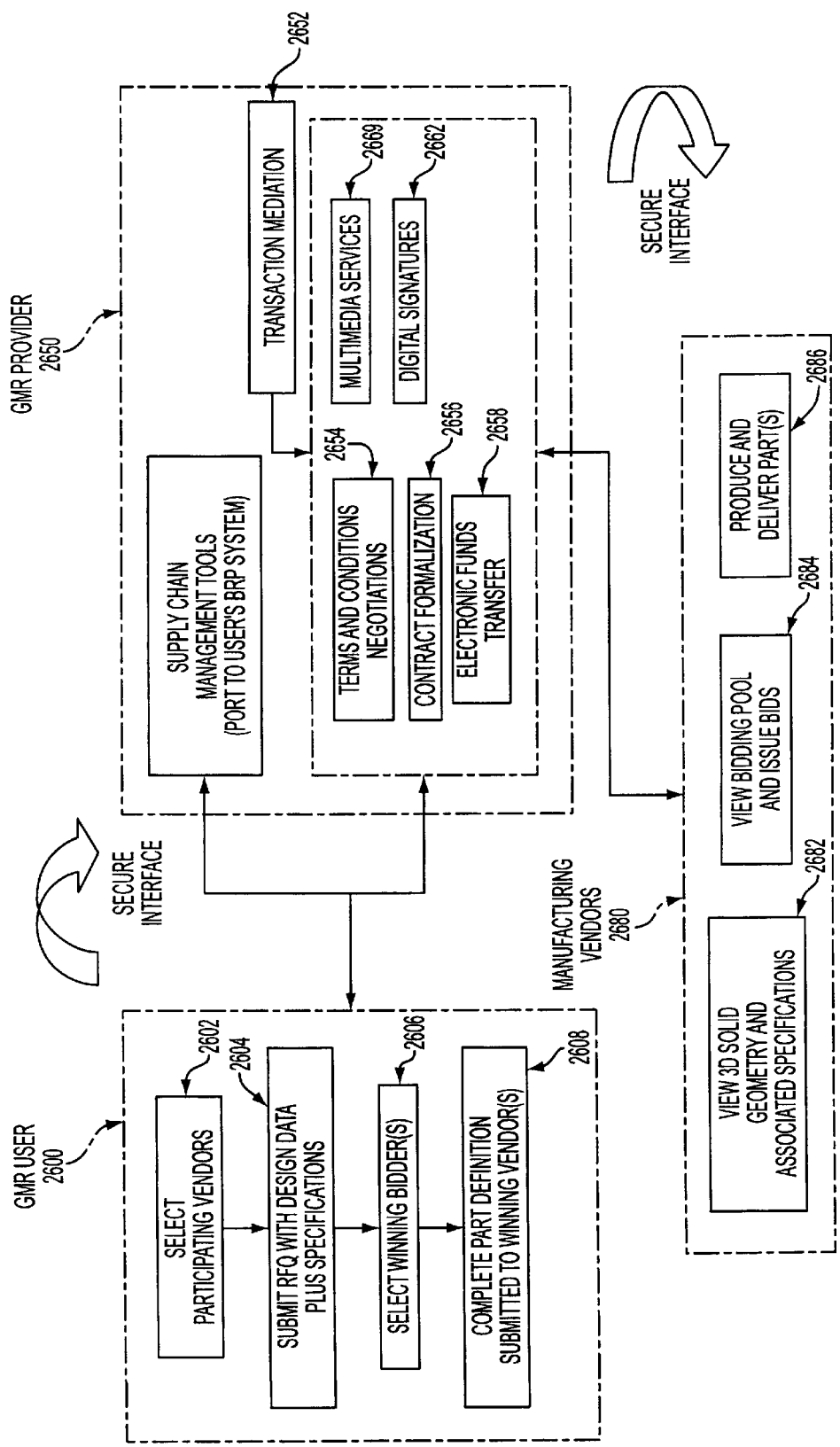
FIG. 26 is a functional diagram of the Electronic Trading Community of the invention, including the GMR user, GMR provider, and manufacturing vendors.

FIG. 26 provides a high-level functional diagram of the ETC capability of the system, including GMR user 2600, GMR provider 2650 and manufacturing vendors 2680. GMR user 2600 represents a designer or prime contractor seeking to out-source the manufacture of a product for which there exists a part design model. GMR user 2600 will select vendors for participation in the RFQ/bid process, as indicated by block 2602. As noted, in the integrated system, GMR user 2600 may select all or a part of the list of qualified fabricators emanating from a GMR search according to the second aspect of the invention. In an alternative embodiment, the ETC RFQ/bid process may be undertaken with one or more manufacturing vendors not previously registered or otherwise associated with the system. In such a case, GMR user 2600 may provide identification and other information to GMR provider 2650 so that the fabricator(s) can access the system to participate.

GMR user 2600 submits a request for quote to GMR provider 2650, the request comprising design and specification data, such as part design model data, and associated manufacturing specifications, as depicted in block 2604. If the part design model was created and stored using the NICECAD aspect of the system, the part design model and specification data can be provided by giving access permissions to specified fabricators, as discussed previously in connection with stored design and analysis access permission data module 860 of FIG. 8. Based on the bids submitted, GMR user 2600 will select one or more winning bidders, as in block 2606. Upon award, GMR user 2600 submits a complete part definition to the winning bidder(s), as in block 2608. We call what is eventually provided a "complete" part definition because what is initially provided may be a lower-fidelity data set (e.g., lower resolution graphical data) which is adequate for purposes of the bidding process. Upon completion of the bidding process, complete or high fidelity data is provided to the selected bidder (the "winner") who will actually be fabricating the part.

GMR provider 2650 represents the server-based system providing the ETC capability and communicating with GMR user 2600 and manufacturing vendors 2680 through a secure networked interface. GMR provider 2650 supports so-called transaction mediation (block 2652) between a prime contractor and bidding manufacturer(s) by supporting terms and conditions negotiations 2654, contract formalization 2656 and digital signatures 2662, electronic funds transfer 2658, and multimedia services 2669. Transaction mediation generally occurs after a prime contractor selects one or more winning bidders, and involves the formalization of an agreement corresponding to the selected bid. In this context, multimedia services 2669 refers to communications functionality supporting quasi-real time audio, video, and graphics, including CAD functionality supporting viewing and manipulation of a part design model as previously discussed.

Manufacturing vendors 2680 represents fabricators bidding in response to an RFQ or RFP submitted by GMR user 2600. Manufacturing vendors 2680 may view 3D part design models and associated specifications, as in block 2682. The ETC system may permit a prospective bidder to view the pool of bidders before preparing and submitting (or revising/updating) a bid, as illustrated by block 2684. For example, in one embodiment a "bidding pool list" identifying the dollar amount of the various bids is available to the bidders. The bidding pool list does not identify the bidders or disclose any detailed information provided by them to GMR user 2600. This list might indicate: "Bidder A: $25,000.00; Bidder B: $32,000.00, . . . " and so forth. Ultimately, a successful bidder will product and deliver parts, as in block 2686.

Figure 27:
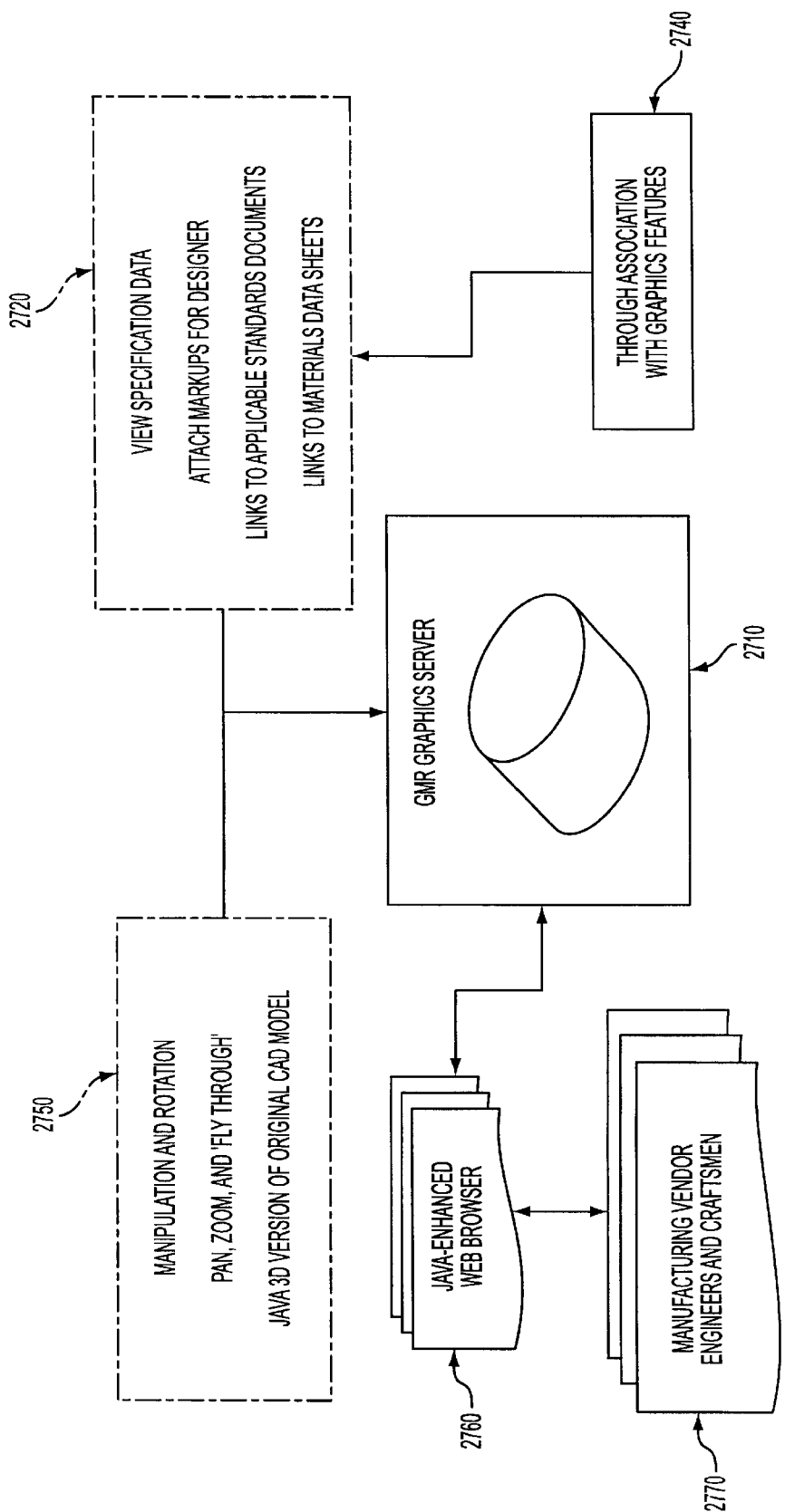
FIG. 27 illustrates how a manufacturing vendor can evaluate a part design model hosted on a GMR graphics server.

FIG. 27 further illustrates how the capabilities of the present system are used by a bidding fabricator in evaluating an RFQ. GMR graphics server 2710 (e.g., GMR server system 1000, FIG. 20) provides for manufacturing vendor engineer and craftsmen (2770) to view the stored part design model and associated features via, in the preferred embodiment, a Java™-enhanced browser (block 2760). Using the aforementioned CAD capabilities, vendor engineers and craftsman 2770 can examine the part design model according to various views. As depicted by block 2750, the preferred embodiment utilizes a Java™ 3D version of the part design model supporting manipulation and rotation, pans, zooms and fly-throughs. Manipulation may comprise a request to view the part design model in a higher fidelity representation. As depicted by blocks 2740 and 2720, graphical entities of the part design model may have links to specification data, standards and materials data sheets. Further regarding block 2720, and as previously discussed in connection with multimedia communications processing module 978 (FIG. 13) and CAD processing module 932 (FIG. 12), so-called "markups" can be attached to the part design model to facilitate discussions with the prime contractor. As discussed previously in connection with the graphics and CAD capabilities of the invention, the viewing and the various manipulations of a part design model (and associated features) could be accomplished by means other than Java™-enhanced browsers. Custom browsers could be used. Also, server-provided semi- machine-dependent applications could be used as well.

Figure 28:
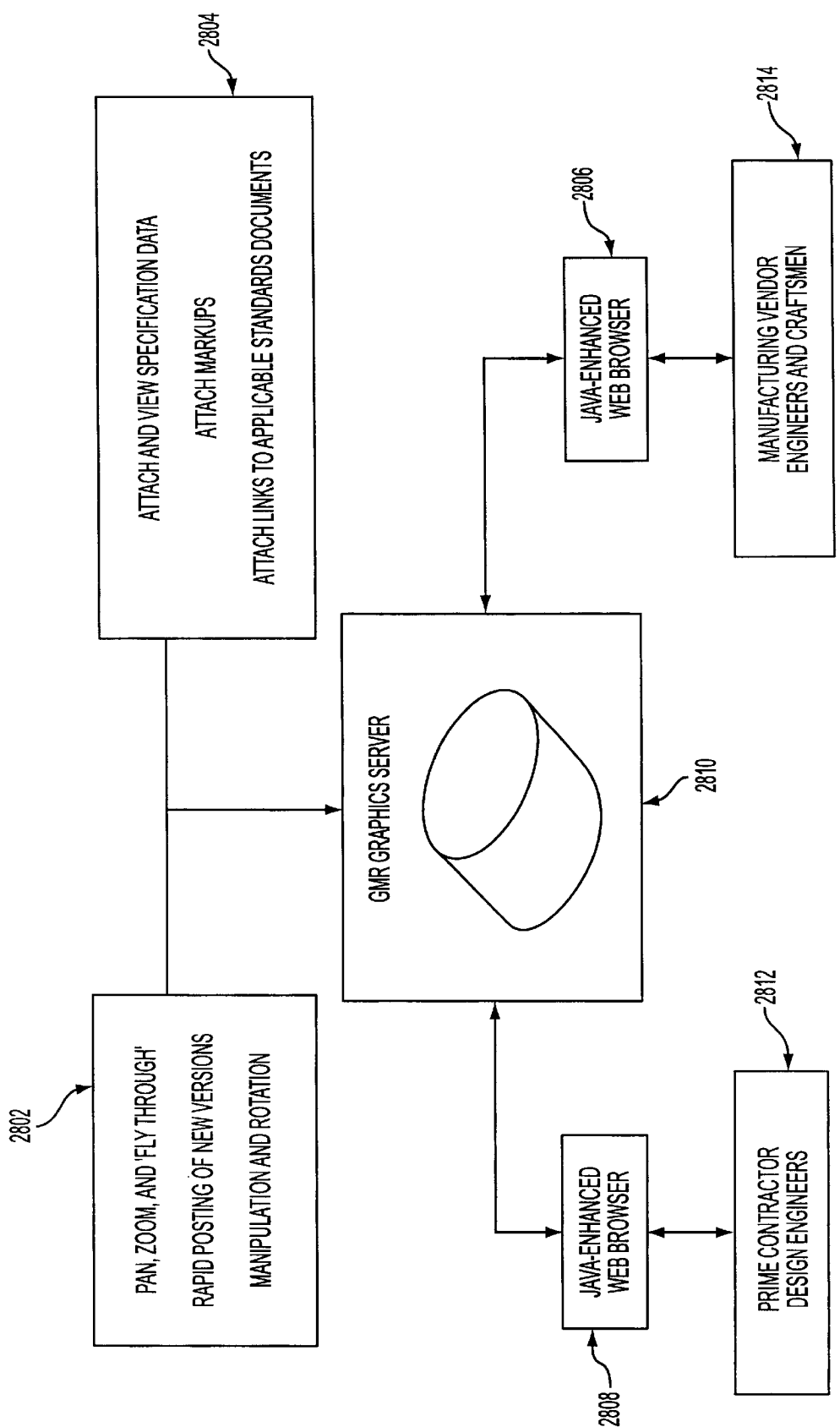
FIG. 28 illustrates how a prime contractor and manufacturing vendor can engage in a communications session using the GMR graphics server, including the substantially simultaneous display and manipulation of the part design model.

FIG. 28 illustrates that the ETC aspect of the invention supports interactive graphics manipulation, similar to that previously discussed in connection with the multimedia communications processing module 978 (FIG. 13) and CAD processing module 932 (FIG. 12). GMR graphics server 2810 permits prime contractor design engineers 2812 and manufacturing vendor engineers and craftsmen 2814 to interface via enhanced browsers (blocks 2808 and 2806) to engage in a quasi- real-time interactive session supporting pan, zoom and fly-throughs, posting of new versions, manipulation and rotation (collectively, block 2802), and the attachment and viewing of specification data, markups and links to applicable standards (collectively, block 2804). Again, it bears reiteration that such interface means could be other than Java™-enhanced browsers, including custom browsers and/or server-provided applications executed using standard operating systems. The network interface between users and a server(s) is maintained as substantially platform independent. It is also noted that other engineering data logically associated with features of the part design model may be viewed as well. The various types of specification, standards, and other engineering data that may be logically associated with a part design model was discussed earlier in detail.

Collectively, FIGS. 26–28 illustrate how the networked CAD and multimedia communications features of the first aspect of the invention (NICECAD) can be beneficially applied to support the ETC RFQ and bidding process. In sum, the quasi-real-time "streaming" of audio, video and graphics through a GMR provider provides a means for the prime contractor and bidder to engage in detailed technical discussions from different locations, in a secure environment, and substantially without the need for specialized hardware and software. It can be appreciated that numerous aspects of the so-called "boundaries" difficulty, previously described, are ameliorated or eliminated.

Continuing with the ETC aspect of the invention, the RFQ may be submitted or "posted" to GMR graphics server 2710 via browser templates completed by GMR user 2600. The RFQ may include such information as a project identifier, narrative description, quantity requirements, schedule requirements, delivery requirements, and the like. The RFQ may include information pertaining to how many "rounds" of bids will be considered, or as to whether a given round is a so-called "best and final" offer round. The RFQ may include information identifying the bidding pool. When the second (GMR) and third (ETC) aspects of the invention are integrated, the RFQ form may include a listing of the qualified fabricators identified by a search. Prime contractor GMR user 2600 may then select from the list so that the RFQ is directed to the selected fabricators. The RFQ may include information identifying the date and time for the bidding round(s), such as indicating the bidding window begins at 8:00 a.m. on November 7 and ending at 4:30 p.m. on November 14. The RFQ may also include information identifying that period when the part design model (and associated) data will be available and/or when GMR user 2600 will be available for conducting multimedia communications sessions to discuss issues.

As previously mentioned, the bidder may, and usually will, view and examine a graphical representation of the part design model (and associated technical documents or data) before submitting a bid. The bidder may also engage in a multimedia communications session with the soliciting entity to resolve any technical or business issues. A bidder may also view the bidding pool list, previously described, in order to evaluate the current state of the bidding process for the RFQ before submitting or updating a previously-submitted bid.

Bids that are submitted to the GMR provider (e.g., GMR server system 1000, FIG. 20) are posted, along with any supplemental information provided by bidders. This supplemental information could provide further information about the bidder or qualifying or clarifying the bid. For example, the bidder might say "Our bid is slightly higher than others because XYZ Machine and Tool, Inc. pays its operators a higher wage so as to retain the highest quality personnel" or other such information to be evaluated by the issuer of the RFQ. This bid and supplemental information may be stored by the GMR provider at a location in database 1100 (FIG. 22), such as in fabricator account data module 3850. Generally, GMR server system 1000 may tag the bids with time-stamp data and data identifying the prime contractor to which the bid is directed. After evaluating the bids, a GMR user selects the vendor(s) best meeting the RFP requirements, and winning bidders are notified.

Once the bidding window is closed, the issuer of the RFP/RFQ evaluates the bids and supplemental information. Vendors selected for contract negotiation and contract award are notified as a process of contract formalization commences. A collection of standard clauses are stored in a database at one of the NICECAD/GMR provider's servers. These clauses outline the responsibilities of each party with respect to common aspects of parts procurement. An example might be the specific assignment of responsibility for part inspection and verification. A clause may be provided that assigns this responsibility to the fabricator or to the prime contractor depending on the outcome of contract negotiations. Since many similar situations exist in this type of buying, standard clauses may be used as bases for the formal contract. Such standard contract clauses serve as starting points for negotiation. Through the virtual environment, these contract clauses are modified and included in a "formalized" contract that is custom tailored for the specific manufacturing job. A formalized contract may be thought of as a "signable" contract that has resulted from negotiations over a set of "standard" starting points. This feature is necessary to accommodate the very dynamic nature of this type of procurement.

The terms and conditions negotiations may use the secure multimedia communications capability previously discussed, whereby a prime contractor and successful bidder can engage in negotiations using the quasi- real-time video and/or audio. Stored standard form contracts (see, e.g., module 696, FIG. 6) and stored standard terms and conditions (see, e.g., module 697, FIG. 6) may be employed. The digital signature capability provides a means for both parties to formalize agreements once they are negotiated (see, e.g., module 699, FIG. 6). Once negotiated and formalized, contracts may be stored by the GMR provider, such as at module 415 of FIG. 4.

A final aspect to the present invention is that the provider the GMR provider (e.g, GMR server system 1000) may further provide to the winning fabricator(s) a network-based connection to the prime contractor's Enterprise Resource Planning (ERP) system. ERP generally refers to a multi-module software application integrated with a relational database used by a prime contractor to manage important parts of its business, such as product planning, parts purchasing, inventory management, interaction with suppliers, customer service and order tracking. By providing a fabricator (or other supplier) a secure connection (or so-called "portal") to the prime contractor's ERP system, the fabricator is further integrated with the prime contractor and business boundaries are further diminished. Commercially available ERP applications are available from PeopleSoft, SAP, Oracle, and Baan.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A server-based system for a fabricator evaluating detailed manufacturing instructions contained within a request for a propsal to view a part design model, comprising:

a memory for storing a part design model provided by a designer seeking a proposal for manufacturing the part represented by the part design model, said memory resident at a first location. said designer resident at a second location and said fabricator resident at a third location. where the first location is separate from both the second and third locations; and a server system for enabling a fabricator connected over a packet-switched network to access said part design model;

said server system having a software component for presenting the part design model to the fabricator through said network using a graphical user interface and where said software component is resident at said server system and accessible by said software component includes a substantially planform indenpendent client side application to be run on the system of the fabricator. where said application permits the manipulation of the part design model.

2. The server-based system of claim 1, wherein said manipulation comprises one or more of rotation, translation, two-dimensional cutting and a fly-through.

3. The server-based system of claim 1, wherein the part design model comprises a plurality of three-dimensional graphical features which are linked by the server system with at least one of specifications, regulations and standards associated with each of the plurality of features.

4. The server-based system of claim 3, wherein said software component further provides for the fabricator to select a specific three-dimensional graphical feature in order to view the at least one associated specification, regulations and standard associated with the selected feature.

5. The server based system of claim 4, wherein the selection is performed using a mouse device.

6. The server-based system of claim 1, wherein said server system is further adapted to permit the designer to review the accuracy of detailed manufacturing instructions contained within said request for a proposal.

7. The server based system of claim 1, wherein said software component further enables the fabricator and the designer to engage in a communications session that is substantially real-time.

8. The server based system of claim 7, wherein said communications session comprises one or more of audio and video.

9. The server based system of claim 7, wherein said communications session comprises the simultaneous presentation of the part design model to the fabricator and the designer.

10. The server based system of claim 9, wherein the simultaneous presentation includes the manipulation of the part design model.

11. The server-based system of claim 4, wherein the at least one associated specifications, regulations and standrds reside in the server memory and are sent over the network connection to the client-side on demand.

12. The server-based system of claim 6, wherein the part design model comprises a plurality of three-dimensional graphical features which are linked by the server system with at least one specification, regulation and standard associated with each feature.

13. The server based system of claim 1, wherein said software component further provides for the fabricator to select a specific three-dimensional graphical feature in order to view the at least one associated specification, regulation and standard.

14. The server-based system of claim 13, wherein the at least one associated specification, regulation and standard reside in the server memory and are sent over the network connection to the client-side application on demand.

15. A server-based system for a fabricator evaluating detailed manufacturing instructions to view a part design model, comprising:
   a memory for storing part design model provided by a designer where a part is represented by the part design model, wherein the part design model comprises at least one three-dimensional graphical depiction having a plurality of features which are linked by the server system with at least one specification, regulation, and standard associated with each of the plurality of features; and a server system for enabling a fabricator connected over a packet-switched network to access said part design model:
   said server system having a software component for presenting the part design model to the fabricator through said network using a graphical user interface. wherein said software component further provides for the fabricator to select a specific feature of the three-dimensional graphical depiction in order to view the specification, regulation, and standard associated with the selected feature.

16. The server-based system of claim 15, wherein said software component further permits the manipulation of the part design model.

17. The server-based system of claim 15, wherein said manipulation comprises one or more of rotation, translation, two-dimensional cutting and a fly-through.

18. The server-based system of claim 15, wherein the selection is performed using a mouse device.

19. The server-based system of claim 15, wherein said server system is further adapted to permit the designer to review the accuracy of detailed manufacturing instructions contained within said request for a proposal.

20. The server-based system of claim 15, wherein said proposal includes at least a portion of the part design model.

21. The server-based system of claim 15, wherein said part design model was stored in said memory at a time before submission of said proposal.

22. The server-based system of claim 15, wherein said software component further enables the fabricator and the designer to engage in a communications session that is substantially real-time.

23. The server-based system of claim 22, wherein said communications session comprises one or more of audio and video.

24. The server-based system of claim 22, communications session comprises the simultaneous presentation of the part design model to the fabricator and the designer.

25. The server-based system of claim 22, wherein the simultaneous presentation includes the manipulation of the manipulation of the part design model.

26. A process for obtaining information for a fabricators registry comprising the steps of:
   providing one or more fabricator manager applications to at least one fabricator, where the one or more fabricator manager applications:
      1) assist the at least one fabricator in managing the fabricator'business;
      2) reside in a central repository; and
      3) are accessed through a global open network.
   receiving data from the at least one fabricator, where the data is the result of the at least one fabricator using the one or more fabricator manager applications;
   aggregating the received data into a fabricator registry; and
   providing access to the fabricator registry to at least one designer, where at least one of:
      a) the at least one designer accesses at least a portion of the received data in the fabricator registry; and
      b) the entiry providing the fabricator manager applications accesses at least a portion of the received data in the course of providing services to one or more customers.

27. The process according to claim 26, where the one or more fabricator applications comprises a tool inventory application, where the fabricator uses the tool inventory application to maintain a catalog of standard and custom tools used by the fabricator.

28. The process according to claim 26, where the one or more fabricator applications comprises a machine availability scheduling application, where the fabricator uses the machine availability scheduling application to maintain a schedule indicating jobs one or more machines are scheduled for and when the one or more machines are available for a new job.

29. The process according to claim 26, where the one or more fabricator applications comprises a machine maintenance scheduling application, where the one or more fabricator uses the machine maintenance scheduling application to maintain a schedule indicating when one or more machines are scheduled for maintenance and when each of the one or more machines last had maintenance.

30. The process according to claim 26, where the one or more fabricator applications comprises an accounting application, where the fabricator uses the accounting application to maintain billing information, transaction records, and billing records.

31. The process according to claim 26, where the one or more fabricator applications comprises a training management application, where the fabricator uses the training management application to maintain at least one record of the training status of one or more employees.

32. The process according to claim 31, where the training status of the one or more employees includes at least one of:
   a) certifications received by the one or more employees;
   b) the most recent training of the one or more employees;
   c) the next scheduled training for the one or more employees;

d) the years of experience of the one or more employees; and e) the machines the one or more employees are trained on.

33. The process according to claim 26, where the one or more fabricator applications comprises a certification management application, where the fabrication uses the certification management application to maintain at least one record of the certification status of the fabricator, and to track the compliance status of the fabricator for one or more certifications.

34. The process according to claim 26, further comprising the step of receiving a selection of one or more of the at least one fabricator by the at least one designer based on the accessed data.

35. A system for obtaining information for a fabricators registry comprising:

at least one fabricator module;

an application provider module for providing one or more fabricator manager applications to the at least one fabricator module, where the one or more fabricator manager applications assist the at least one fabricator module in managing the fabricator'business, data is input by the at least one fabricator module using the one or more fabricator manager applications, and the data is aggregated into a fabricator registry; and at least one designer module, where at least one portion of:

a) the at least one designer module accesses a portion of the data in the fabricator registry; and b) the entiry providing the fabricator manage application accesses at least a portion of the received data in the course of providing services to one or more customers.

36. The system according to claim 35, where the one or more fabricator applications comprises a tool inventory application. where the fabricator module uses the tool inventory application to maintain a catalog of standard and custom tools used by the fabricator module.

37. The system according to claim 35, where the one or more fabricator applications comprises a machine availability scheduling application, where the fabricator module uses the machine availability scheduling application to maintain a schedule indication jobs one or more machines are scheduled for and when the one or more machines are available for a new job.

38. The system according to claim 35, where the one or more fabricator applications comprises a machine maintenance scheduling application, where the fabricator module uses the machine maintenance scheduling application to maintain a schedule indicating when one or more machines are scheduled for maintenance and when each of the one or more machines last had maintenance.

39. The system according to claim 35, where the one or more fabricator applications comprises an accounting application, where the fabricator module uses the accounting application to maintain billing information, transaction records, and billing records.

40. The system according to claim 35, where the one or more fabricator applications comprises a training management application, where the fabricator module uses the training management application to maintain at least one record of the training status of one or more employees.

41. The system according to claim 35, where the training status of the one or more employees includes at least one of:

a) certifications received by the one or more employees;

b) the most recent training of the one or more employees;

c) the next scheduled training for the one or more employees;

d) the years of experience of the one or more employees; and e) the machines the one or more employees are trained on.

42. The system according to claim 35, where the one or more fabricator applications comprises a certification management application, where the fabricator module uses the certification management application to maintain at least one record of the certification status of the fabricator module, and to track the compliance status of the fabricator for one or more certifications.

43. The system according to claim 35, where the at least one designer module selects one or more of the fabricator modules based on the accessed data.

* * * * *